United States Patent
DeGraw et al.

(10) Patent No.: US 11,203,490 B1
(45) Date of Patent: Dec. 21, 2021

(54) TORSION WELDMENT FOR A TELESCOPIC BOOM OF A MATERIAL CONVEYOR APPARATUS

(71) Applicants: Darren L. DeGraw, Farmington, UT (US); Chad T. Porter, Mountain Green, UT (US)

(72) Inventors: Darren L. DeGraw, Farmington, UT (US); Chad T. Porter, Mountain Green, UT (US)

(*) Notice: Subject to any disclaimer, the term of this patent is extended or adjusted under 35 U.S.C. 154(b) by 0 days.

(21) Appl. No.: 16/904,140

(22) Filed: Jun. 17, 2020

Related U.S. Application Data

(60) Continuation-in-part of application No. 16/178,155, filed on Nov. 1, 2018, now Pat. No. 10,899,545, which is a continuation-in-part of application No. 15/643,420, filed on Jul. 6, 2017, now Pat. No. 11,021,327, which is a continuation-in-part of application No. 15/370,819, filed on Dec. 6, 2016, now Pat. No. 9,783,368, which is a division of application No. 14/985,227, filed on Dec. 30, 2015, now Pat. No. 9,611,098.

(51) Int. Cl.
  *B65G 15/62* (2006.01)
  *B65G 39/02* (2006.01)
  *B65G 15/26* (2006.01)
  *B65G 41/00* (2006.01)
  *B65G 21/02* (2006.01)

(52) U.S. Cl.
  CPC ............. *B65G 15/62* (2013.01); *B65G 15/26* (2013.01); *B65G 21/02* (2013.01); *B65G 39/02* (2013.01); *B65G 41/005* (2013.01); *B65G 2812/02039* (2013.01); *B65G 2812/02168* (2013.01)

(58) Field of Classification Search
  CPC ........ B65G 15/26; B65G 15/44; B65G 15/60; B65G 15/62; B65G 21/00; B65G 21/02; B65G 21/14; B65G 21/20; B65G 39/02; B65G 39/12; B65G 41/005; B65G 2812/02039; B65G 2812/02168
  See application file for complete search history.

(56) References Cited

U.S. PATENT DOCUMENTS

| | | | | |
|---|---|---|---|---|
| 3,825,107 A * | 7/1974 | Cary | ...................... | B65G 21/14 198/313 |
| 5,685,687 A * | 11/1997 | Frye | .......................... | B60P 1/36 198/809 |
| 5,984,077 A * | 11/1999 | Frye | .......................... | B60P 1/36 198/317 |
| 7,562,766 B2 * | 7/2009 | Call | ...................... | B65G 15/62 198/840 |

(Continued)

*Primary Examiner* — Gene O Crawford
*Assistant Examiner* — Keith R Campbell
(74) *Attorney, Agent, or Firm* — Lamon Patent Services; Cynthia S. Lamon

(57) ABSTRACT

A weldment structure for reinforcing a boom of a material conveyor apparatus includes a pair of elongate rigid members having an overall length with cut ends, a set of cross members sharing an overall length with cut ends, the cross members fixed orthogonally to the elongate rigid members functioning to hold the rigid members apart and parallel and at the same edge alignment, and a set of cross support brackets fixed to the cross members and to the elongate rigid members, the cross support brackets each supporting at least a return roller bracket assembly and a pair of opposing belt guides.

9 Claims, 41 Drawing Sheets

(56) References Cited

U.S. PATENT DOCUMENTS 7,909,153 B2 * 3/2011 Pogue .................. B65G 41/005
198/315
9,783,093 B1 * 10/2017 Esch .................... B65G 41/002

* cited by examiner

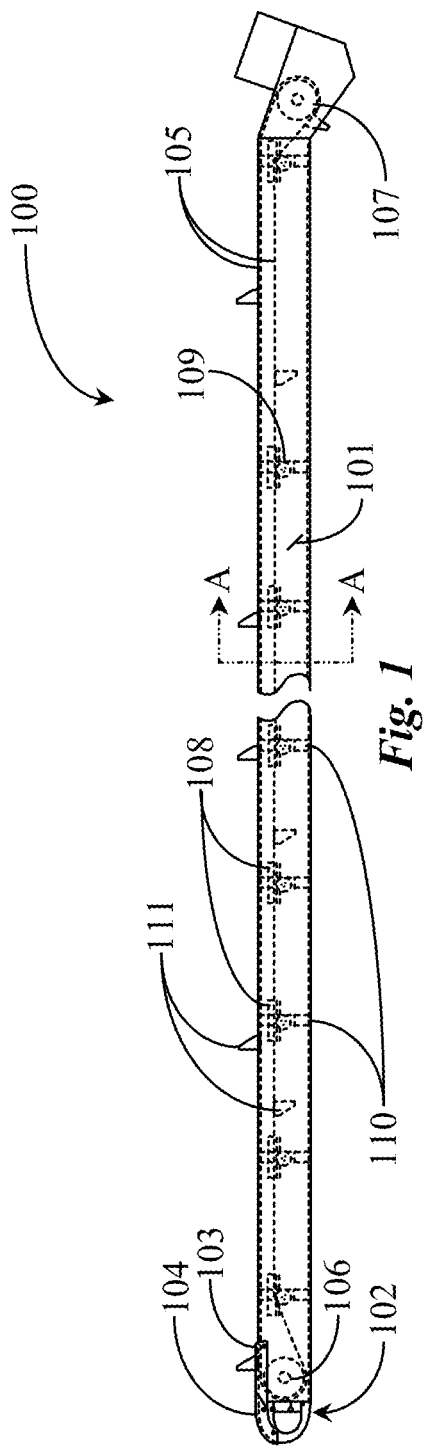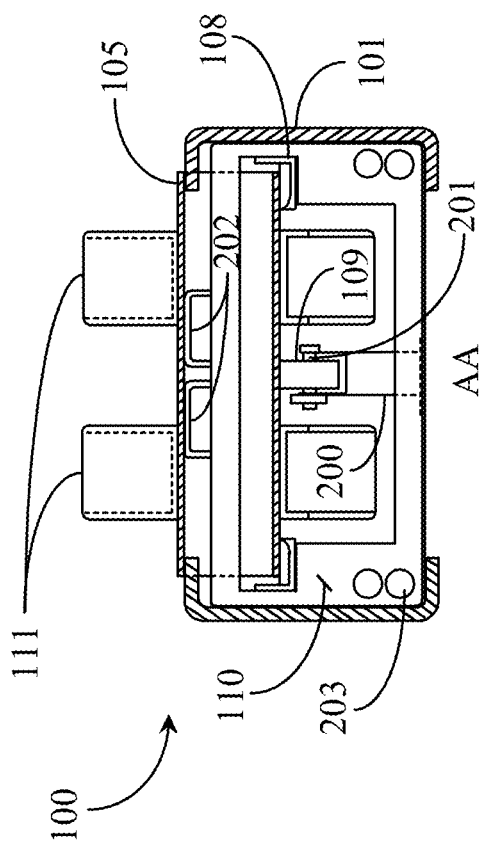

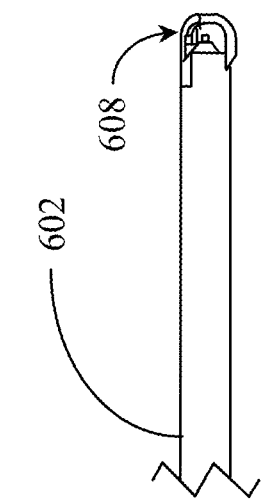
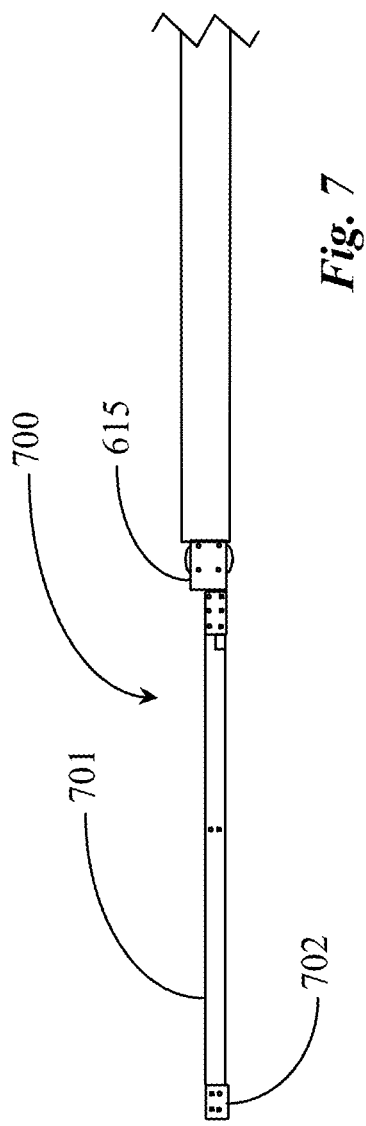
Fig. 7
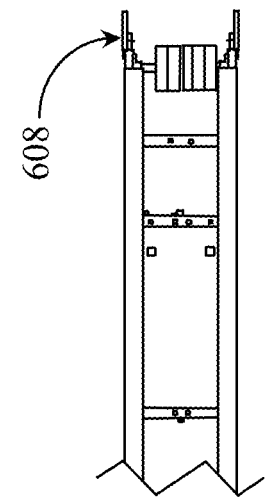
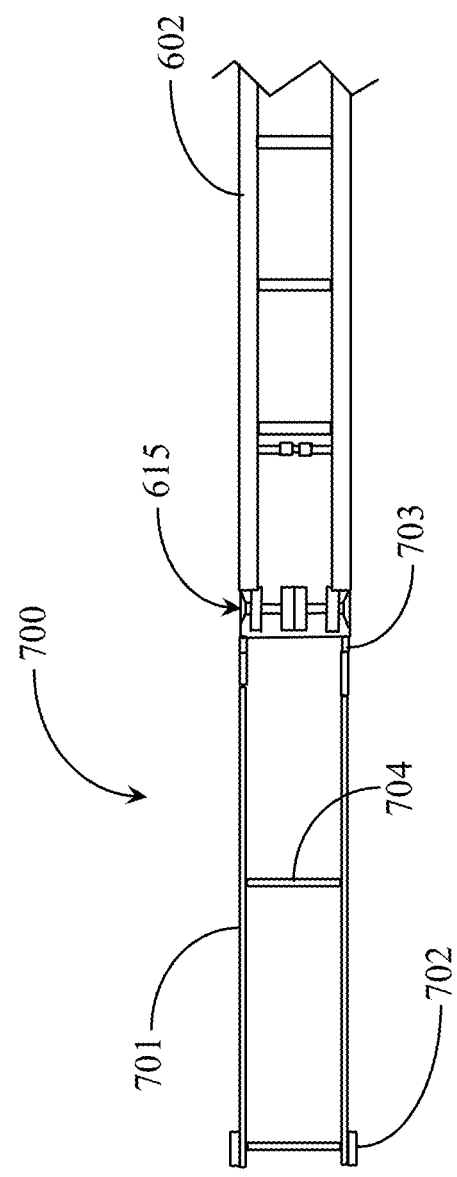
Fig. 8

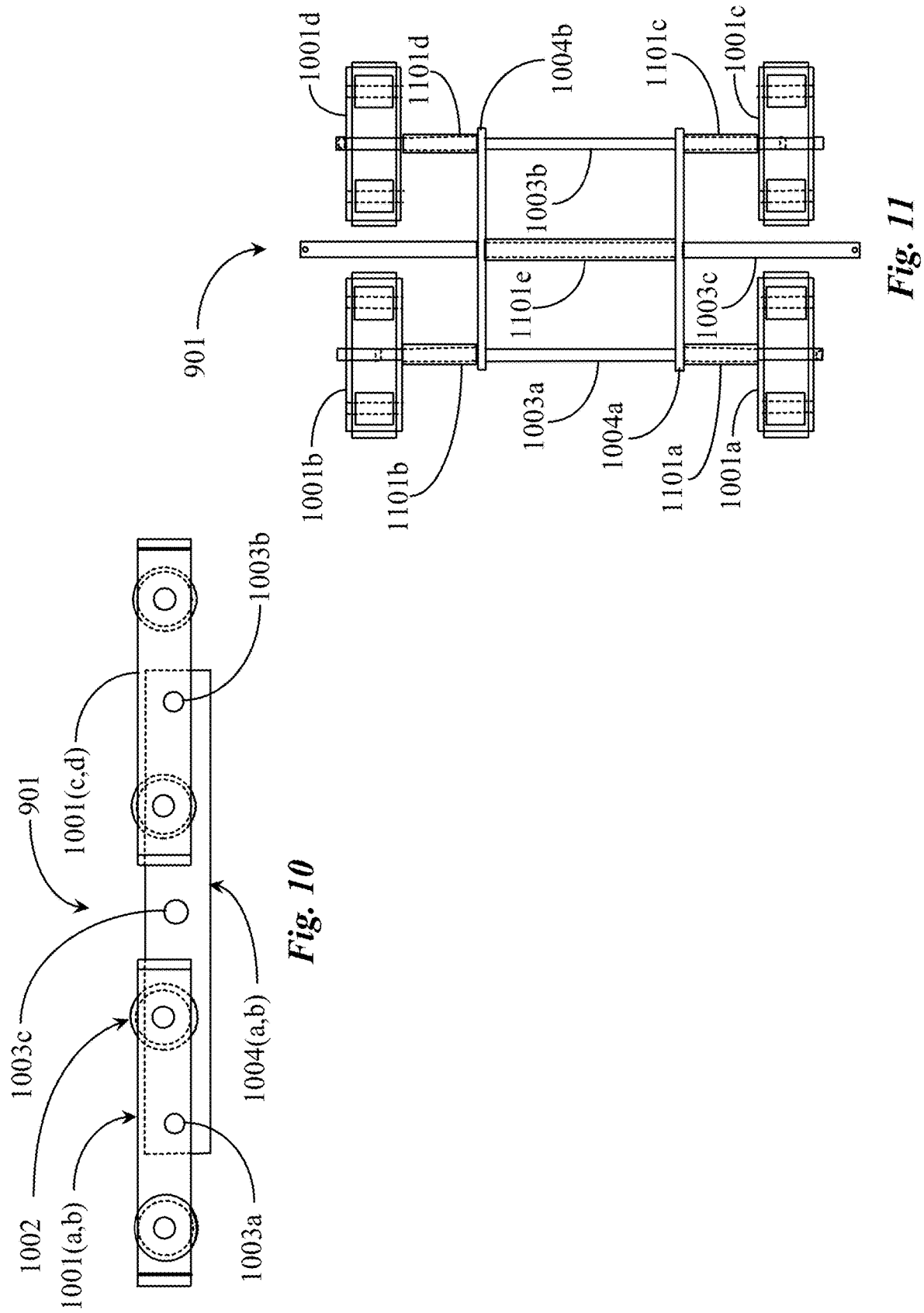

Section A-A

Section D-D

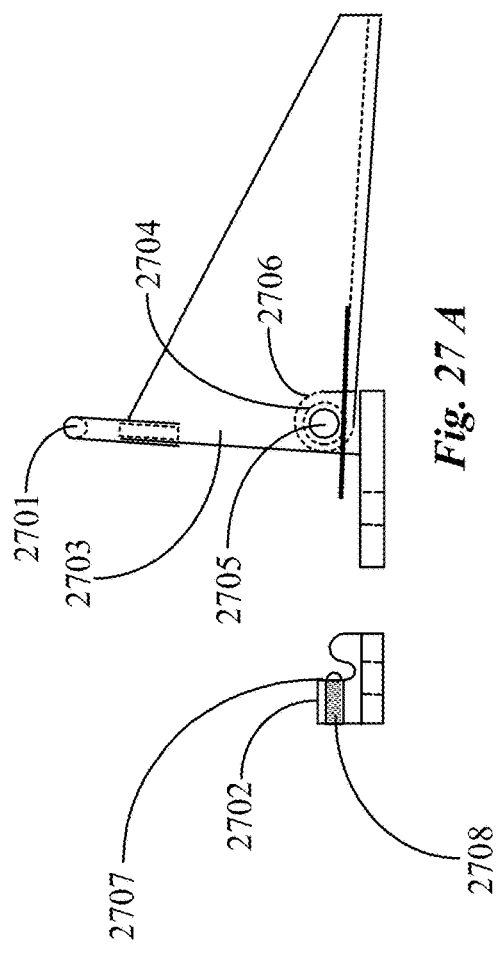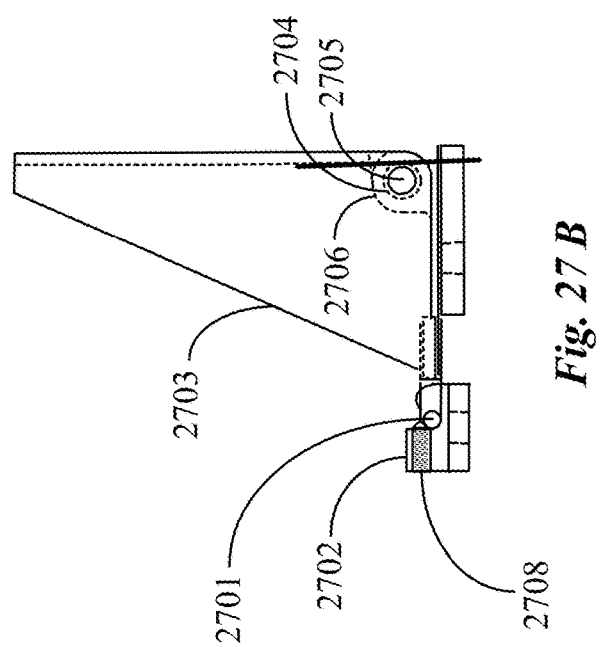

*section AA*

*section AA*

Detail A

TORSION WELDMENT FOR A TELESCOPIC BOOM OF A MATERIAL CONVEYOR APPARATUS

CROSS-REFERENCE TO RELATED DOCUMENTS

The present invention is a continuation in part (CIP) of U.S. patent application Ser. No. 16/178,155, entitled "HAND RAIL SYSTEM INTEGRATED WITH A MATERIALS CONVEYOR" filed on Nov. 1, 2018, which is a CIP to a U.S. patent application Ser. No. 15/643,420, entitled "TELESCOPIC MATERIAL CONVEYOR APPARATUS" filed on Jun. 6, 2017, which is a CIP of U.S. patent application Ser. No. 15/370,819, entitled "CONVEYER APPARATUS" filed on Dec. 6, 2016, which is a divisional of U.S. patent application Ser. No. 14/985,227 filed on Dec. 30, 2015. The disclosures of the above patent applications are included herein in their entirety at least by reference.

BACKGROUND OF THE INVENTION

1. Field of the Invention

The present invention is in the field of material conveyor apparatus used in construction and pertains particularly to methods and apparatus for stabilizing a telescopic boom to reduce horizontal flex and undesired twisting.

2. Discussion of the State of the Art

In the field of construction equipment, more particularly in the roofing industry, roofing materials have traditionally been carried or lifted onto a roof top manually by the workers without any mechanical assistance other than a ladder. This caused injuries to workers. More recently, conveyor type systems including those that are hydraulically powered have been developed and used to convey heavy roofing materials such as roofing shingles for example from a ground location to a rooftop location where those materials will be applied in construction.

One such system is known to the inventor and is included herein at least by reference to U.S. Pat. No. 5,984,077 granted for a mobile overhead conveyor system. This system as known to the inventor may be referred to herein as Frye et al. The system of Frye et al is installed on a delivery truck that may deliver materials to a roofing construction site. The system comprises a rotary turret type base that supports, via a lift mechanism, a boom including a conveyor that can be operated under hydraulic power and positioned at an azimuth sufficient to convey roofing materials from the truck directly to a roof top or from the rooftop back to the truck.

The inventor has provided a telescopic boom for a material conveyor apparatus that functions as an extendable component that may lengthen the reach of the conveyor to reach greater heights on a building. The boom structure is fabricated largely of fiberglass and tends to flex and or twist undesirably under horizontal force caused by turntable rotation to pick up and swing the conveyor apparatus to the left or right.

Therefore, what is clearly needed is a torsion weldment adaptable to a truck-mounted hydraulic turntable and telescopic boom structure that eliminates or greatly reduces the problems described above and enables safer operation under normal material load.

BRIEF SUMMARY OF THE INVENTION

According to an embodiment of the present invention, the inventor provides a weldment structure for reinforcing a boom of a material conveyor apparatus, the weldment structure including a pair of elongate rigid members having an overall length with cut ends, a set of cross members sharing an overall length with cut ends, the cross members fixed orthogonally to the elongate rigid members functioning to hold the rigid members apart and parallel and at the same edge alignment, and a set of cross support brackets fixed to the cross members and to the elongate rigid members, the cross support brackets each supporting at least a return roller bracket assembly and a pair of opposing belt guides. The weldment structure is installed at or otherwise incorporated within a boom structure of a material conveyor apparatus to reduce vibration and horizontal flexing and potential twisting of the material boom during operation.

In one embodiment, wherein the boom structure is a telescopic boom structure. In one embodiment, the elongate rigid members are square tubing. In one embodiment, the cross members are rectangular tubing with rounded corners. In one embodiment, the elongate rigid members are round tubing. In one embodiment, the weldment structure is fastened to the inside bottom surfaces of opposing fiberglass side rails forming the sides of the frame of a boom of a material conveyor apparatus.

In one embodiment, the weldment structure is fabricated of mild steel tubing but may alternatively be fabricated from a stainless-steel tubing and sheet metal plate. In one embodiment, the set of cross members includes three cross members, two disposed toward the ends of the elongate rigid members, and one at rough center of the overall length of the torsion weldment. In this embodiment, the set of cross support brackets includes three cross brackets, two edge aligned with the ends of the elongate rigid members, and one edge aligned with the center cross member. In one embodiment, the overall length of the weldment structure ranges from five feet to seven feet. In one embodiment, the cross-support structures further support top belt fiberglass skids supporting the underside of the belt at roughly center.

BRIEF DESCRIPTION OF THE SEVERAL VIEWS OF THE DRAWINGS

FIG. 1 is a side elevation view of a conveyor apparatus according to an embodiment of the present invention.

FIG. 2 is a section view of the conveyor apparatus of FIG. 1 taken along the section lines AA

FIG. 7 is a side elevation view of a boom push rod assembly connected to an extension boom of the conveyer system of FIG. 6.

FIG. 8 is a top view of the push rod assembly and extension boom of FIG. 7.

FIG. 10 is a side elevation view of a top rear roller assembly of the conveyor system of FIG. 9.

FIG. 11 is a top view of the upper rear roller system of FIG. 10.

FIG. 27A is a side view of a folding cleat or material stop in the folded down and shortened position.

FIG. 27B is a side view of a folding cleat or material stop in the upright tall position.

FIG. 4l is a view of a belt of a conveyor whereby a cable is utilized as a railing system for a conveyor.

DETAILED DESCRIPTION OF THE INVENTION

Figure 3:
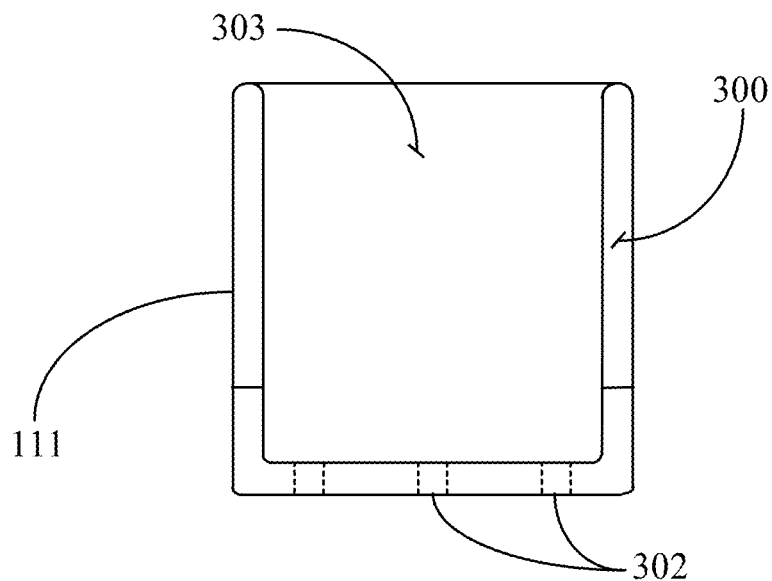
FIG. 3 is a front elevation view of the material stop of FIG. 2.

In various embodiments described in enabling detail herein, the inventor provides a unique stabilizer apparatus for reducing horizontal flexing and twisting of a telescopic boom on a material conveyor apparatus due to turret-based rotational operations to preposition the boom head. The present invention is described using the following examples, which may describe more than one relevant embodiment falling within the scope of the invention.

FIG. 1 is a side elevation view of conveyor apparatus 100 according to an embodiment of the present invention. Conveyor apparatus 100 is adapted as a hydraulically powered conveyor belt 105 supported at both ends by roller assemblies 106 and 107 and by a hydraulically powered boom assembly constructed of substantially parallel side rails 101 held together by a plurality of structural cross frame members 110 disposed at spaced intervals (may be equally spaced) over the length of the boom. Boom rails 101 may be manufactured of fiberglass reinforced plastic or other non-conductive materials. Cross frame members 110 form rectangular framing members having a partially open back, a bottom, a top and two sides forming a box like structure. In a preferred embodiment, cross frame members 110 are manufactured of durable steel frames that may be formed. Other durable materials may also be used in place of steel without departing from the spirit and scope of the present invention, such as fiberglass, Delron material or other non-conductive materials.

Side rails 101 may be bolted to or otherwise attached to cross frame members 110 to create a "boom housing" supporting conveyor apparatus components. Longitudinal bottom rails may also be provided and used to tie in the cross frame members at the bottom of the boom structure in one embodiment, for added support. Conveyor apparatus 100 includes a pair of nose loop assemblies 102 attached at one end of the boom rail structure with one loop assembly per side. Nose loop assemblies 102 are attached to the end of the boom structure that rests on a rooftop. The opposite end of the conveyor apparatus includes hardware for lift and vehicle turret mounting (not specifically illustrated). Lifts and lift support structures are not illustrated to improve clarity of the illustration.

Nose loop assemblies 102 include a nose loop 103 and a wear plate assembly 104. Nose loop 103 may be manufactured of fiberglass or another durable electrically resistive material. Wear plate assembly 104 comprises two half pieces or components that are installed over the top of nose loop 103 from opposing sides to protect the upper surface of the nose loops from frictional wear or damage from materials coming off of the conveyor. Wear plate assembly 104 may be manufactured of Delron or another non-conductive material and may be fastened to nose loop 103 using standard nut and bolt hardware. It is noted herein that wear plate assembly 104 is modular and replaceable such that when it is worn down by frictional contact with materials it may be removed and replaced with a new assembly.

Conveyor apparatus 100 includes a first axially mounted roller assembly 106 disposed at one end and a second axially mounted roller assembly 107 disposed at the opposite end of the boom structure. A conveyor belt 105 fits over the roller assemblies. The conveyor belt may be adjusted relative to tight or loose tension over the rollers via a sliding plate-and-screw adjustment mechanism having mechanical connection to roller assembly 107 or the "lower pulley position". In one embodiment a roller assembly may include a plurality of axially mounted wheels that are fixed to the axle whereby the axle is driven under hydraulic power to turn the wheels. In this embodiment the non-powered roller assembly may include wheels that are freely ratable about a fixed axle.

In another embodiment there may be one or more elongated cylinders that may be axially mounted in place of multiple wheels. In this embodiment one or more cylinders may be grooved to reduce surface contact with the belt. In one embodiment rollers, whether cylinders or wheels are manufactured of Delron or another polymer having a high resistance property to electrical conduction. In another variation of this embodiment the edges of the cylinders may be raised somewhat to aid in capturing and retaining the conveyor belt. In yet another variation of the cylinder embodiment a single cylinder may be tapered down slightly from the edges to center, helping to center the belt, improving grip on the belt, and reducing slippage or jumping of the belt in operation.

Conveyor belt 105 has a plurality of material stops 111 strategically disposed on the outer surface of the belt. Material stops 111 may be distributed in pairs affixed to the belt at measured intervals along the entire circumference of the belt. Material stops 111 are aligned in pairs orthogonally to the direction of conveyor belt 105. Material stops 111 have an angular side profile and are hollow or open on one side with a vertical face two side walls and a bottom mounting surface. The vertical face interfaces with material placed on conveyor 100 preventing the material from sliding down when the conveyor is positioned at an angle for rooftop delivery of materials. In one embodiment material stops 111 are manufactured from Delron or another durable plastic with a high resistance to electric conduction.

Conveyor apparatus 100 includes a plurality of lower belt support wheels 109 disposed one per at each cross frame member 110 on the bottom upper surface thereof. Support wheels 109 may be manufactured of plastic having a high resistance to electrical conductivity. Support wheels 109 are axially mounted on support posts and may be freely ratable about their axis at an elevation above the bottom surface of the cross frame members sufficient to support the lower outer surface of conveyor belt 105.

Conveyor apparatus 100 includes a plurality of belt guide plates 108. Belt guide plates 108 are disposed in pairs at each cross frame member and are affixed to the cross frame members. Belt guide plates 108 include an elongate rectangular bottom plate and a vertical back plate. Guide plates 108 may be manufactured of Delron or another electrically resistive material. Belt guide plates include machined or molded features that reduce friction wear on the conveyor belt during operation. Moreover, guide plates 108 also conform to the natural sag or drop off in elevation of the lower portion of conveyor belt 105 as it travels through each cross frame member.

In one embodiment conveyor apparatus 100 includes a start and stop valve, lever, or other hydraulic control mechanism (not illustrated here) disposed near the upper or rooftop end of the boom structure proximal to nose loop assembly 102. Such a control mechanism enables an operator at the rooftop location to start and stop the conveyor. In one embodiment the general direction of the conveyor belt may also be reversed using the control mechanism at the rooftop or one provided at the turret end of the boom structure. In one embodiment there are two drive motors one at the open end of the boom structure to drive the conveyor belt, and one at the turret end of the boom structure for operating (push, pull) the extension boom, wherein when both motors may operate at the same time to extend the boom and drive the belt. Hydraulic hoses may be threaded through openings in the boom structure cross frame members and connected to a hydraulic drive motor at the upper end of the conveyor apparatus.

FIG. 2 is a section view of the conveyor apparatus of FIG. 1 taken along the section lines AA Conveyor apparatus 100 is depicted in cross section for more clarity in illustration of the components. Side rails 101 are held together in parallel relationship by cross frame members 110. Guide plates 108 are affixed by screw, nut and bolt or by other fastening methods on opposing shelves of each cross frame member. Guide plates 108 may be manufactured from Delron which has a high resistance to electric conduction and a very low frictional property further protecting the conveyor belt from wear at the edges.

Guide plates 108 prevent the conveyor belt (105) edges from rubbing against the cross frame members. Radii at either end of the belt guide are provided to taper the thickness dimension of the bottom plate that the conveyor belt rides on during its passage back through the internal space of the boom structure. The radiused bottom plates act to reduce sharp or abrupt drop off of the belt at the edges of the guide plates the radii conforming to the natural sag or dip of the conveyor belt as it leaves the support of the guide plates and support wheels at each cross frame member along the length of the boom structure. Other radii are also provided to the guide plates at strategic points to prevent the conveyor belt from snagging onto any corners or sharp edges.

Support wheel 109 is axially mounted to a post 200 using a pin or dowel or other axle component 201. Post 200 may be manufactured of formed steel or another durable material.

Post 200 may be bolted onto the bottom plate of cross frame member 110 and is disposed centrally as viewed in the cross section. In one embodiment there are openings 203 provided through cross member 110. Opening 203 may provide passage of hydraulic hosing through the boom structure and up to the nose of the conveyor apparatus where the drive motor for the conveyor is located. There may be one or more supply and return lines without departing from the spirit and scope of the present invention.

The back plate of cross frame member 110 is largely open in the central area in order to facilitate open space within the boom structure for the conveyor belt 105 including material stops 111 to pass through. The open space is sufficient that the material stops do not touch any other component of or part of the boom structure. Conveyor belt 105 rides on the upper surface of the boom structure and is supported proximal to the belts edges by boom side rails 101. In one embodiment upper support rails 202 may be provided and affixed to the top surface of each cross frame member 110. In this example a pair of rails 202 adjacent and strategically co located just on either side of the center of the conveyor apparatus. Support rails 202 may be fabricated of Delron or similar polymer material, or a fiberglass composite having a high resistance to electric conduction and a low friction point.

Support rails 202 are U-shaped parts for supporting the center of conveyor belt 105 at the top of the boom structure. The elevation of the support rails 202 significantly coincides with the horizontal plane of the top surface of the connected boom side rails. The lower end of conveyor belt 105 rides on guide plates 108 and is supported at substantial center by support wheels 109. In this sectional view, the material stops 111 on the top side of conveyor belt 105 are moving toward the viewer and present a flat vertical face (material interface) orthogonal to the top surface of the belt. The material stops 111 at the bottom of the conveyor belt are moving away from the viewer and present the open side of the material stop. The material stop side walls on the open end are angled back away from the viewer, in one embodiment, approximately 30 degrees decreasing weight on the belt and stress on the installation point or points relative to the attachment of the stop to the conveyor belt.

FIG. 3 is a front elevation view of material stop 111 of FIG. 2. Material stop 111 is open on one side and has a back wall 303, which is the opposite side of the material interface side (vertical wall). Material stop 111 has a plurality of openings 302 provided through the bottom plate or surface for accepting a fastener such as a bolt for example. In one embodiment material stop 111 is fastened to the conveyor belt using a back plate (not illustrated) on the underside of the conveyor belt, the back plate having openings in alignment with openings 302. In another embodiment there may be back washers and nuts used at each of the openings.

Material stop 111 includes opposing side walls 300, which may be angle back away from the viewer approximately 30 degrees beginning at a specific elevation as depicted by cut lines. The hollow interior, resultant of fabrication, reduces the weight of material stop 111. Material stop 111 may be manufactured entirely of Delron, which is a substantially nonconductive polymer (electrically resistive), thus having sufficient strength to support material weight being ferried up to a rooftop. Edges of material stop 111 may be radiused to remove any sharp corners or edges that might snag onto material during the process of loading and unloading material on the conveyor.

Figure 4:
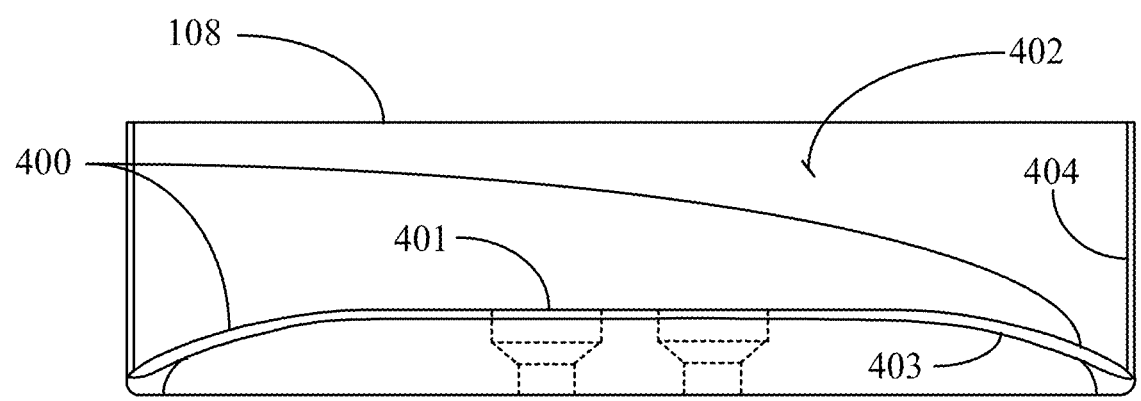
FIG. 4 is a front elevation view of the belt guide plate of FIG. 2

FIG. 4 is a front elevation view of the belt guide plate of FIG. 2. Belt guide plate 108 includes a unique design providing for less frictional contact with the conveyor belt and a reduced angle of shear at both ends of the bottom plate. Belt guide plate 108 includes a back riser plate 402 that may protect the edges of the conveyor belt from contacting cross frame components. Belt guide plate 108 may be made entirely of Delron combining polymer features of high resistivity to electrical conduction, structural rigidity and strength, and low coefficient of friction. Other material types such as Teflon for example are more abrasive to the conveyor belt.

Belt guide plate 108 includes a bottom plate top surface that is radiused to provide a taper (radii 400) at opposing edges of the plate toward center of the plate. Provision of such radii eliminates a sharp drop in elevation in conveyor belt (105) such as at drop off points and pick up points representing the edges of the guide plates. Cross frame members (110) hosting the belt guide plates are spaced strategically apart so the lower portion of the conveyor belt will sag somewhat even with the correct amount of tension in the belt.

Radii 400 conform to the natural drop off profile of the conveyor belt. The long edges of the bottom plate are also radiused to eliminate snagging and wear on the belt via a sharp edge. Referring now back to FIG. 2, the front corners of guide plate 108 are radiused to reduce contact with conveyor belt 105.

Referring now to FIG. 4, belt guide plate 108 includes counter-bored openings 401 provided through the bottom plate. Openings 402 accept mounting screws or bolts for mounting the plate onto opposing shelves of the cross frame members (110). Back plate 402 extends vertically a sufficient height to help insure that the belt does not touch any frame members even at lower belt tensions that may be too low for safe or proper operation.

In one embodiment back riser plate 402 maybe angled inward by a strategic amount sufficient to aid in urging the edges of the lower portion of the conveyor belt down restricting it to the surface area of the guide plates. In one embodiment the angle may be machined into the back riser plate or molded as such without departing from the spirit and scope of the present invention. Belt guide plates 108 aid in keeping material stops in the correct open passage way through the boom structure as viewed in FIG. 2 preventing the stops from making any contact with frame members or other components.

Figure 5:
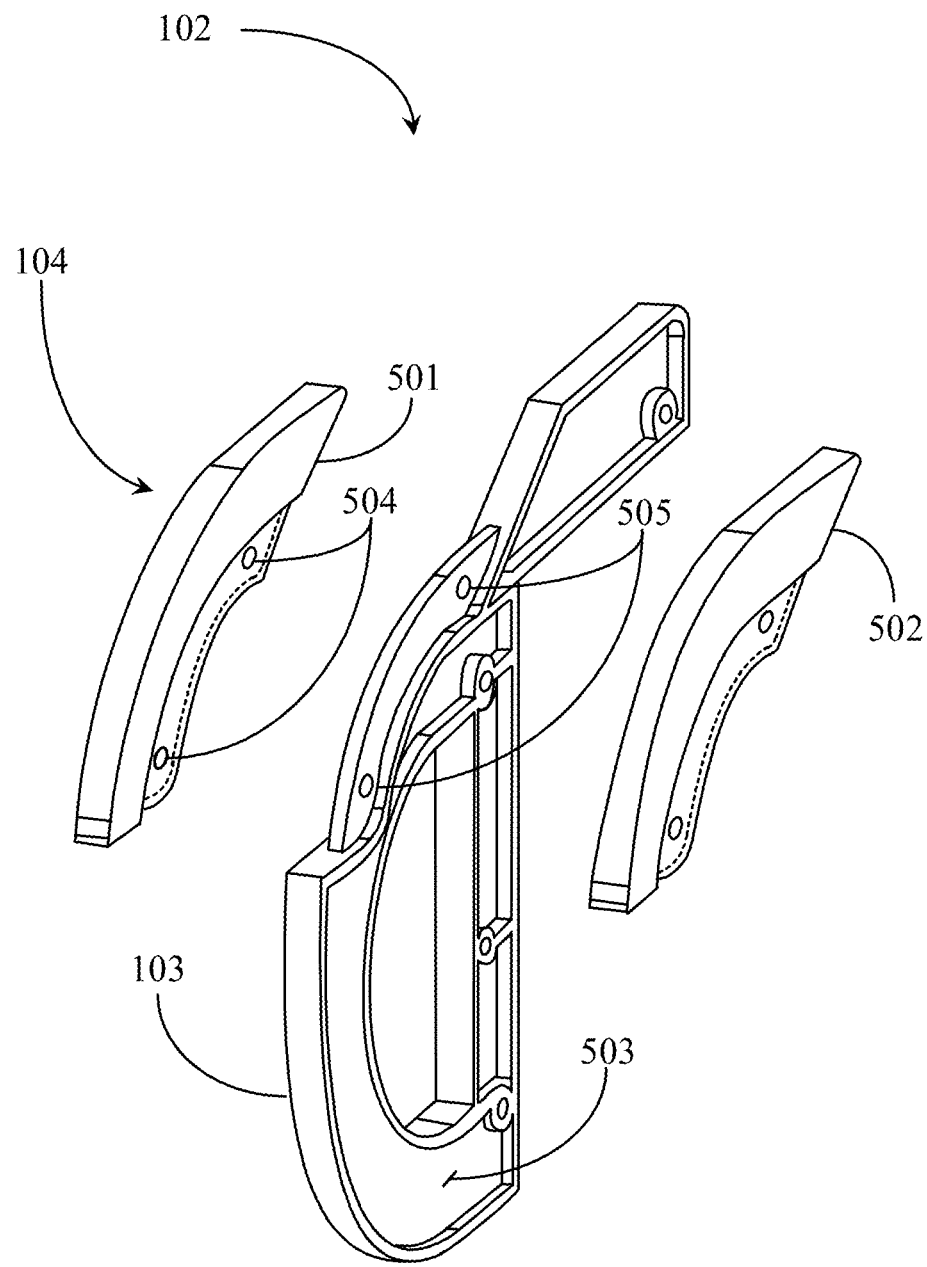
FIG. 5 is a perspective assembly view of a nose guard and wear plate assembly according to an embodiment of the present invention.

FIG. 5 is a perspective assembly view of nose loop assembly 102 according to an embodiment of the present intention. Nose loop assembly 102 includes a nose loop 103 and a wear plate assembly 104. Nose loop 103 may be affixed to the upper end of the boom structure at the side rails. There are two such nose loops provided one affixed proximal to the end of each boom rail. Nose loop 103 may be manufactured of Delron, another non-conductive polymer, fiberglass composite or another durable electrically resistive material. Wear plate assembly 104 comprises two half pieces 501 and 502 that are installed over the top of nose loop 103 from opposing sides to protect the upper surface of the nose loop from frictional wear or damage from materials coming off of the conveyor. Wear plate assembly 104 may be manufactured of ultrahigh molecular weight (UHMW) polyethylene. Wear plate assembly 104 may be fastened to nose loop 103 using standard nut and bolt hardware through openings 504 and openings 505 on nose loop 103.

Nose loop 103 has a recessed surface 503 at both sides to achieve lighter weight without compromising structural integrity of the loop. Wear plate components 501 and 502 are identical parts and can be swapped in assembly. Wear plate assembly 104 provides a function protecting nose loop 103 from excessive wear and a function insulating an operator from sudden static shock that may build up while the conveyor is continually operated. Such a static electric shock may be powerful enough to distract an operator enough to cause serious injury.

Wear plate components 501 and 502 may be manufactured entirely of Delron. Wear plate assembly 104 is replaceable if it becomes worn through frictional contact with materials being loaded or off loaded from the conveyor. Each wear plate component 501 and 502 has a double walled lower portion through which openings 504 are placed through (both walls). The inner edge of the nearest wall in perspective view is depicted herein with a broken edge line. Wear plate assembly 104 is installed over nose loop 103 where openings 505 are provided through a "rib" portion of the nose loop having the same thickness as recessed wall 503.

It will be apparent to one with skill in the art that the conveyor apparatus of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

Telescopic Boom System

The inventors provide a telescopic conveyer apparatus having a unique telescopic boom system including supporting features and components of which are described in enabling detail relative to the examples below which may represent more than one possible embodiment of the present invention.

Figure 6:
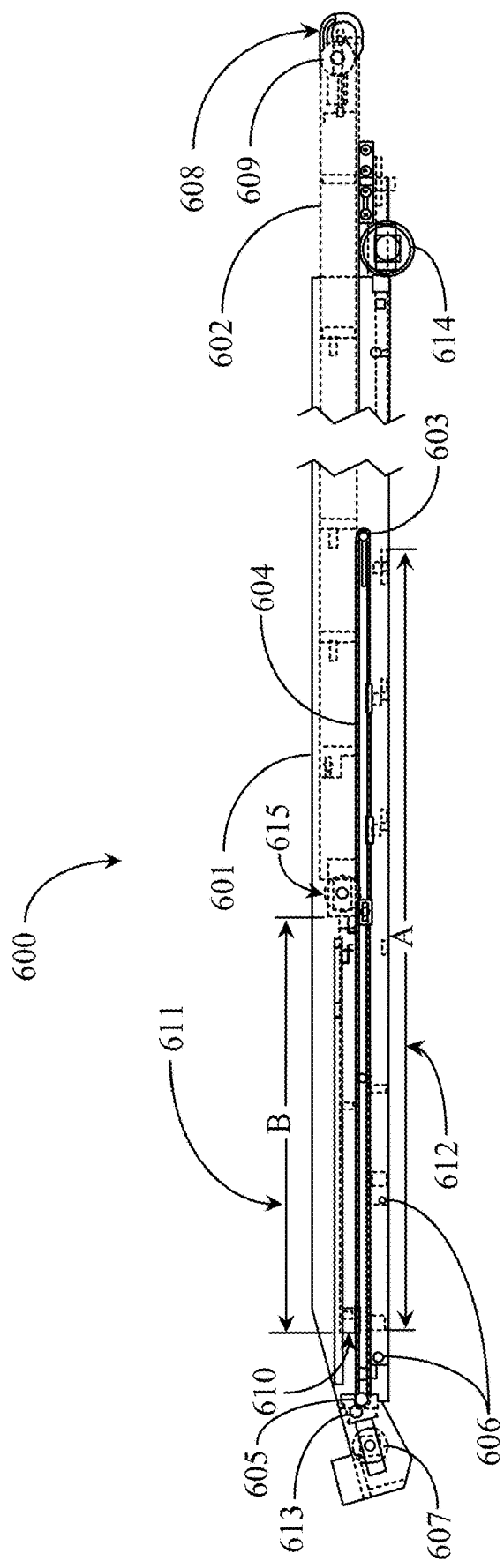
FIG. 6 is a side elevation view of a telescopic boom type conveyor system according to an embodiment of the present invention.

FIG. 6 is a side elevation view of a telescopic boom type conveyor system 600 according to an embodiment of the present invention. Telescopic conveyer system 600 is adapted to be mounted on to a vehicle mounted turntable (not illustrated) by way of a steel saddle frame 612 that is contained within a main conveyer boom 601. Dimension A associated with element number 612 indicates the span of the saddle frame along main conveyer boom 601. Dimension A is approximately 15 feet in length, though it may be somewhat shorter or longer than 15 feet without departing from the spirit and scope of the present invention.

Main boom 601 is constructed using elongate side rails held in place by a plurality of structural cross frame members forming a boom housing that has sufficient room for containment of an extension boom 602. Like main boom 601, extension boom 602 includes elongate side rails and structural cross members that may be manufactured of formed steel frames that do not inhibit the non-conductivity of the boom or overall conveyor apparatus. Main boom 601 and extension boom 602 are connected together in a telescopic manner to enable the extension boom to travel mechanically within the main boom and to be extended out from the main boom. Both the main boom and extension boom may be constructed largely of non-conductive composite materials. Saddle frame 612 may be mounted to a turntable at connection points 606 at opposing sides of the frame.

A unique push bar assembly 611 is provided in this embodiment and is connected to main boom 601 and to extension boom 602. Push-bar assembly 611 spans a dimension B that is approximately half of the distance of saddle frame 612. Push bar assembly 611 includes, in this example, two elongate push bars held substantially parallel and in the same plane by two or more cross members. Push bar assembly 611 is chain driven and therefore it is connected to a chain-drive apparatus via connection hardware 610 that includes a drive chain 604 installed on a sprocket pulley system featuring a front idler sprocket 603 and a rear drive sprocket 605 including a drive gear (not illustrated) that matches a drive gear 613 at the hydraulic motor. In this example there are two drive chains and pulley sets driving push bar assembly 611 on either side of saddle frame 612.

In this example, a drive drum 614 is provided to drive the conveyor belt (not illustrated). At the front of the extension boom 602 are nose loop assemblies 608 and an idler pulley 609. Idler pulleys 607 support the conveyer belt at the rear of conveyer 600. Dimension B depicts the approximate length of the push bar apparatus, in this embodiment approximately half of the distance A of saddle frame 612. The push bars may be fabricated of any non-conductive materials including fiberglass composite material and are lighter in weight than other materials reducing overall weight of the conveyer apparatus. Pass through drum 615 is provided to support the conveyer belt at the rear end of extension boom 602. Pass through drum 615 is configured architecturally to support the conveyer belt and allow material stops or cleats installed on the conveyer belt (belt and cleats not illustrated) to pass through the structure without coming in contact with structural or mechanical parts of the conveyer system.

In general operation of telescopic conveyer apparatus 600, the main boom is lifted and swiveled into position to be bridged to a roof top for example for the purpose of conveying materials from a truck onto the supporting roof Extension boom 602 may be mechanically extended from within boom 601 using the push bar system to push and pull on the extension boom. Roller sets (not illustrated) are provided to make the travel of the extension boom smooth. The push bar system extends past the saddle frame when the extension boom is extended fully creating a non-conductive break point in the boom structure.

FIG. 7 is a side elevation view of a boom push rod assembly 700 connected to the main and extension booms of the conveyer system of FIG. 6. Extension boom 602 includes nose loop assemblies 608 at one end and the push bar system and connection point interfaces 702 (two each) at the opposing end for attaching to the drive chains (drive chains not illustrated). The push bar assembly is connected to extension boom 602 at the rear of the boom or to the pass through drum 615. In one embodiment the push bar assembly is connected to the extension boom using a pin-clevis attachment, allowing the connection point to pivot.

FIG. 8 is a top view of push bar assembly 700 and extension boom 602 of FIG. 7. Push bar assembly 700 includes parallel push bars 701 held apart and parallel by cross members 704. The entire push bar assembly except for the steel cross members may be fabricated of non-conductive composite materials as previously described above. Interface 702 connects to the drive chains (not illustrated) at each opposing side of the saddle as described further above in FIG. 6.

Figure 9:
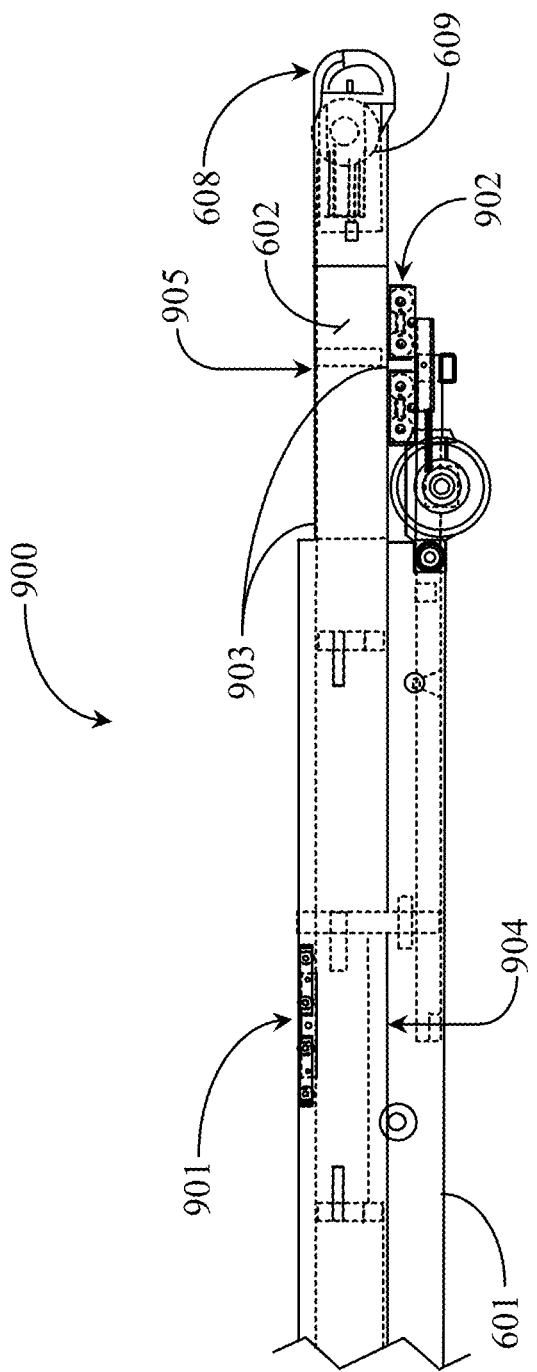
FIG. 9 is a partial side elevation view of the main and extension booms of the telescopic conveyer system of FIG. 6.

FIG. 9 is a partial side-elevation view of the main and extension booms of telescopic conveyer system 600 of FIG. 6. Conveyer 600 includes a top rear roller assembly 901 that is mounted within the main boom and wherein a plurality of rollers, in this example, eight rollers make contact with the fiberglass rails 903 defining the top surface of boom 602.

Conveyor 600 includes a front bottom roller assembly 902 that is mounted on a structural frame member beneath or just below the bottom fiberglass rails 903 and wherein the individual rollers (eight rollers) make contact with the rails defining the bottom surface of extension boom 602.

Roller assembly 901 and roller assembly 902 both function to make travel by the extension boom smooth and kink free despite differing angles of the conveyer boom assembly and unbalanced loads exerted on the conveyor system. Roller assembly 901 includes at least three pivot points that allow the rollers to conform with flex attributed to the fiberglass rails. Likewise, roller assembly 902 includes at least three pivot points enabling the rollers to conform to flex in the fiberglass rails it makes contact with beneath the extension boom.

The act of extending extension boom 602 out from within main boom 601 may cause load pressure specifically at load points 904 and 905, which are magnified with a full material load. The flexibility of each of the roller assemblies helps to prevent slippage, binding and functions to enable maximum roller contact with the extension boom even under conditions where the boom rails are bowed or otherwise not completely planar. Although not illustrated here, nose loop assembly 608 may be kept off of a roof top via a support leg affixed to the boom generally underneath and just behind forward pulley 609. More detail about supporting extension boom 602 on a roof top via a support leg is provided later in this specification including its relevancy to high material load mitigation when operating the conveyer system.

Conformity to natural flex and flex under load of materials is afforded by roller assemblies 901 and 905 operating in contact with the non-conductive fiberglass top and bottom rails of the extension boom overcoming current limitations of fabrication such as using solid steel components which also add much more weight to the conveyor, undermine its non-conductive properties, and limit its general usefulness and length of reach of the system as a whole. In addition, a spread load on the fiberglass frame afforded by the roller assemblies increases the life and boosts the safety factors of the fiberglass. Extension boom 602 may be extended using only a minimal amount of force largely due to ball bearings in the rollers. This extends the life of components affected by extending and retracting the extension boom such as sprockets, chains, fasteners, shafts, fiberglass rails, and so on.

All metal parts such as the chains incorporated in this invented mechanism, in its various functions, may be made entirely of non-conductive or poorly conductive metal alloys or plastic.

Figure 28:
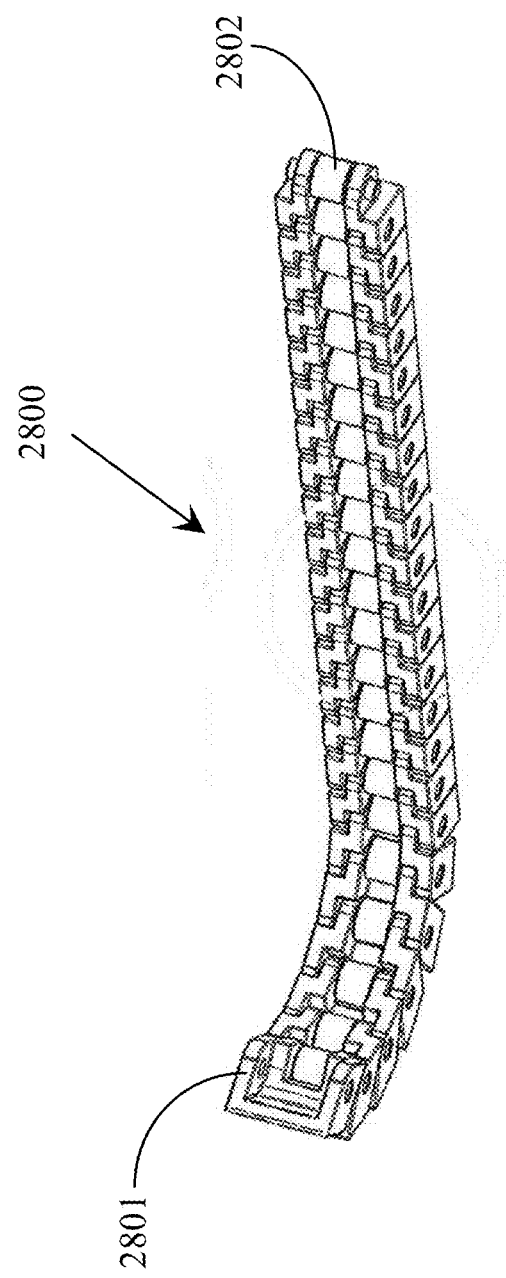
FIG. 28 is a perspective view of a special chain made from a variety of high tech materials.

FIG. 28 illustrates such a chain. Chain 2800 has a frame 2801 made of non-conductive materials and the roller portions 2802 are constructed of non-conductive materials as well. These parts may be made of high impact polymer plastics impregnated with glass fibers, carbon fibers, carbon nanotubes, glass beads or any other reinforcing or strengthening materials added to plastics to increase strength and or high wear characteristics. In one embodiment the chain is made from a material, polybenzimidazole (PBI) or poly-2, 2'-(m-phenylene)-5, 5'-bibenzimidazole, marketed as a bulk polymer under the trade name Celazole. It is commonly reported to have the highest compressive strength of any unfilled plastic material, and has the highest tensile strength, highest shear strength, and highest Rockwell hardness rating of any plastic available. It maintains its mechanical properties at high temperatures better than any other unreinforced polymer, and can reportedly survive short-term exposure to 1400° F., which is 200° above the melting point of aluminum. This material may be used for any part states as non-conductive above or below in this specification.

FIG. 10 is a side elevation view of a top rear roller assembly of conveyor system 600 of FIG. 9. Roller assembly 901 includes eight rollers 1002 arranged in opposing rectangular roller set frames 1001 (a, b) and 1001 (c, d). Roller set frames 1001 (a, b, c, and d) each are rectangular frames having a front and back wall and end walls. Roller set frames may be fabricated of durable steel capable of withstanding pressures subjected to the assembly in operation. Roller set frames 1001a and 1001b are arranged on opposite sides and are pivotally mounted onto a pivot axle 1003a. Likewise, roller set frames 1001c and 1001d are so arranged and pivotally mounted onto a pivot axle 1003 b. Pivot axles 1003a and 1003b also support roller set spacer plates 1004a and 1004b. Spacer plates separate a number of cylindrical spacers (not illustrated here) that retain the roller set frames 1001a through 1001d in position on opposite sides of the extension boom.

Each roller set frame carries two rollers axially pinned on either side of the pivot axle. Roller assembly 901 is mounted within the main boom via a central pivot axle 1003c that may be affixed to frame members or to structural components within the main boom. Rollers 1002 make contact with at least the fiberglass rails of the extension boom as it is pushed and pulled within the main boom. Roller assembly 901 has three pivot points. Roller set frames 1001a and 1001b may pivot about pivot axle 1003a while roller set frame 1001 c and roller set frame 1001d may pivot about pivot axle 1003b. Roller assembly 901 may pivot about central pivot axle 1003c.

FIG. 11 is a top view of upper rear roller assembly 901 of FIG. 10. Cylindrical spacers are used to space components in roller assembly 901 apart from one another. Cylindrical spacers 1101a and 1101b retain rollers sets toward the ends of pivot axle 1003a. Retaining clips or pins may be employed to prevent rollers from coming off of the supporting pivot axle. Spacer plates 1004a and 1004b abut against cylindrical spacers 1101a through 1101d. A central cylindrical spacer 1101c is provided to space plates 1004a and 1004b apart. Central and roller set spacer components may be manufactured from non-conductive materials or composite materials. Central pivot axle 1003 has a mounting opening at either end of the axle for facilitating mounting within the main boom. Rollers 1002 may be rated in hardness (durometer) whereby the rollers may give way to flattening somewhat to aid in spreading out the load of the weight presented on the assembly.

Figures 12, 13:
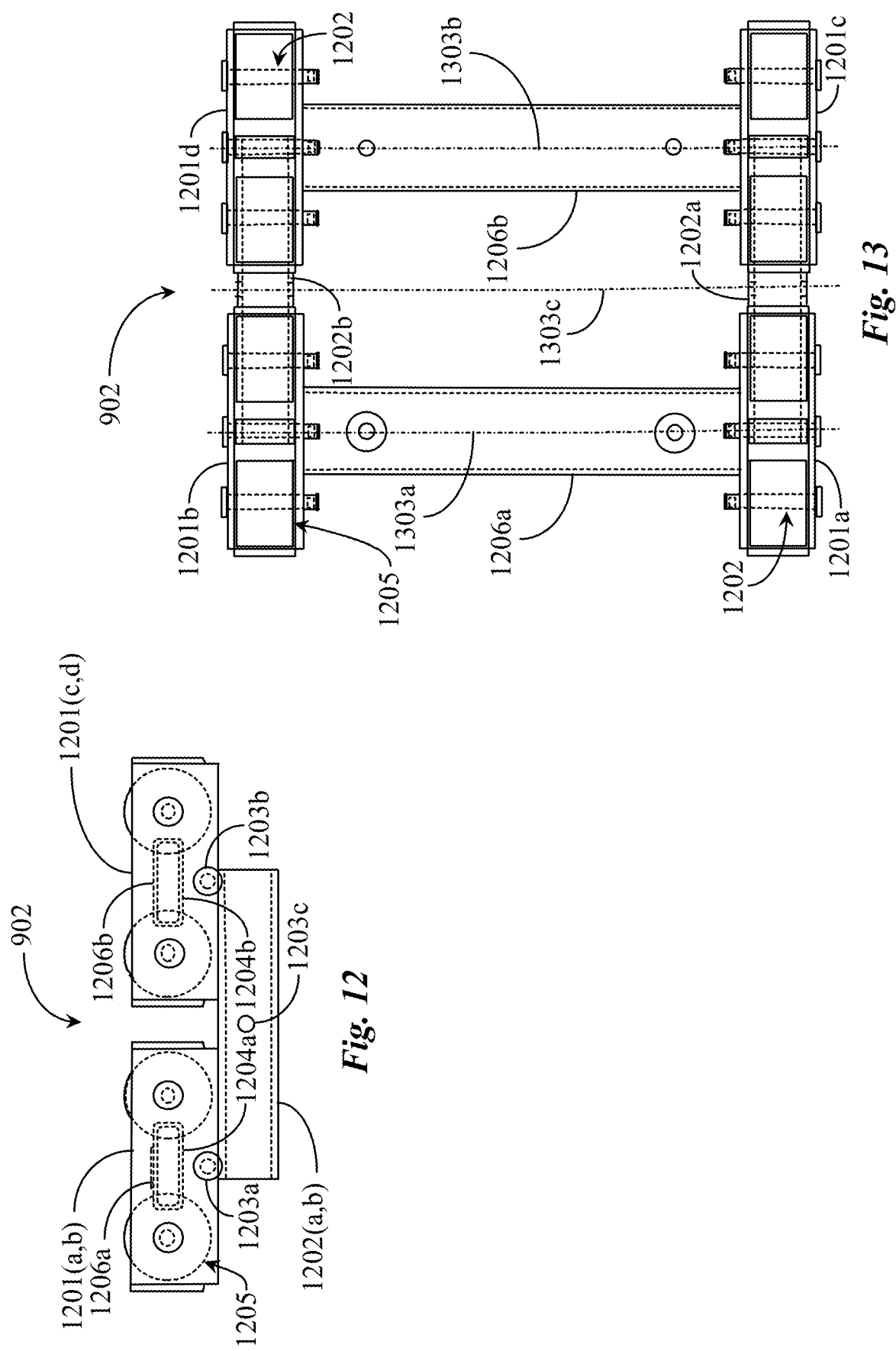
FIG. 12 is a side elevation view of the lower front roller assembly of FIG. 10.
FIG. 13 is a top view of the lower front roller assembly of FIG. 12.

FIG. 12 is a side elevation view of lower front roller assembly 902 of FIG. 9. Like roller assembly 901, roller assembly 902 includes at least three pivot axles. Roller assembly 902 includes eight rollers 1205 arranged in opposing rectangular roller set frames 1201(a, b) and 1201 (c, d). Rollers 1205 may be rated in hardness (durometer) whereby the rollers may give way to flattening somewhat to aid in spreading out the load of the weight presented on the assembly. Roller set frames 1201 (a, b, c, d) each are rectangular frames having a front and back wall and end walls. Roller set frames may be fabricated of steel for strength. Roller set frames 1201a and 1201b are arranged on opposite sides and are spaced apart by a somewhat flexible cross member 1206a. Likewise, roller set frames 1201c and 1201d are so arranged and are spaced apart by a somewhat flexible cross member 1206b.

Roller set frames 1201a and 1201 b are pivotally mounted on a pivot axle 1203a as a relatively fixed via cross member 1206a, set of roller frames containing roller sets. Roller set frames 1201*c* and 1201*d* share the same relationship relative to a pivot axle 1203*b* and across member 1206*b*. Cross members 1206*a* and 1206*b* may be manufactured of durable steel. In this embodiment, they are in the form of rectangular tubing affixed to the surface of the roller set frame wall at each end.

Roller assembly 902 includes base pivot brackets 1202*a* and 1202*b* connected to the roller set frames just beneath the rollers 1205 at either side of the extension boom. A pivot opening 1203*c* is provided through both pivot brackets 1202*a* and 1202*b*. Roller assembly 902 may be located just in front of the drive drum of conveyor 600 the rollers making contact with the surfaces of the bottom rails of extension boom 602. In this example there are three pivot points 1203*a*, 1203*b*, and 1203*c*. A steel rod or axle may be used to mount roller assembly 902 into a position where the rollers make contact with the bottom rails of the extension boom.

FIG. 13 is a top view of lower front roller assembly 902 of FIG. 12. Rollers 1205, eight in all, may be axially pined within frames as a pair of rollers to each frame. Center line 1303*a* represents a pivot axis for one side of roller assembly 902 while a center line 1303*b* represents a pivot axis for the other side of the assembly. The entire assembly may pivot about center line 1303*c*.

In this embodiment there are three pivot points. Further cross members 1206*a* and 1206*b* may flex somewhat without departing from the spirit and scope of the present invention. Rollers 1205 are axially pinned within the host frames using axle bolts or dowels 1202. Each roller set frame 1201 *a* through *d*is also axially pinned to pivot brackets 1202*a* and 1202*b*. In turn, pivot brackets 1202*a* and 1202*b* are aligned and may be mounted over a rod or dowel via openings 1203*c* (FIG. 12). Center line 1303*c* runs through pivot point 1293*c* of FIG. 12. Rollers 1205 may be rubberized and fabricated from a non-conductive material.

Figure 14:
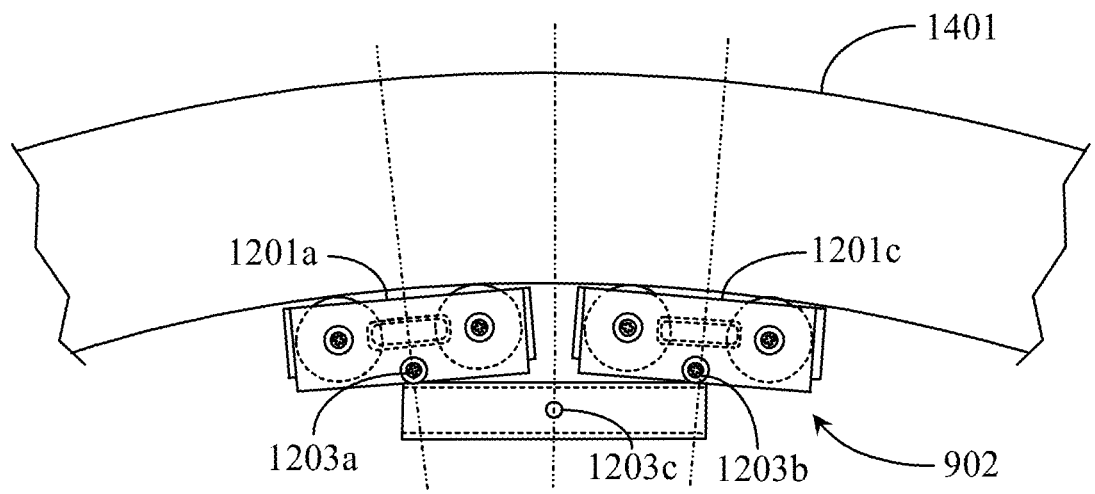
FIG. 14 is an end view of the roller assembly of FIG. 12 with load shift flexibility incorporating two or more pivot points according to an embodiment of the present invention.

FIG. 14 is an end view of roller assembly 902 of FIG. 12 with load balance flexibility incorporating at least three pivot points according to an embodiment of the present invention. Roller assembly 902 is illustrated in contact with bottom rail 1401 of the extension boom. The extension boom may come under load pressure that may create load balance differences causing flex in rail 1401 such as a bow. In such a case, roller set frames 1201*a* and 1201*b* may naturally pivot at points 1203*a* and 1203*b* to maximize roller contact and to more evenly distribute the load pressure over the rollers smoothing the mechanics of travel for the extension boom. This reduces wear and will increase the life of the apparatus at large. It is noted that the flex or bow in the opposite rail of the boom may yet be different and the roller set frames on the opposite side, namely 1201*b* and 1201*d* may pivot differently.

Figure 15:
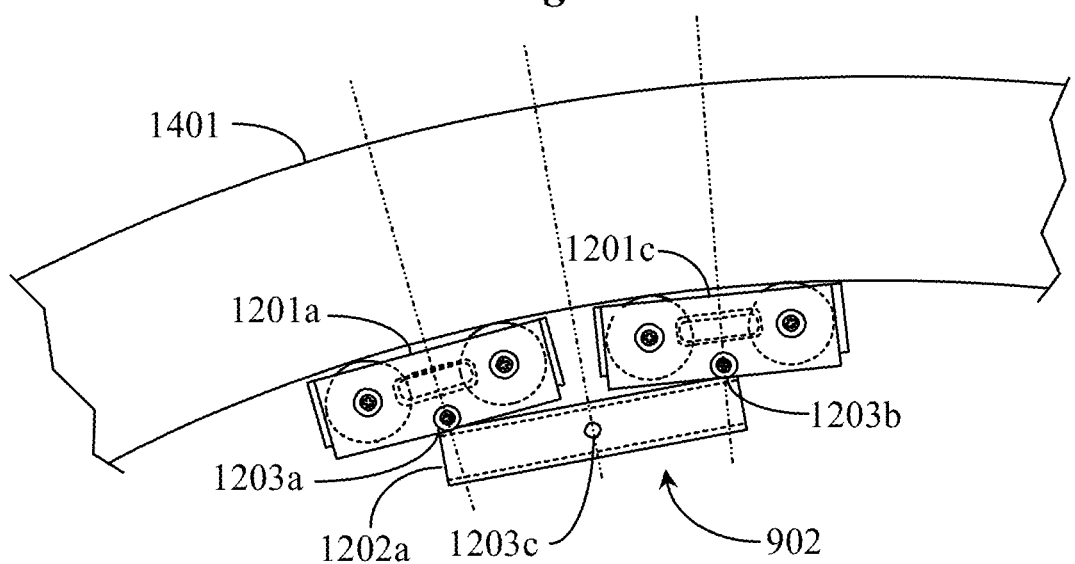
FIG. 15 is an end view of the roller assembly of FIG. 12 with load shift flexibility incorporating three pivot points.

FIG. 15 is an end view of roller assembly 902 of FIG. 12 with load balance flexibility incorporating three pivot points. In this view, roller assembly 902 is pivoted as well at pivot point 1203*c* as well as 1203*a* and 1203*b*. The angle of pivot may be different for roller sets on the opposing side depending upon the rail flex or bow on that side. Position of the extension boom on a roof top, angle of lift, and effects of material loading and transport all contribute to load pressures that may act non-uniformly on the extension boom.

Figure 16:
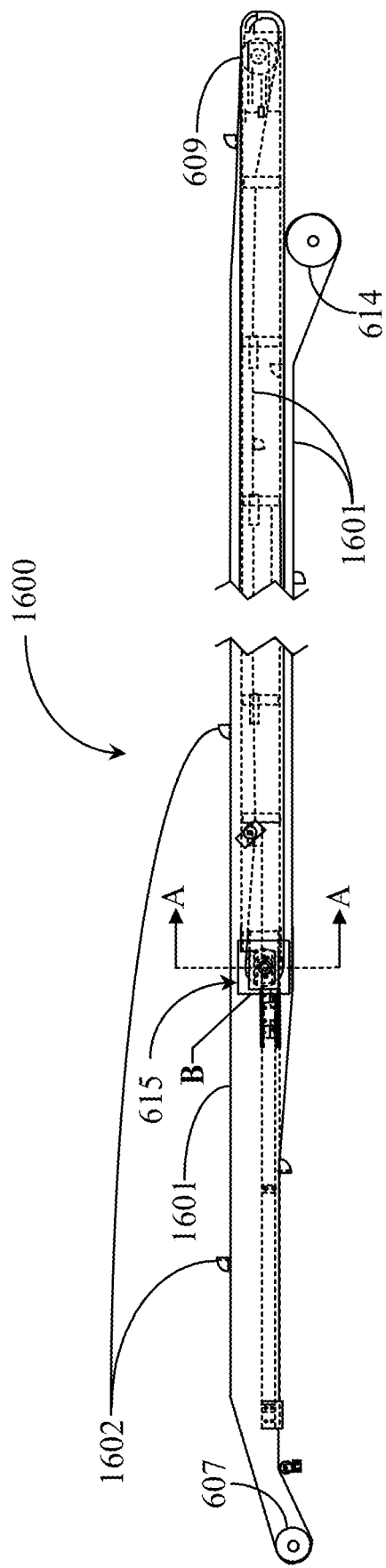
FIG. 16 is a side elevation view of the belt pathway components within the conveyer of FIG. 6 according to an embodiment of the present invention.

FIG. 16 is a side elevation view of belt pathway components 1600 within conveyor 600 of FIG. 6 according to an embodiment of the present invention. Components 1600 include a conveyer belt 1601. Belt 1601 is bounded at the rear of the main boom (boom structure not specifically illustrated) by idler pulley 607 and at the front of the extension boom by idler pulley 609 proximal to the nose loop assembly. Conveyer belt 1601 is doubled over itself to some extent and passes around pass through drum 615 and then back toward the front of the extension boom and around drive drum pulley 614.

Conveyer belt 1601 includes a plurality of material stops that prevent materials such as roofing shingles to slip off of the conveyer. Material stops may also be referred to herein as cleats. In this example drive drum 614 is driven in a clockwise direction to move the conveyer belt forward. The material stops, starting from the drive drum 614, travel about pulley 607 and on top of the booms, about pulley 609 through the nose loop assembly, through the pass through drum and back to the drive drum 614. The exact amount of overlap distance may change as the extension boom is extended and or retracted to certain distances. In typical practice the conveyer is stabilized on the roof top before the conveyer belt is started and material is loaded. Although not detailed in this view, pass through drum 615 includes a roller arrangement that supports conveyer belt 1601 and that enables safe pass through of material stops 1602.

In some case a taller cleat or material stop is needed to deliver goods via conveyor that are taller than average, such as rolls of tar paper, rolls of rolled roofing, taller stacks of materials or insulation. In other cases it is possible for operators to move materials to a roof in a faster manner with a taller cleat as long as safety precautions are taken and load capacity is not exceeded. The inventor has solved this problem with the invention of a fold down cleat or reduced height material stop. Typically the cleat or material stop's height is limited by the clearance that exists as the cleat travels underneath the boom on its way back to the loading (top) side of the conveyor. The inventor has devised a rather clever hybrid cleat or material stop that has the ability to fold down as it travels around the nose loop of the boom maintaining a lower profile while travelling underneath the boom and transitions to a taller cleat as it emerges from the underside of the boom in preparation to take taller and heavier loads.

Figure 26:
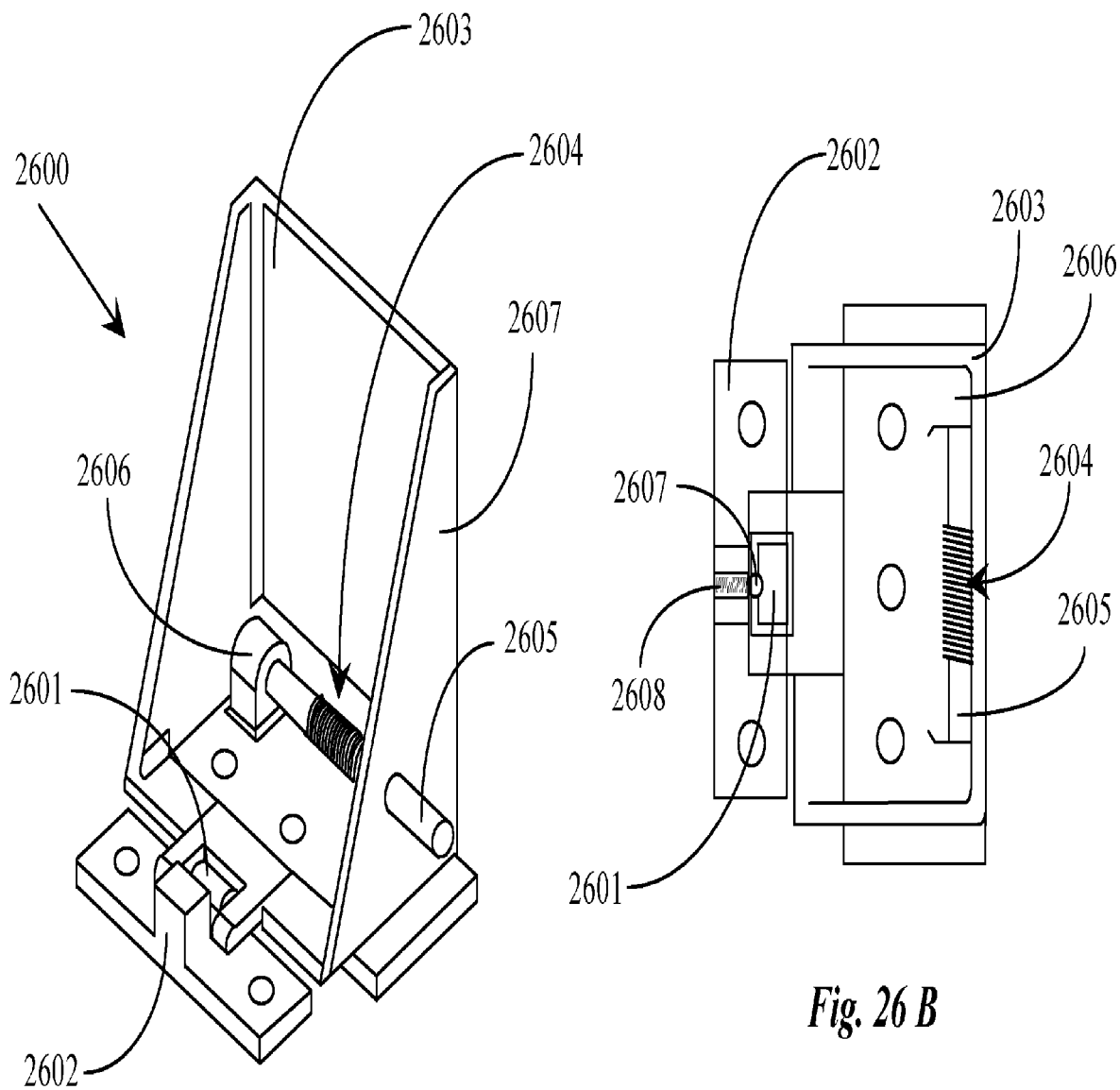
FIG. 26A is a perspective view of a folding cleat according to one embodiment of the present invention.
FIG. 26B is a top view of a folding cleat according to one embodiment of the present invention.

FIG. 26A illustrates such a cleat 2600. Cleat 2600 has the ability to fold down thereby reducing the height as it travels around the end of the boom. To accomplish this cleat 2600 incorporates a shaft 2605 held on one end by a receiver element 2606 while the other side passes through a hole in the side of cleat through cleat side 2607. Inserted during assembly around this shaft is a spring constantly applying pressure sufficient to flip or fold the cleat 90 degrees on its back side 2603 thereby reducing the height while traveling under the conveyor towards the bottom where it will be urged to the upright tall position by a small bar.

Referring to FIGS. 26A and 26B, in normal operation the cleat 2600 is to remain in the upright position being held in place by retaining element 2602. Element 2602 receives a pin 2601 from the folding part of the cleat and retains pin via a spring loaded nub or ball 2607 of FIG. 26B. Materials loaded on the boom against this cleat will naturally exert pressure on the back side 2603 of cleat 2600 insuring the cleat will stay upright during operation.

It should be noted that nub or ball 2607 may incorporate a spring behind it to insure that once the pin 2601 of cleat 2600 is urged into receiver or retaining clip 2602 that it remain in the receiver till appropriate force urges it free from receiver 2602. Once the cleat passes the end of the boom the curvature of belt around the nose drum exerts enough force to pop pin 2601 out of receiver 2602. Once free from receiver 2602 spring 2604 urges the cleat to fold down approximately 90 degrees to a shorter profile for traveling underneath the boom. Once the cleat passes under the boom and begins to make the curvature back to the top of the conveyor a small bar on each side in the proper position catches the top of back side of cleat 2603 forces it up and urges the cleat pin 2601 into receiver 2602.

FIGS. 27A and 27B illustrate a side view of the hybrid cleat that has the ability to rotate 90 degrees and back again. FIG. 27A illustrates the ball, nub or keeper 2707 with the spring 2708 behind it insuring sufficient pressure to retain pin 2701 so that cleat remains in its upright position when clipped in to receiver. Also shown are cleat body 2705, the rod 2705, the spring 2704 on the rod 2705 and the rod keeper 2706.

Figure 17:
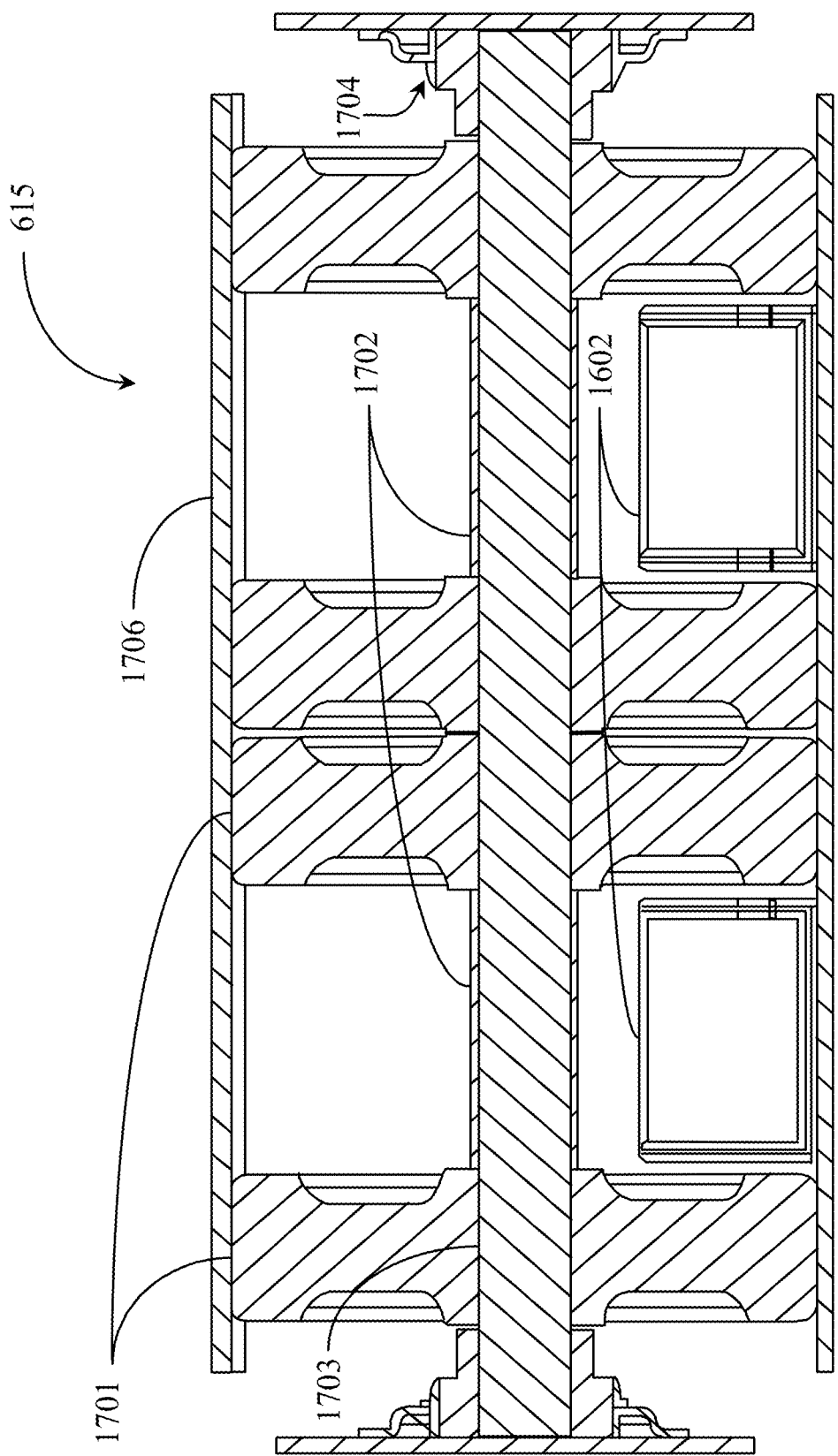
FIG. 17 is a sectioned view of the pass through drum of FIG. 16 taken along section lines A-A

FIG. 17 is a sectioned view of pass through drum 615 of FIG. 16 taken along section lines A-A Pass through drum 615 includes four rollers 1701 mounted onto a roller shaft or axle 1703. Axle 1704 is ratable by way of insert bearings 1704 at both ends of the shaft. In this example, rollers 1701 are spaced apart on shaft 1703 by spacer cylinders 1702 with one roller at each end of shaft 1703 and two rollers 1701 stacked at center. Spacer cylinders 1702 are longer than the width dimension taken across the face of the material stops 1602 providing space for the stops to pass through the drum without making contact with any portion of the conveyer system.

Rollers 1701 may be fabricated of non-conductive composite materials and may be rubberized for traction against conveyer belt 1706. In one embodiment Pass through drum 615 is located at the rear of the extension boom just forward of where the push bar apparatus connects to the extension boom. Connecting the pass through drum to the extension boom at the rear allows for telescopic extension of the extension boom to lengths that would otherwise not be possible. Pass through drum 615 may also be adjusted for belt alignment at its mounting location on the extension boom.

Figure 18A:
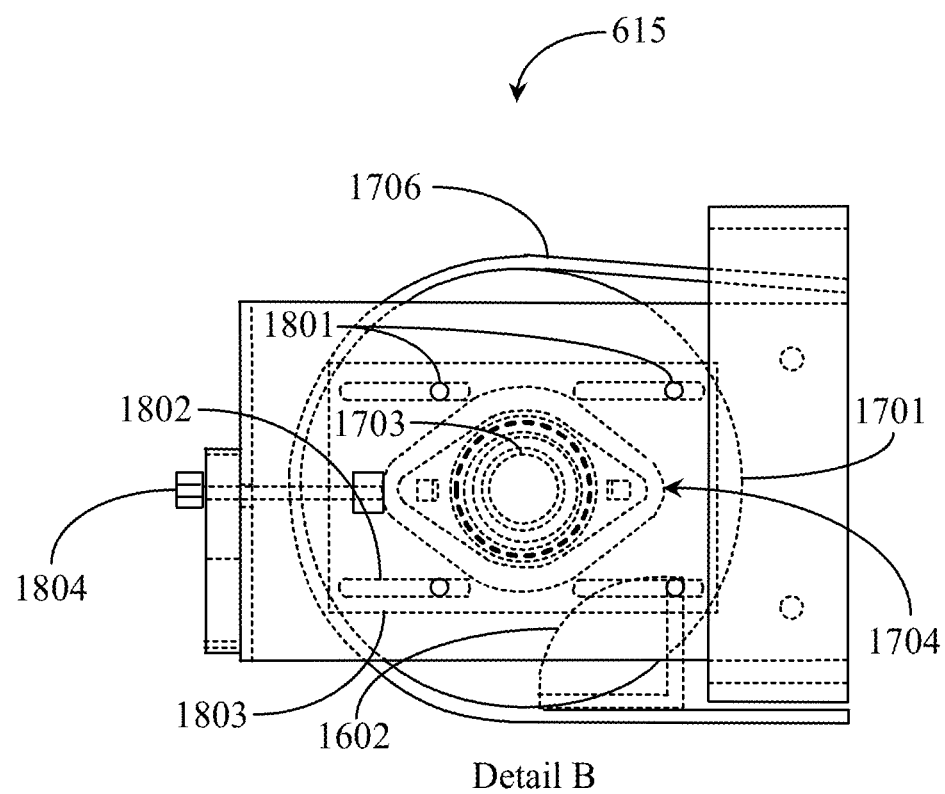
FIG. 18A is an exploded side-elevation view of detail B of FIG. 6 depicting the pass through drum of FIG. 16 according to an embodiment of the present invention.

FIG. 18A is an exploded side-elevation view of detail B of FIG. 6 depicting pass through drum 615 of FIG. 16 according to an embodiment of the present invention. Pass through drum 615 includes adjustment mounting plates 1803 (one per side). Mounting plates 1803 include a pattern of elongate mounting slots 1802 (four slots per plate). Each elongated slot corresponds to a bolt 1801. The 4 Bolts 1801 are tightened to an exacting torque to allow plate 1803 to be tight and yet allow plate 1803 to slide when an adjustment is made via bolt 1804. The bolts 1801 cannot be loosed or tightened without taking off the belt and removing the extension boom. Shaft 1703 is fixedly mounted to adjustment plates 1803. Therefore adjustment of the alignment of the conveyer belt 1706 is accomplished by bolt 1804 which is in contact with axel 1704 and moves said axel when an adjustment is made. These adjustments may be made if necessary before the extension boom is positioned on a roof top and before the conveyer belt is started for material loading and conveyance. Again, to adjust the alignment of the 1706 belt, there is one adjuster bolt 1804 attached to each plate 1803 that moves the 1803 plate forward or backward to align the pulley. The 1801 bolts are always in a somewhat "loose" state to allow this adjustment. Nyloc nuts are needed to keep the bolts in tight yet adjustable state. Nyloc nuts are also referred to nylon-insert lock nut, polymer-insert lock nut, or elastic stop nut. It is a nut with a nylon collar insert that resists turning after adjustment.

Figure 18B:
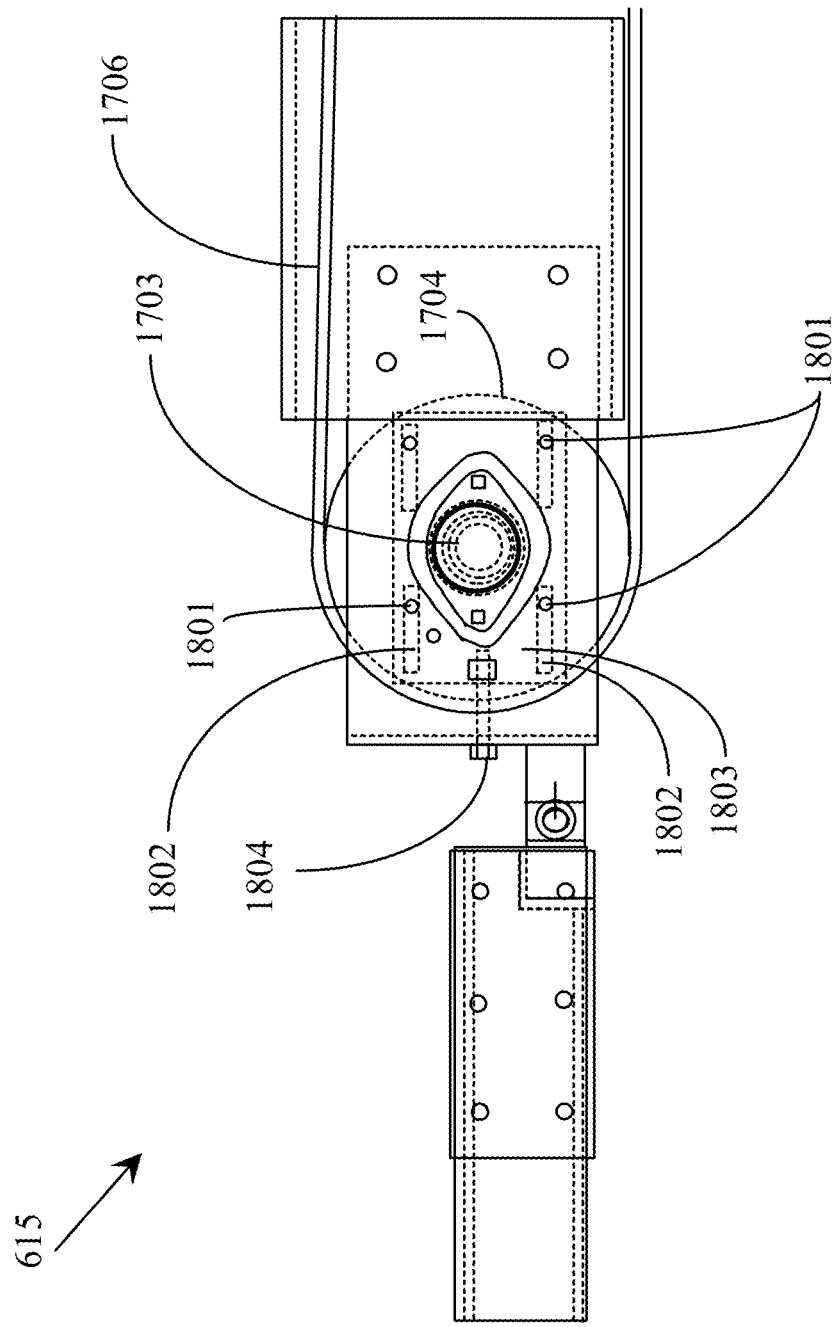
FIG. 18B is an exploded side-elevation view of detail B of FIG. 6 depicting the pass through drum of FIG. 16 according to another embodiment of the present invention

In another embodiment of the present invention FIG. 18B shows a similar adjustment to pass through drum 615. The adjustment of drum 1701 is accomplished in the same way as FIG. 18A. Bolt 1804 is adjusted by pressing on axel 1704 which is attached to plates 1803 which are tightened with just enough force via bolts 1801 and Nyloc nuts to slide to the desired adjustment without loosening after the desired adjustment is made.

Figure 19:
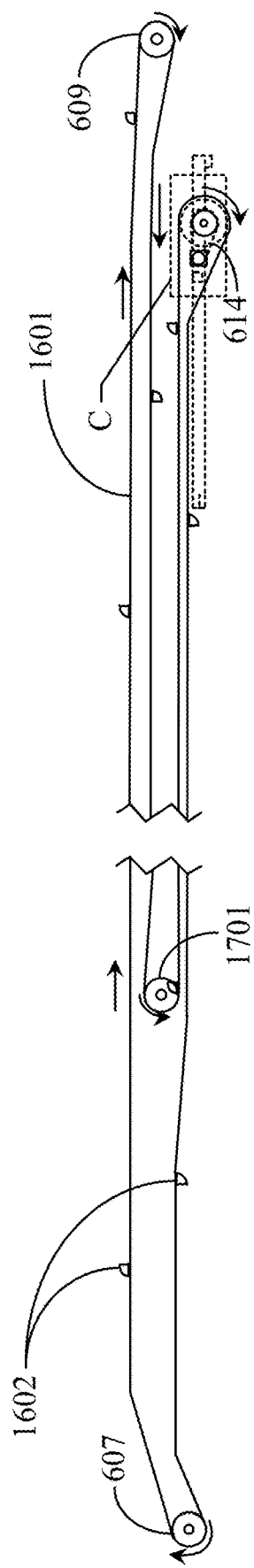
FIG. 19 is a side elevation view of the belt support apparatus of the conveyer system of FIG. 6.

FIG. 19 is a side elevation view of the belt support apparatus of the conveyer system of FIG. 6. Conveyer belt 1601 is driven by drive drum 614 located below the extension boom and behind the pulley 609 at the nose loop assembly. The drive drum roller is somewhat larger than other rollers in the system up to twelve inches in diameter. They may be rubberized for traction with belt 1601. When the extension boom is extended and supported on a rooftop, a remote control may be used to start the drive drum, which has a short chain drive connection to a hydraulic motor shaft having a drive sprocket affixed thereto as revealed by detail C of the drive drum further below.

Material stops 1602 are fastened to conveyer belt 1601 and act to prevent material slippage. In this embodiment, drive drum is rotating in a clockwise direction to bring materials to a rooftop. It also operates in reverse to bring materials down from the rooftop. Belt 1601 is functional and remains operational relative to extension and retraction of the extension boom. Tensioning of the belt may be performed at drum (607).

Figure 20:
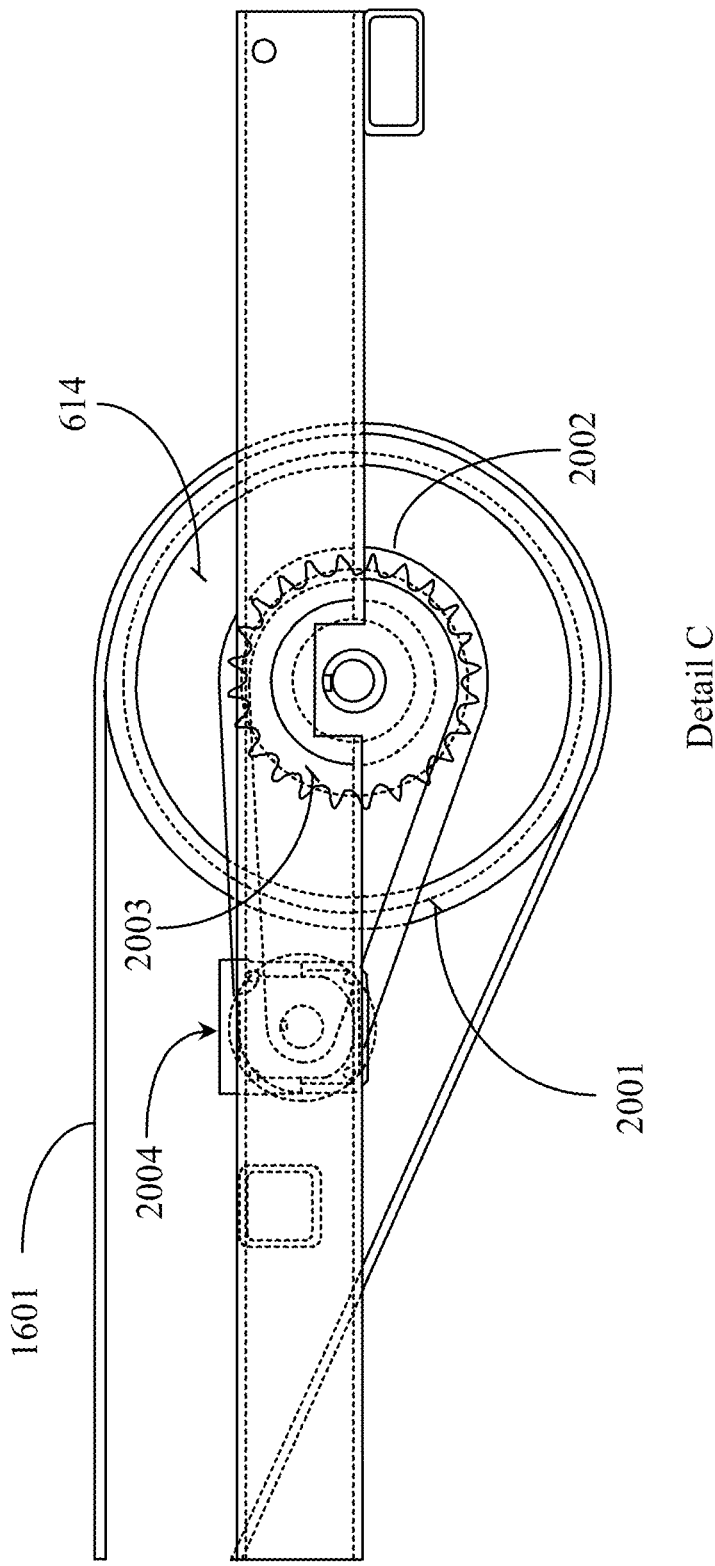
FIG. 20 is an exploded side-elevation view of detail C of FIG. 19 depicting the drive drum of FIG. 19 according to an embodiment of the present invention.

FIG. 20 is an exploded side-elevation view of detail C of FIG. 19 depicting the drive drum of FIG. 19 according to an embodiment of the present invention. Detail C depicts drive drum 614 having a fixed chain sprocket 2003. A relatively short drive chain 2002 is provided and connects the drive drum to a drive axle and sprocket 2004 powered by a hydraulic motor. In this embodiment, drive drum wheel 614 may be rubberized with rubber material 2001 to maximize traction and reduce friction between the belt and the wheel. Drive drum 614 may be crafted from durable steel for strength.

Figure 21:
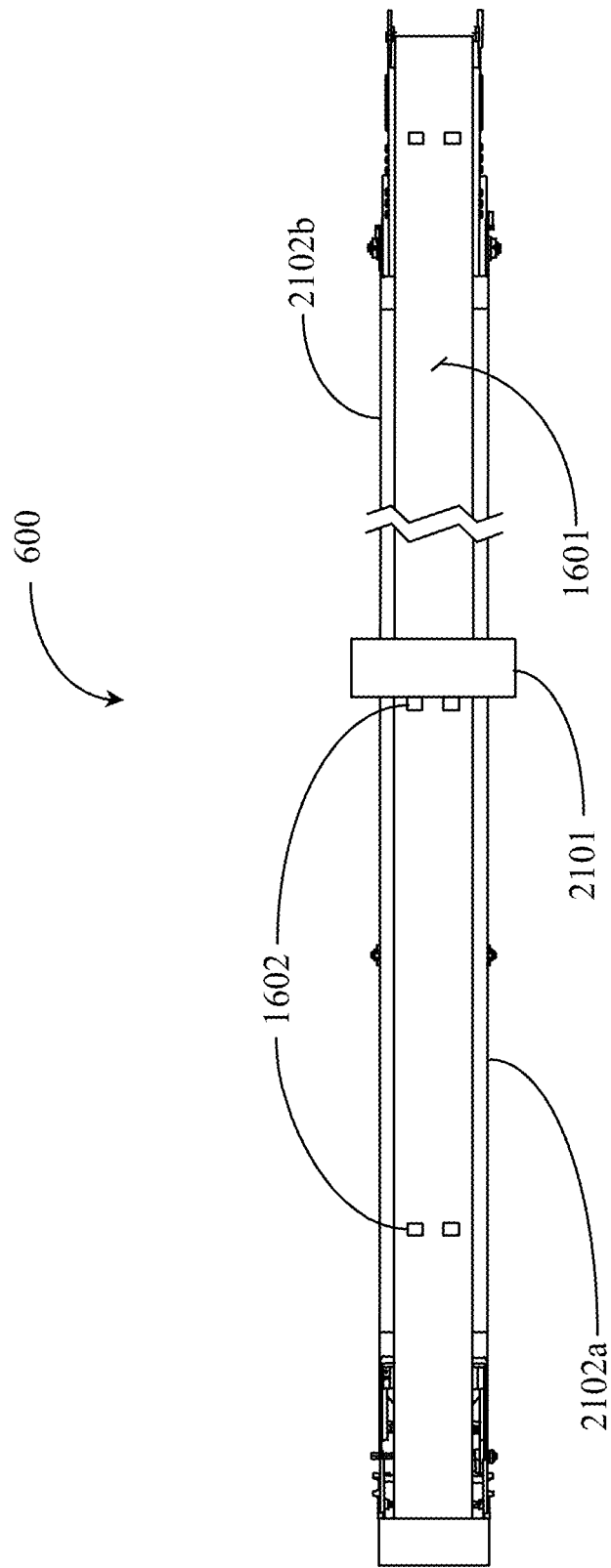
FIG. 21 is an overhead view of the of the conveyer system of FIG. 6 depicting the belt with a load according to an embodiment of the present invention.

FIG. 21 is an overhead view of the of conveyer system 600 of FIG. 6 depicting the belt with a material load according to an embodiment of the present invention. Conveyer system 600 depicts conveyer belt 1601 and material stops 1602 conveying a material load 2101 such as one or more bundles of roofing shingles for example. In general material loads such as shingle load 2101 may rub on the top rails of the boom structure along with the belt underneath causing friction wear on the boom rails.

In this embodiment, elongate friction rails 2102a and 2102b are provided and adapted to mount to specified cross members of the conveyer system and to extend over the top of the fiberglass rails of the conveyer system main boom. Similar friction rails may be provided on the extension boom without departing from the spirit and scope of the present invention.

Friction rails may be fabricated from a non-composite and non-conductive material having a low abrasive property such as fiberglass, Delron or another similar polymer. Of importance to protect is the radius at the outward edges of the conveyer boom(s). Friction rails 2102a and 2102b conform somewhat to those radii along the boom edges and protect them from being nicked, gouged, or otherwise worn down.

Figure 22:
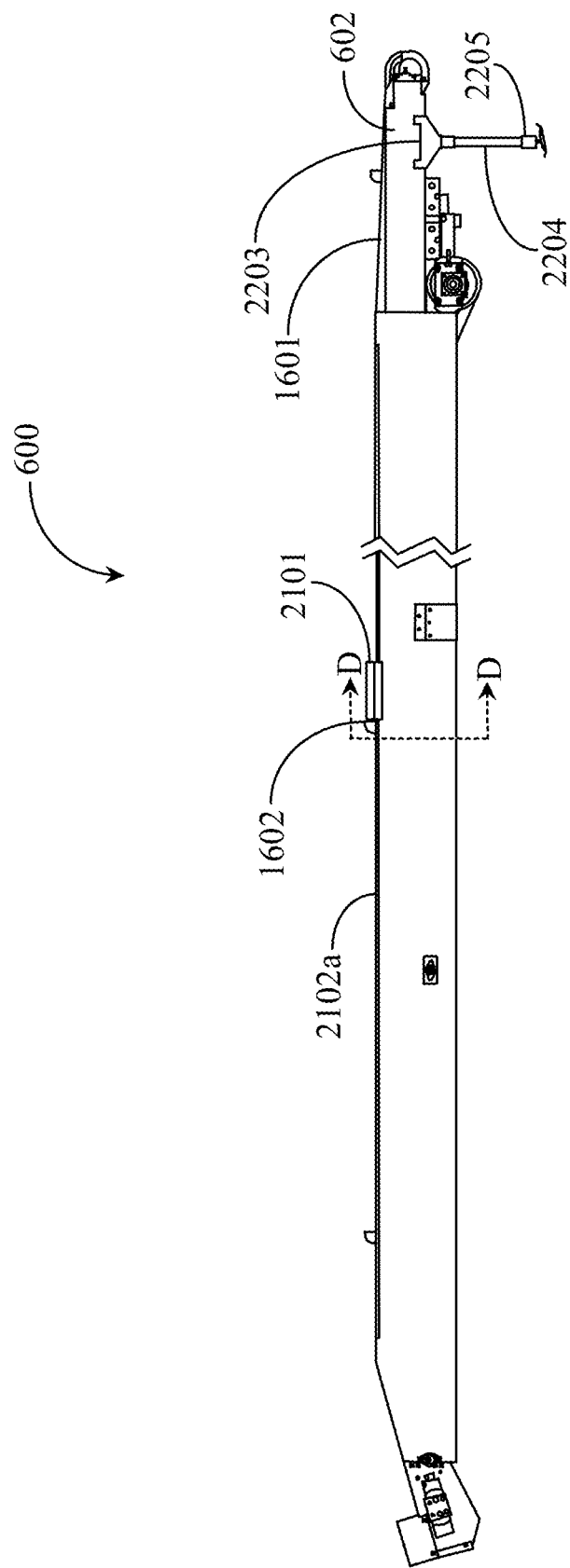
FIG. 22 is a side elevation view of the conveyor system of FIG. 6 depicting a load softening support leg according to an embodiment of the present invention.

FIG. 22 is a side elevation view of the conveyor system 600 of FIG. 6 depicting a load softening support leg 2204 according to an embodiment of the present invention. Support leg 2204 is fastened to the underside of extension boom 602 via a base fixture 2203. Fixture 2203 may be a seating fixture enabling support led 2204 to be removably attached the extension boom in order to rest the extension boom against the rooftop. Support leg 2204 includes a swivel support foot 2205. Support foot 2205 may include a ball pivot mechanism at the base of support foot 2205 to enable foot 2205 to pivot to assume the angle of the rooftop. The ability of support foot 2205 to conform to the pitch angle on a rooftop may reduce slippage of the support leg and extension boom such as when the boom is presented at different angle relative to the pitch of the roof Support leg may, in one embodiment, have shock absorbing properties such as a gas shock, hydraulic shock, or spring shock capabilities. In one embodiment, support leg 2205 is telescopic and may be adjusted to a longer or shorter length. Support leg 2204 functions to stabilize extension boom 602 on a rooftop and reduces load on the conveyor, as well as the lift cylinder used to raise and lower the main boom.

Figure 23:
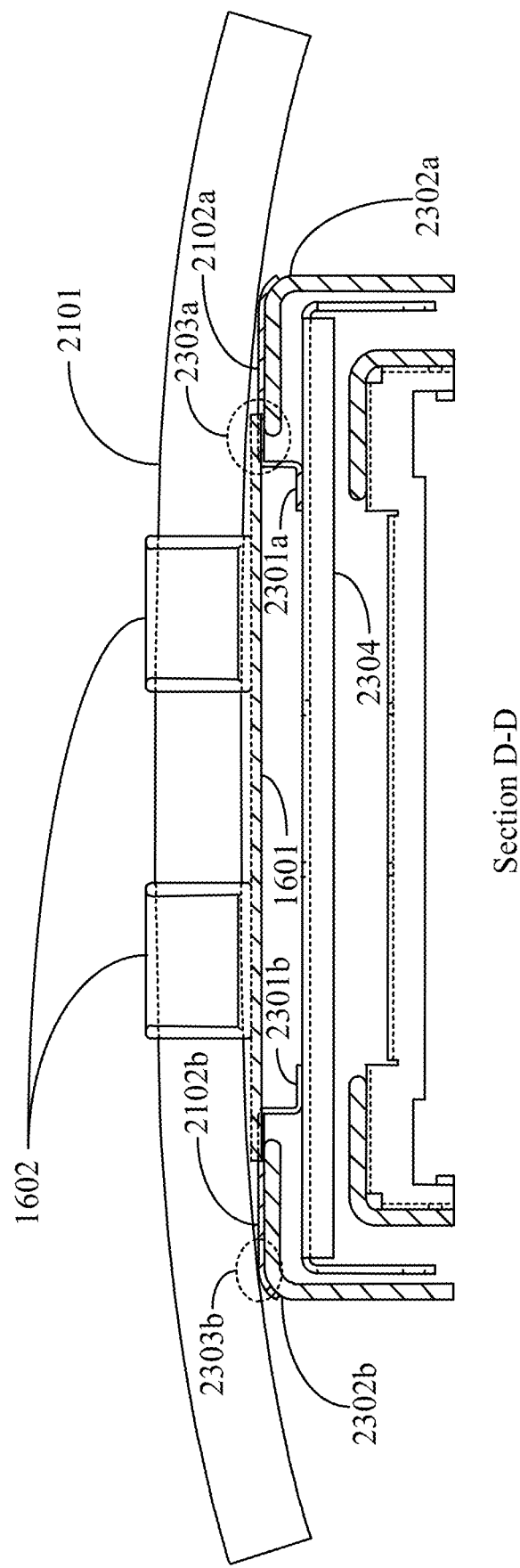
FIG. 23 is a sectioned view of the belt and belt support structure of the conveyor system of FIG. 22 take along section lines D-D.

FIG. 23 is a sectioned view of the belt and belt support structure of the conveyor system of FIG. 22 take along section lines D-D. In this view conveyer belt 1601 makes frictional contact with friction rails 2102a and 2102b referenced by friction point 2303a. Material load 2101 overlaps the conveyer edges and rubs against friction rails 2102a and 2102b referenced by friction point 2303b. As the belt moves along, material load 2101 rubs against the friction rails where they overlap the radii of the boom side rails referenced herein as rails 2302a and 2302b.

Friction rails 2102a and 2102b have a mounting edge formed on one side of the rail opposite the radiused edge resulting in a Z-type configuration that includes the height required to extend up and over the boom side-rails. The rails are mounted to boom frame cross members (main, extension). The rails are formed to rise vertically and then to extend out horizontally from the inside edge of the boom rails over the top surfaces and at least partly down the outer side of the boom housing just above the cross members. The wear rails are mounted at one edge to a plurality of cross members of the main extension boom and wherein the rails are formed to rise vertically and then extend horizontally from the inside edge over the top surfaces and at least partly down the outer side of the boom housing just above the cross members. Friction rails 2102a and 2102b are removable and replaceable. Friction rails 2102a and 2102b reduce wear on the conveyer belt edges due to low abrasive rating of the material used. The friction rails also reduce wear on the boom side rails, specifically where material loads contact them, typically at the edge of the conveyer booms on both sides.

Figure 24:
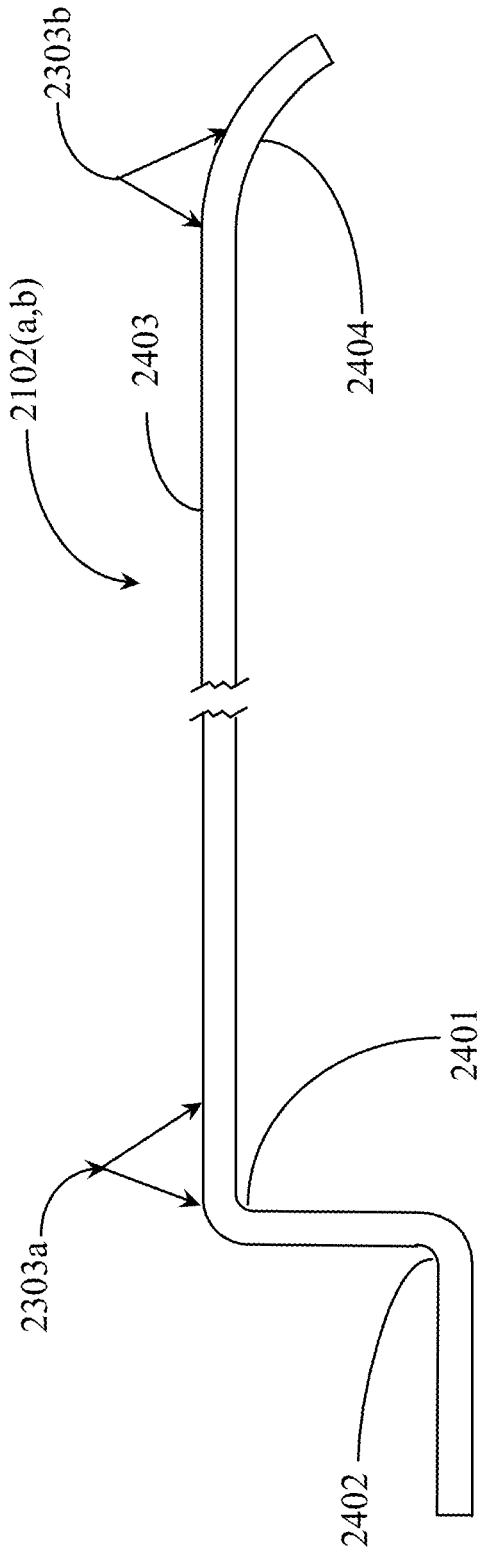
FIG. 24 is a side elevation view of a wear plate of FIG. 23.

FIG. 24 is a front elevation view of friction rail 2102 (A, B) of FIG. 23. Friction rail 2102 (A, B) includes a radius 2404 turning downward at one end and that sits over the radius edges of the main and extension boom side rails. The upper flat portion 2403 of rail 2102 (A, B) rests on the top of the boom rail. A vertical portion 2401 of the Z configuration provides extension of the rail down to a mounting flat 2402, which may be attached via snap, bolt or other method to the boom frame cross members. Wear on the friction rail from the conveyer belt occurs in area 2303a where the conveyer belt makes contact with the friction rail. Wear on the friction rail from a material load occurs in area 2303b protecting the underlying boom rail from material load contact. Friction rails may be machined in one embodiment from non-abrasive and nonconductive materials. In another embodiment, friction rails may be molded in segments and mounted linearly along the boom frame structure at the cross members.

Figure 25:
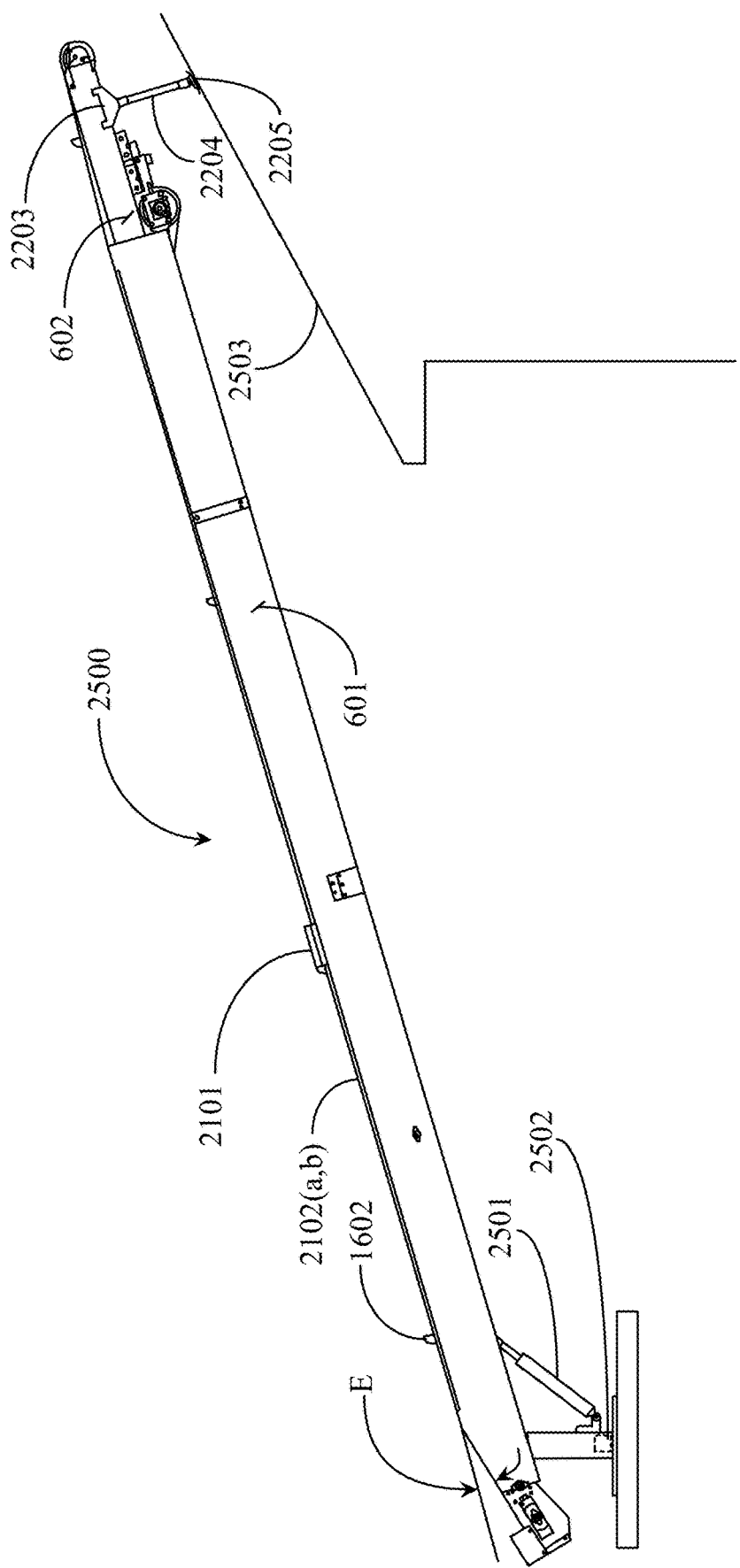
FIG. 25 is a side elevation view of the telescopic boom conveyer system of FIG. 6 connected to a turn table and positioned on a rooftop according to an embodiment of the present invention.

FIG. 25 is a side elevation view of the telescopic boom conveyer system of FIG. 6 connected to a turn table and positioned on a rooftop according to an embodiment of the present invention. Conveyer 2500 is analogous to conveyer 600 of FIG. 6 with supporting hardware added in this view for discussion. In this view the conveyer system is depicted positioned on a rooftop 2503 with the implementation of conveyer support leg 2201. The main boom of the conveyer system is connected to a saddle frame, which in turn is supported by a turntable and lift cylinder 2501 in order to attain the proper angles and lift to reach the rooftop.

Without support leg 2201, the entire load including material load pressure is focused on the lift cylinder. An electronic load sensor 2502 is provided to sense the amount of load on lift cylinder 2501. Load sensor 2502 may be programmed to shut off the hydraulic motor that powers the drive drum and conveyer belt when a specified threshold of load on the lift cylinder is reached during operation. Use of support leg 2201 functions to lower the amount of load sensed at load sensor 2502. However, if the support leg is not employed and the load sensed surpasses the threshold, the conveyer belt drive drum automatically shuts down and the belt cannot be powered on manually or with a remote control until the support leg is functioning and the load is distributed. The rear portion of main boom 601 has a taper down E of approximately 15 degrees. In this way the height requirement for loading materials to be conveyed onto roof 2503 is lowered requiring less work to load the materials.

Collapsible Conveyor Hand Rail System

The inventor provides apparatus and installation hardware and mechanisms to support the ability of a user to traverse a conveyor at incline from the ground level to a roof top by way of a collapsible hand rail system that may be erected when required to provide a stable hand rail to support a user walking up the conveyor to the roof top and lowered when the hand rail is no longer required to support a user traversing the conveyor to the roof top. All discussions concerning rails for this conveyor rail invention are intended to be railings for both sides of the belt of the conveyor thereby providing a handhold for a user traversing the belt from bottom to top or from top to bottom.

Figure 29:
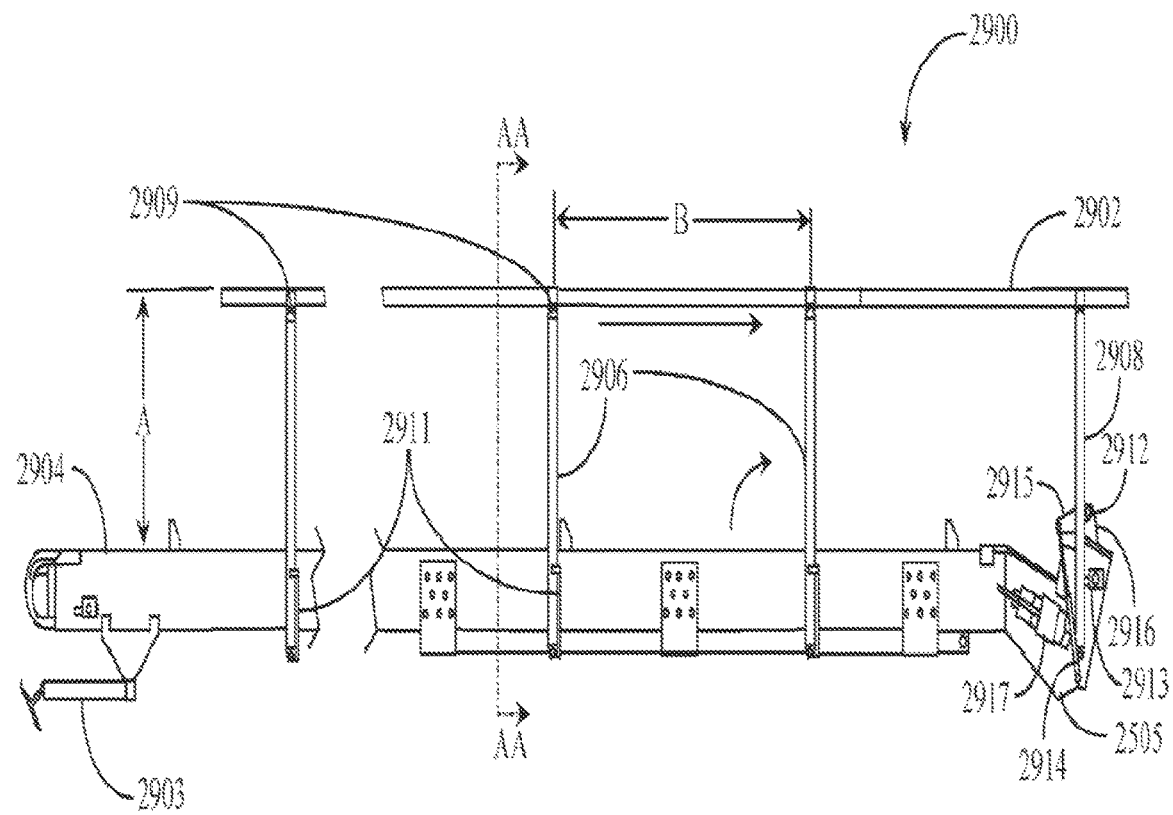
FIG. 29 is a side elevation view of a conveyor supporting a hand rail system according to an embodiment of the present invention.

FIG. 29 is a side elevation view of a conveyor 2901 supporting a hand rail apparatus 2900 according to an embodiment of the present invention. Hand rail apparatus 2900 comprises a left hand rail apparatus and a right hand rail apparatus aggregated under the element number 2900 (right apparatus not visible). Each hand rail apparatus includes a horizontal hand rail 2902 that is supported in an elevated plane by a number of rail posts 2906 and a rear rail post 2908.

Rail posts 2906 may be fabricated from durable nonconductive materials in a preferred embodiment to reduce chance of electricity from any unsafe power source or from lightning traversing into and down the rail. One example of a material that might be used to fabricate hand rail apparatus 2900 is nonconductive material poly-2, 2'-(m-phenylene)-5, 5'-bibenzimidazole trade name Celazole. Delron or other durable polymers may be used. Plastics may be reinforced with metal such as mild steel without departing from the spirit and scope of the present invention.

Hand rail apparatus 2900 includes a plurality of post mounting brackets 2911 (one per rail post) Rail post mounting brackets 2911 are fabricated from a nonconductive material in one embodiment. Post mounting brackets 2911 may be fabricated from nonconductive material(s) or from a low conductive metal(s) such as mild steel, which may be coated with a nonconductive material(s) to reduce any conductive characteristics. Mounting brackets 2911 provide the seats for vertical rail posts 2906. Each vertical rail post

2906 and rear rail post 2908 has a ratable connection to rail 2902 via a clevis/yoke interface 2909. The ratable clevis/yoke interface 2909 enables vertical rail post 2906 to rotate about a clevis axle by virtue of a pinned yoke attached to both upper and lower ends of each rail post. Clevis interface 2909 enables hand rail post 2906 and rear rail post 2908 to pivot out of an orthogonal relationship with rail 2902 in either direction of pivot.

Vertical rail post brackets 2911 include a dowel shaft to pivotally seat each rail post 2906 by way of yokes attached to the ends of the posts. A larger view of 2911 can be seen in FIG. 38. A feature of rail post bracket 2911 is a cradle stop feature formed into or otherwise machined on bracket 2911 for seating posts 2906 in an upright position and preventing them from pivoting from an orthogonal relationship with rail 2902 in one direction. It is noted herein that rear rail post 2908 is stopped in vertical position via a same cradle stop feature on a rear rail post mounting bracket 2916. In this embodiment, the rear rail post 2908 functions as a driver post that is locked to the rear rail post bracket 2916 to erect and lock hand rail apparatus 2900 in an upright and vertical position.

The height between the surface of the conveyor belt to the top of hand rail 2902, represented herein as dimension A, may be approximately 33 inches high or there about. In one embodiment the height of the vertical rail presentation may be adjustable at each post. The length between vertical rail posts 2906, represented herein as dimension B, may be approximately 60 inches or there about.

Rear post 2908 includes a lock ring tab 2912 that may be aligned with an opening on rear post mounting bracket 2916. At least at the catch interface the mounting bracket may be double walled to enable tab 2912 to be brought in between and in alignment with opposing openings designed to accept a plunger pin (not illustrated) mounted in a spring loaded manner within a plunger housing, the plunger pin hand operated to catch and to hold the rear driver post 2908 in a vertical position, and to release the rear post 2908 when urging the hand rail apparatus down to a shelved position.

Rear rail post 2908 also includes a shock attachment fin 2915 having an opening and appropriate retaining hardware for attaching and retaining the upper end of a mechanical gas shock 2914. Gas shock 2914 may be a charged gas shock absorber that may aid a user by countering the force of gravity pursuant to the weight of hand rail apparatus 2900 when a user is operating it, for example, manually erecting same or collapsing same into a shelved position. In this view, hand rail apparatus 2900 is erected to a vertical position according to the direction of the arrows and locked at the rear bracket so it may be ready for use.

In this embodiment, the inventor provides a hydraulic on/off kill switch connected by electric wire to the hydraulic line to the belt drive motor of conveyor 2901 and mounted onto the rear rail post mounting bracket 2916 in a position to be abutted against by the rear rail post whenever it is in a vertical position. A center mounted plunger may be provided within a housing in a spring loaded manner such that when the post is brought up sufficiently vertical, the plunger is displaced to the point where the hydraulics are disabled preventing the motor from being started again while the hand rail apparatus 2900 is fully erected. Rail apparatus 2900 is held or retained in vertical position by pinning the rear post to the rear bracket at ground level. The brackets provide additional cradle support for the posts holding them such that they do not slip out or off the brackets.

Rail post mounting brackets 2911 are mounted to the outer side panel housing of conveyor 2901 and to the lower boom side rails as depicted. Each rail apparatus 2900 is functionally independent of the other. For example, the left side apparatus may be operated independently of the right side apparatus. Conveyor 2901 includes a rear portion of the conveyor 2905 that sits at ground level such as in the back of a truck on a turret. A front portion 2904 of conveyor 2901 is the portion of the conveyor that is positioned onto a roof top using a height adjustable conveyor foot 2903.

Figure 30:
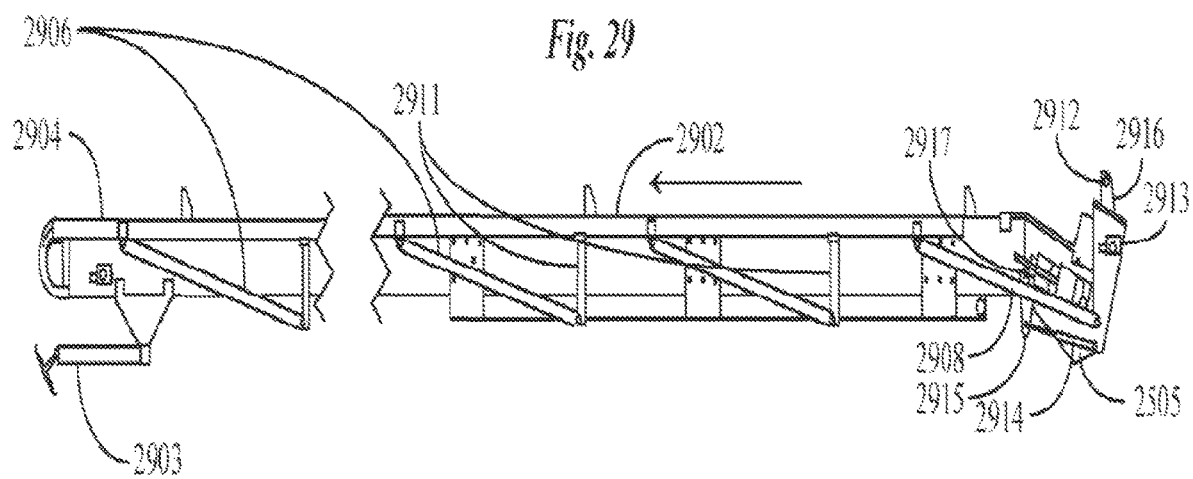
FIG. 30 is a side elevation view of the conveyor and hand rail system of FIG. 29 depicting the hand rail system urged down into a shelved position.

FIG. 30 is a side elevation view of conveyor 2901 and hand rail system 2900 of FIG. 29 depicting hand rail system 2900 urged down into a shelved position. In this view, hand rail apparatus 2900 is urged down onto a shelved created by the top surfaces of the rail post mounting brackets 2911. In this process, hand rail apparatus 2900 is unpinned from rear mounting bracket 2916 at the lock tab 2912 on the rear hand rail post 2908. The user may simply push the apparatus forward and down according to the directional arrows until the rail 2902 is laying flush on the top surfaces of mounting brackets 2911.

Gas shock 2914 is pivotally mounted onto the bottom portion of the rear post mounting bracket 2916 and may provide a sufficient resistive force to counteract gravity of the rail apparatus so that a user does not slip or fall into the apparatus while attempting to shelve it. The user may provide just enough force to counteract and overcome the gas shock resistive force to hold the apparatus vertical. In one embodiment the resistive force of the gas shock may be varied according to the weight of the hand rail apparatus and or according to a preference. A gas shock like gas shock 2914 may have three force positions such as maximum, medium, and minimal. In one embodiment one gas shock of a rated value may be swapped for another of a higher or lower rated value.

The rails 2902 lie on a shelf created by the collective top surfaces of the post mounting brackets 2911. In one embodiment there may be a catch and lock mechanism on mounting brackets 2911 that may be positioned to lock rail 2902 down against the bracket top shelf such that a user may not lift it without first unlocking it from the shelved position. In one embodiment a lever/catch locking mechanism like a pressure clamp might be provided at each bracket such that operating the lever latched to a rail retaining mechanism may cause the retaining mechanism such as a hook, for example, to be forced down over rail 2902.

Figure 31:
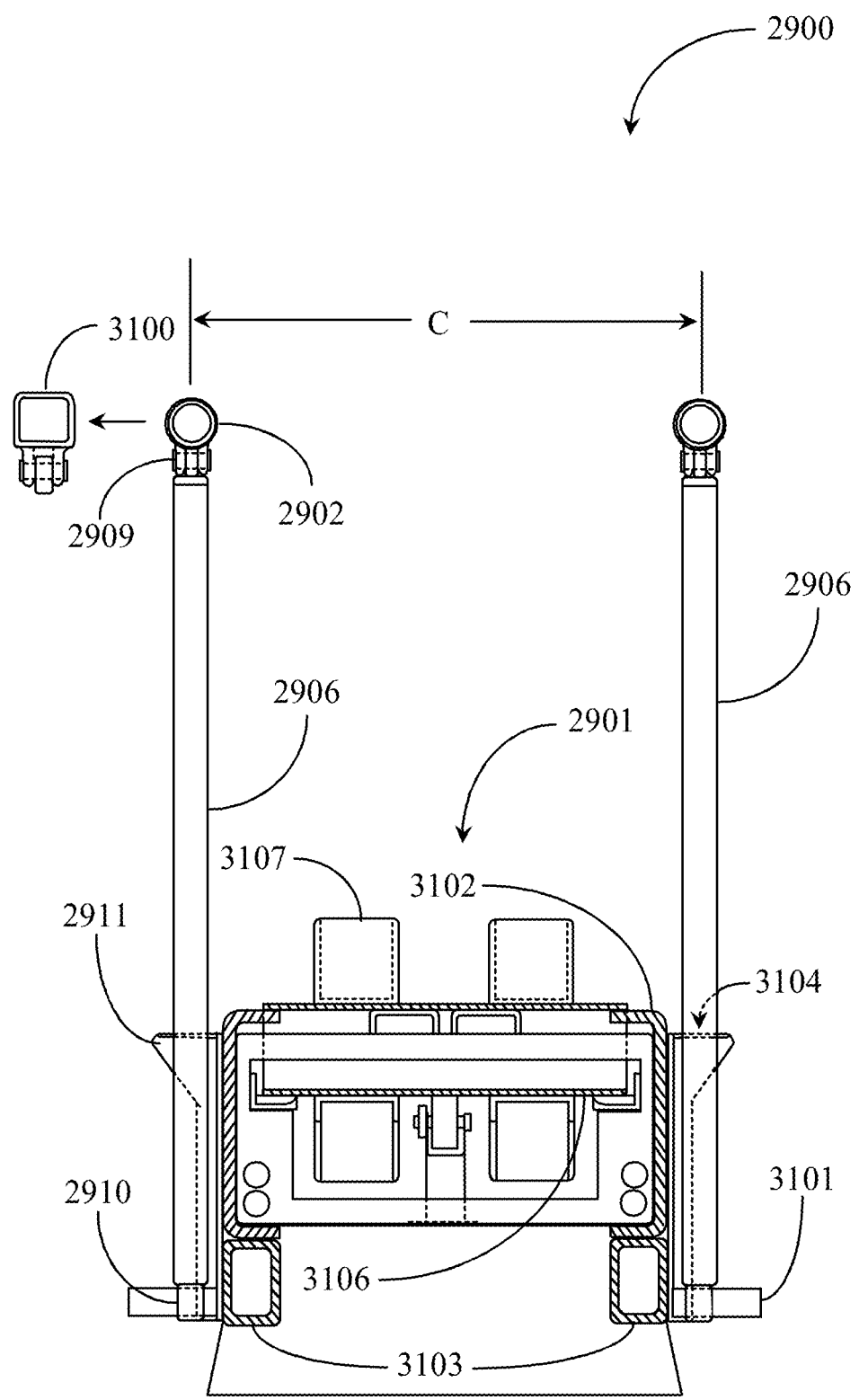
FIG. 31 is a section view of the conveyor and handrail system of FIG. 29 taken along the section line AA
Figure 38:
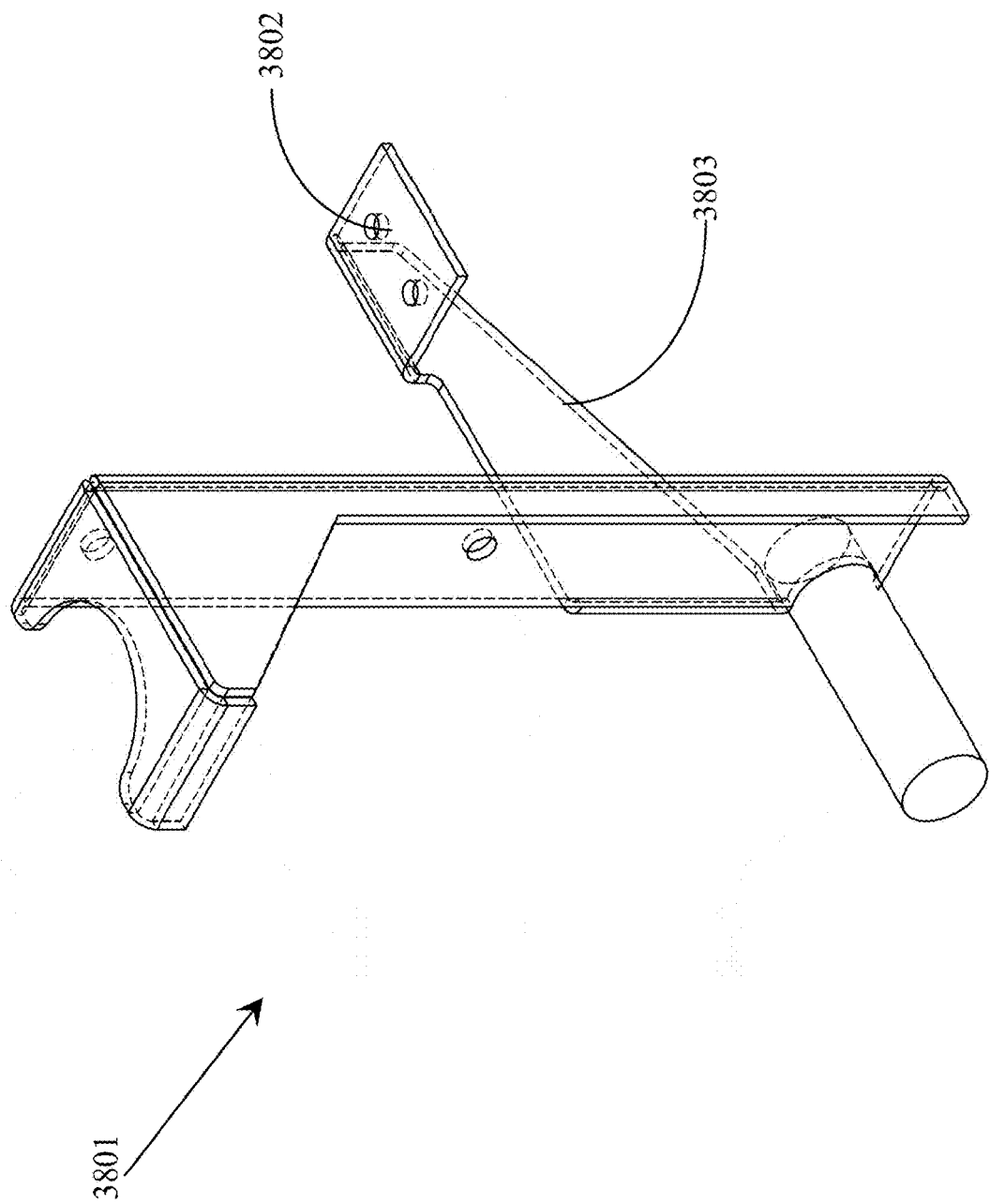
FIG. 38 is an elevation view of the post support, attachment mechanism and pin.

FIG. 31 is a section view of conveyor 2901 and handrail apparatus 2900 of FIG. 29 taken along the section line AA Hand rail apparatus 2900 is in a fully erected and locked state in this example. Section view AA is viewed from the perspective of the front of conveyor 2901. Rail post mounting bracket 2911 includes a dowel shaft 3101 that has an outside diameter just smaller that the inside diameter of yoke 2910 at the bottom of post 2906. A groove and retaining clip may be provided on dowel shaft 3101 to retain yoke 2910 in alignment with a post stop cradle 3104 in bracket 2911. Mounting bracket 2911 may include one or more additional appendages to reinforce mounting or to provide one or more additional mounting interfaces as required for different model conveyors where mounting surfaces may not be identical. For example, brackets 2911 may include an appendage with a mounting interface wherein the appendage mounts to one or more cross bars of the conveyor as seen in FIG. 38 element 3803. Such an appendage is not specifically required in order to enable practice of the invention, but may provide a measure of reinforcement to the bracket mounting and therefore post seats of the hand rail apparatus.

In one embodiment rail post 2906 is round stock and therefore cradle 2911 is a radius cut feature of approximately one half the diameter of the round stock. In an embodiment where rail post 2906 may be rectangular or typically, square stock, cradle 2911 may also be a rectangular or square cut out with slightly larger inside to inside dimensions than the out-side dimension of the vertical post. In one embodiment hand rail 2902 is round fiberglass pultruded tubing having approximately a one quarter inch wall thickness. In another embodiment, the hand rail material may be square stock pultruded fiberglass tubing one two inches square and having a one quarter inch wall thickness.

Conveyor 2901 includes conveyor belt deck 3106 supporting material stops 3107 analogous to components depicted in FIG. 2 of the specification incorporated herein at least by reference. A dimension C between opposing vertical posts 2906 may be approximately 40 inches or so. In a preferred embodiment, a user may walk up conveyor 2901 while gripping on the left and the right handrails 2902. In this embodiment, rail post mounting brackets 2911 are mounted directly to the side panels 3102, and side rails 3103. There is a left post bracket and a right post bracket. Post cradles 3104 are facing away from the viewer.

Figure 32A:
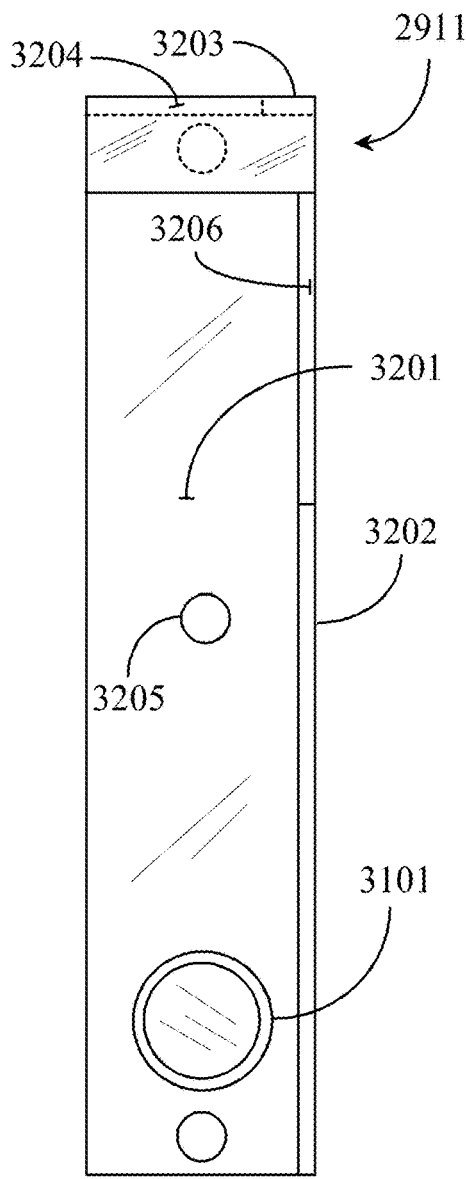
FIG. 32A is an elevation view of a post mounting bracket according to an embodiment of the invention.

FIG. 32A is an elevation view of post mounting bracket 2911 of FIG. 29 according to an embodiment of the invention. Post mounting brackets 2911 may be formed from mildly conductive sheet metals or from durable non-conductive materials. Bracket 2911 may be mounted directly to the side of a conveyor through mounting holes 3205 placed through bracket mounting face 3201. There are three mounting holes, 3205, depicted in this view. More than three or fewer than three mounting holes may be provided in one embodiment without departing from the spirit and scope of the invention.

Mounting bracket 2911 includes a back wall 3202 that presents orthogonally from the side mounting surface of the conveyor. The height dimension of wall 3202 is held approximately to an inch or so to a point where the wall rises at an angle of approximately 45 degrees to near full width of the bracket as depicted herein by element number 3206 depicting the angled section of wall 3202. Cradle 3204 is machined through top plate 3203. From the perspective of this view which, is at the left of the conveyor, mounting bracket 2911 is depicted herein as a left side bracket.

Figure 32B:
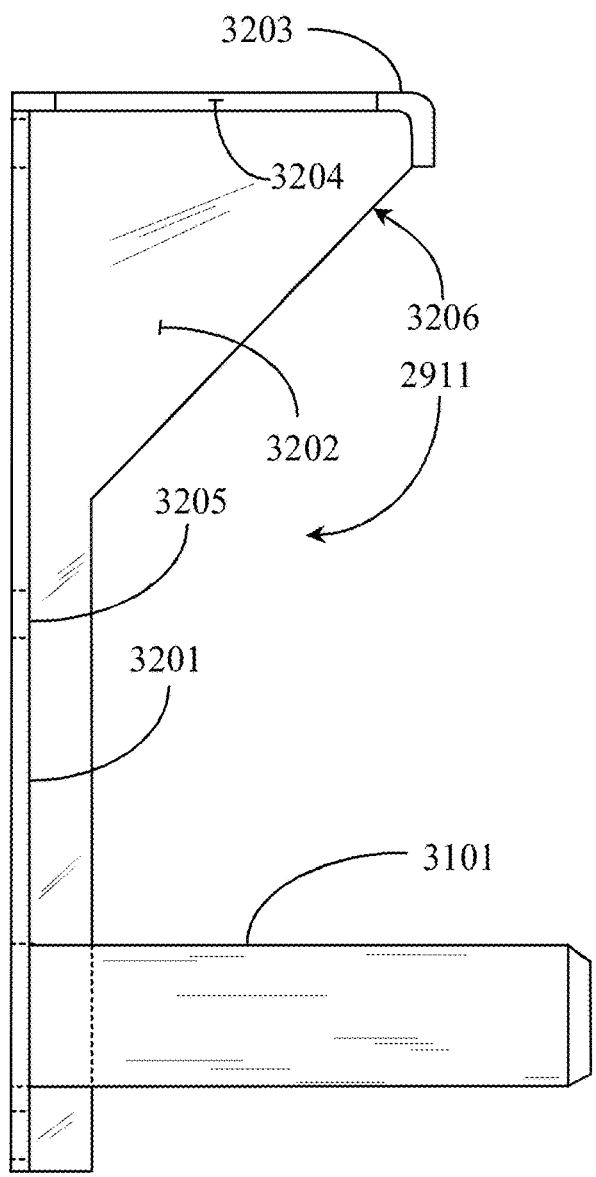
FIG. 32B is a left side elevation view of the bracket of FIG. 32A.

FIG. 32B is a left side elevation view of the bracket of FIG. 32A. Dowel shaft 3101 may be welded to bracket 2911, more particularly to mounting face 3201, using a fixture to ensure perpendicularity tolerances. An opening may be provided through mounting face 3201 of a diameter sufficient to accept the diameter of shaft 3101.

In one embodiment shaft 3101 may be bolted onto mounting face 3201 through the rear by way of a bolt opening provided in the mounting face at an appropriate x/y coordinate that is in alignment with the center of the stop cradle 3204. In this example, the view perspective is from the roof end of the conveyor. The open side of post cradle stop 3204 faces the roof top. One reason is that the conveyor presents at an angle when pivoted onto a roof This allows a user to use less force pulling each hand rail apparatus up and locking said apparatus. Moreover, a user will be walking up the incline of the conveyor to a roof and will be pulling on the hand rails as they walk up. Therefore, the post stop cradles face in the direction of the roof top.

Figure 32C:
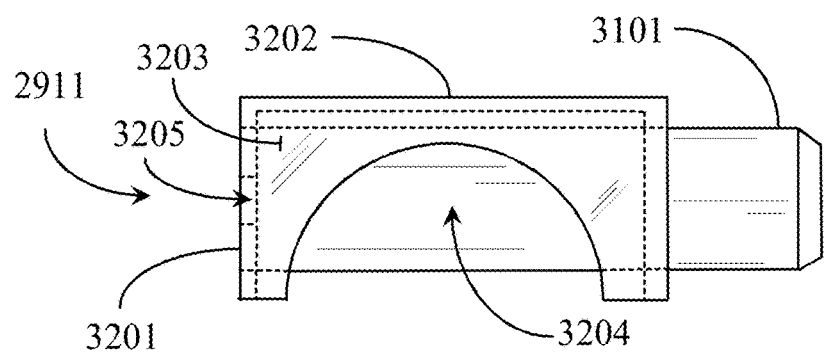
FIG. 32C is an overhead view of the bracket of FIG. 32A.

FIG. 32C is an overhead view of bracket 2911 of FIG. 32A. In this view, rail shelf surface 3203 is depicted at the top of bracket 2911 and functions as a seat for the hand rails to rest on when in the down and stowed position. In one embodiment, the hand rails may be clamped down onto collective shelf surfaces 3203 using a lever clamp down device. In another embodiment, they may be bolted or pinned to the bracket shelves such as when the conveyor is being transported.

In one embodiment, post mounting brackets 2911 may include a reinforcement mounting face or flange for reinforcing the bracket's primary mounting position. Such an appendage may wrap around the bottom rails of the conveyor and tie in to the bottom of the conveyor. Mounting brackets may be designed differently for different conveyor designs without departing from the spirit and scope of the present invention. Bracket 2911 functions to stop the hand rail posts 2906 and the rear posts 2908 from over rotation and functions to shelve the hand rails 2902 of hand rail apparatus 2900 when the apparatus is not in use.

It is noted herein that the rear posts and rear brackets are designed to mechanically integrate to lock the hand rail apparatus at vertical on a left and on a right side of the conveyor and to effectively prevent the conveyor belt from operating while the hand rail apparatus is erected. Radius 3204 depicted as post cradle 3204 may be approximately one inch plus an acceptable tolerance to ensure that the cradle readily captures the post when it is rotated into position.

In one embodiment, cradle 3204 may be square for capturing a square post or triangular for capturing a square post rotated forty five degrees, the angular nature of the cradle on the bracket functioning to quickly gather and center the post and provide more stability to the vertical position of the post. In one embodiment, vertical posts may be locked into position by pinning or clamping them to brackets as well as locking the apparatus in general at the rear of the conveyor. It may be generally understood however, that a user may raise the rail apparatus into vertical position and lock the apparatus into vertical position at the rear of the conveyor (ground level) and then proceed to walk up the conveyor using the hand rails for support.

Figure 33:
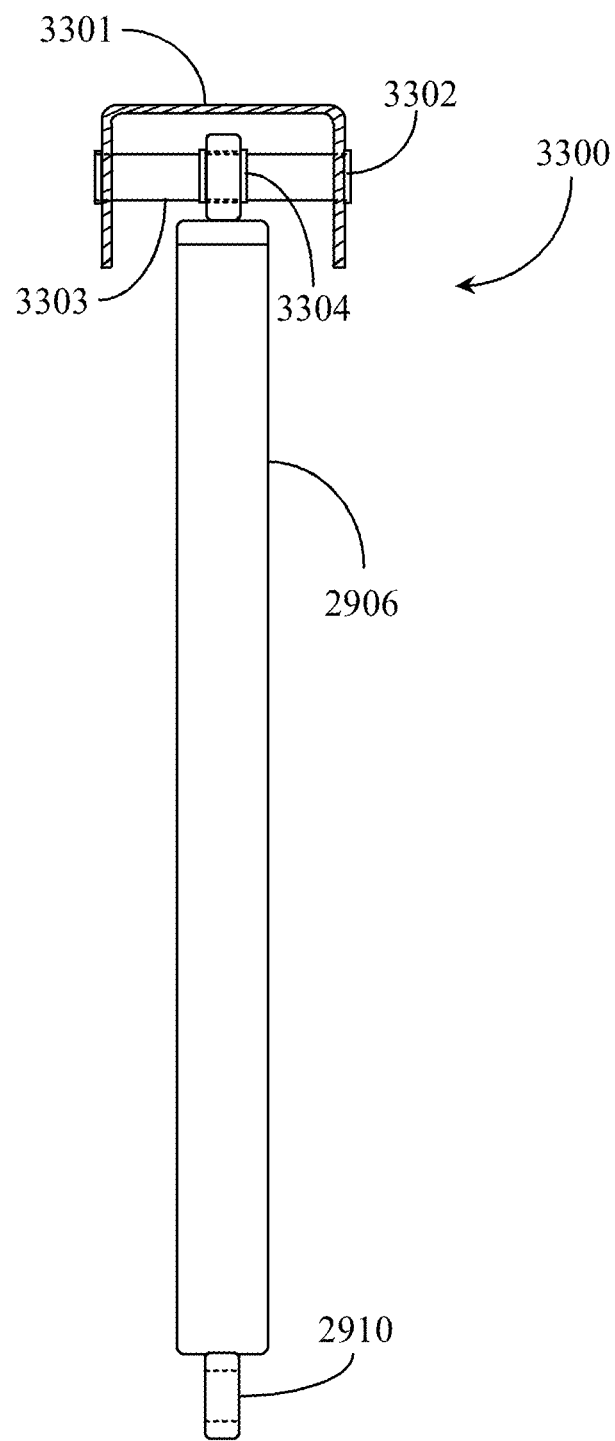
FIG. 33 is an elevation view of a rail post according to an alternate embodiment of the present invention.

FIG. 33 is a cut view of a rail post assembly 3300 according to an alternate embodiment of the present invention. Post assembly 3300 includes post 2906 and yokes 2910 fixed to the post at either end. A hand rail 3301 is rectangular and open at the bottom. Hand rail 3301 may be manufactured from fiberglass composite material pultruded rectangular tubing having approximately a one quarter inch wall thickness or from a formed sheet of the material, or molded from a fiberglass composite mixture.

Hand rail 3301 may be permanently attached to post 2906 by fixing an axle pin 3302 having an outside diameter just larger than the inside diameter of yoke 2910 through the yoke and side walls of the hand rail. Pin 3302 may be a mildly conductive material such as steel or a non-conductive material such as a fiberglass composite. Yoke 2910 may be retained at center on pin 3302 via retainer rings 3303 and 3304.

Figure 34:
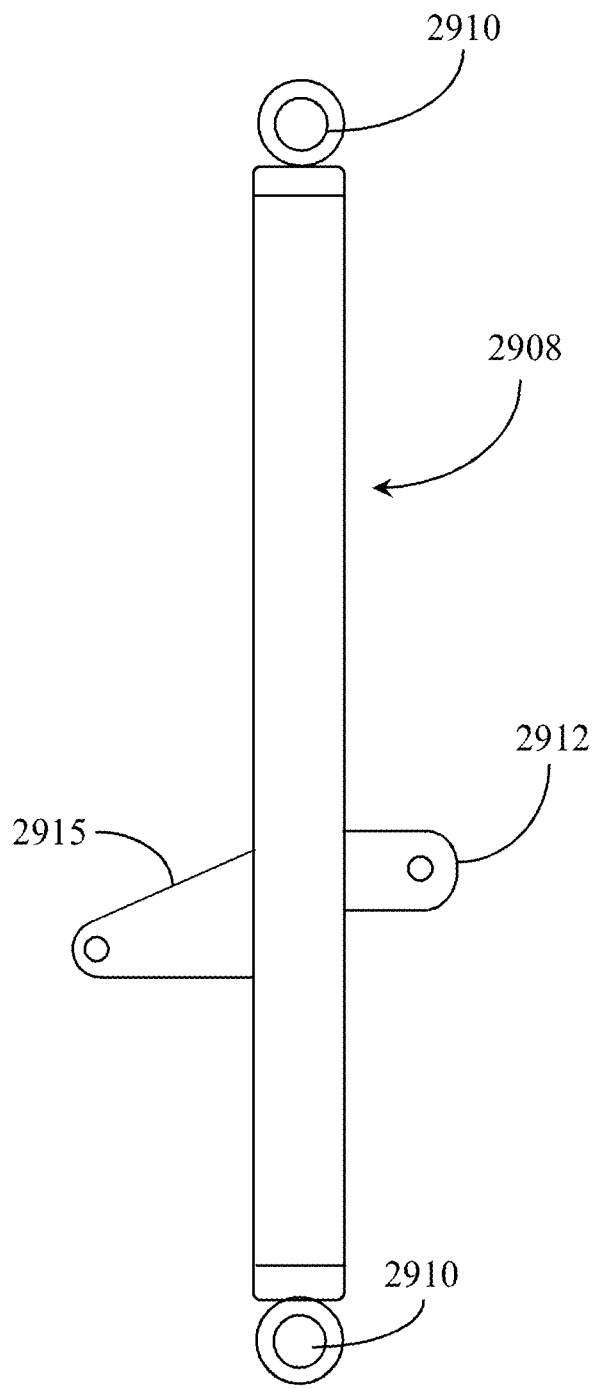
FIG. 34 is an elevation view of the rear rail post of FIG. 29.

FIG. 34 is an elevation view of rear rail post 2908 of FIG. 29. Rear rail post 2908 may be manufactured of two inch round metal tubing such as mildly conductive steel tubing. Rear post 2908 is presented at a lower elevation less likely to contact a power source such as a power line or lightning strike. Rear post 2908 is the driving post for lifting or lowering the entire hand rail apparatus on one side of the conveyor. Rear rail post 2908 includes a rail apparatus lock tab 2912 and a gas shock connector tab. Lock tab 2912 fits into a pin lock feature on the rear bracket. Shock connector fin 2915 includes an opening for accepting one end of a gas shock where the base end of the gas shock is fixed at the base of the rear post mounting bracket.

In one embodiment, tabs 2915 and 2912 are part of a formed sheet metal part of a nominal thickness of approximately one eight of an inch or so that wraps around the post approximately half way and presents the tabs appropriately and at roughly center of the rear post. A single part hosting both tabs may present more edge for welding and may reinforce the tabs themselves.

Figure 35:
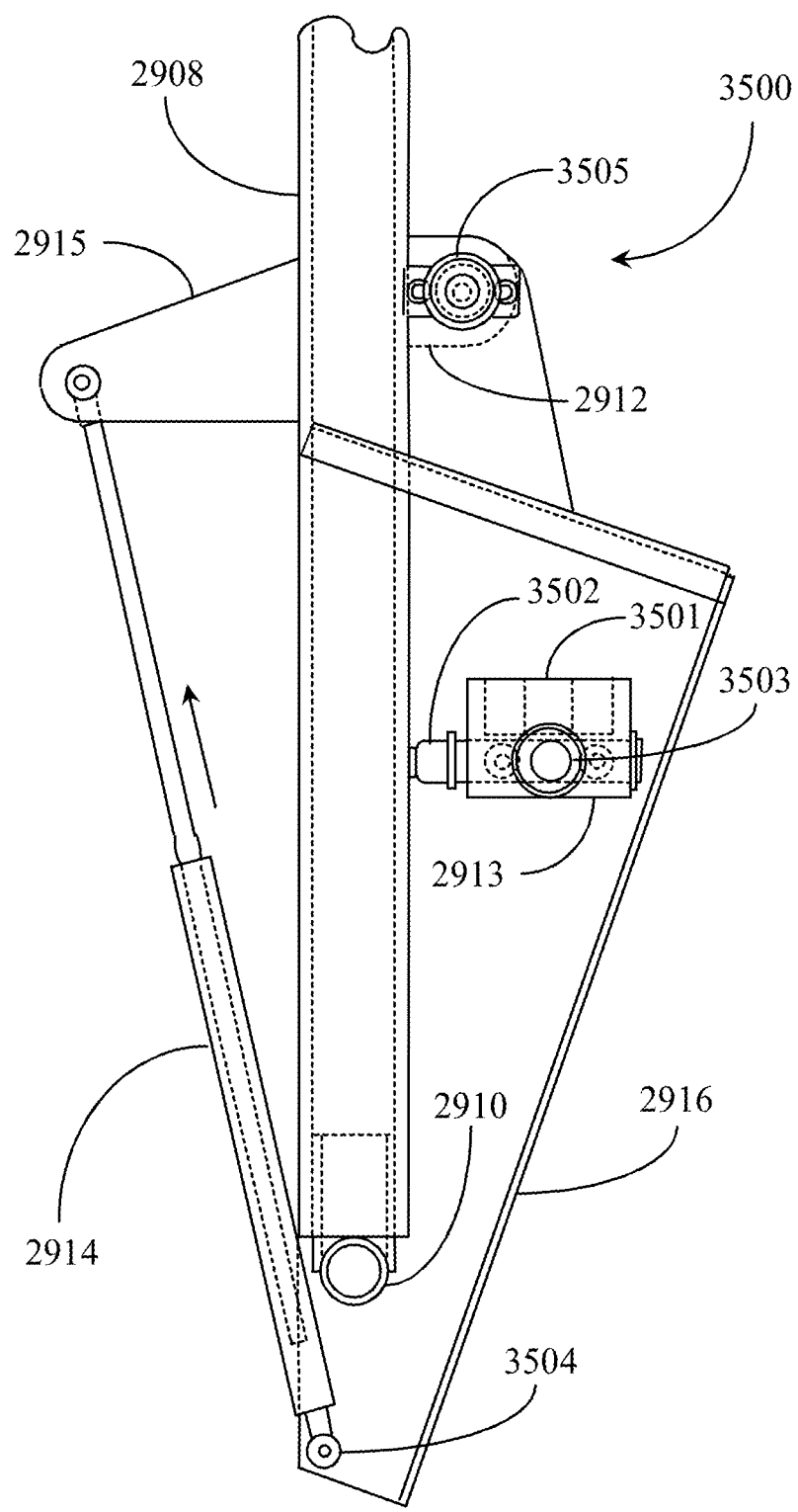
FIG. 35 is an elevation view of a rear post mounting bracket assembly according to an embodiment of the present invention.

FIG. 35 is an elevation view of rear post mounting bracket assembly 3500 according to an embodiment of the present invention. Rear post 2908 of the hand rail apparatus of the invention is considered a driving post in that a user manipulates the rear post to raise and lower and lock the entire apparatus. The tab or fin 2915 on the rear post 2908 seats one end (the top end) of gas shock 2914. The opposite end of gas shock 2914 is rotably anchored at the bottom of rear post mounting bracket 2916 via a shaft/yoke connection interface 3504. Retainer rings may be used to retain gas shock 2914 on the shaft provided in the bracket for the purpose.

Rear post 2908 is in vertical and locked position in this example. Tab 2912 is locked onto rear post mounting bracket 2916 via a spring loaded plunger pin or lock pin assembly 3505. In one embodiment, a user mechanically lifts the hand rail apparatus up by grabbing the hand rail lifting it up and pulling it toward them causing rear post 2908 to rotate to vertical. The user may then lock rear post 2908 to mounting bracket 2916 wherein mechanical unlocking by a user is also required to lower the hand rail apparatus. In another embodiment, a quick connect interface may be provided that automatically couples the rear post to the rear mounting bracket upon contact. A release mechanism may be employed to release the coupling to lower the hand rail apparatus again.

Gas shock 2914 acts as a ballast mechanism to resist gravity of the hand rail apparatus 2900 of FIG. 29. Rear post mounting bracket 2916 includes a dowel shaft that yoke 2910 rotates about and is retained on. Hydraulic selector switch 2913 functions to select on or off for the hydraulics to power the conveyor belt. Selector switch 2913 includes a housing 3501, a spring loaded plunger 3502 and a switch reset button/knob 3503 for adjusting the position of plunger 3502 relative to the stop position of rear post 2908 when said post is vertical, and for resetting the switch to on again from the off state so that the conveyor might be started again. Selector switch is in an off state while the vertical rear post is cradled and locked to bracket 2916. When rear post 2908 is unlocked from vertical position and rotated away from selector switch 2913, the selector switch remains off and the conveyor belt cannot be turned on until switch 2913 is manually reset to on.

Selector switch plunger 3502 is abutted when rear post 2908 is brought to vertical position and travels the required distance to shut off the hydraulic motor for the conveyor belt. This safety feature prevents the conveyor belt from turning or jumping. The conveyor belt may also be locked automatically when not in a running state. When rear post 2908 is vertical and cradled by mounting bracket 2916, gas shock 2914 is at a full extension. Selector switch 2913 may be thought of as a post-activated kill safety switch.

Figure 36:
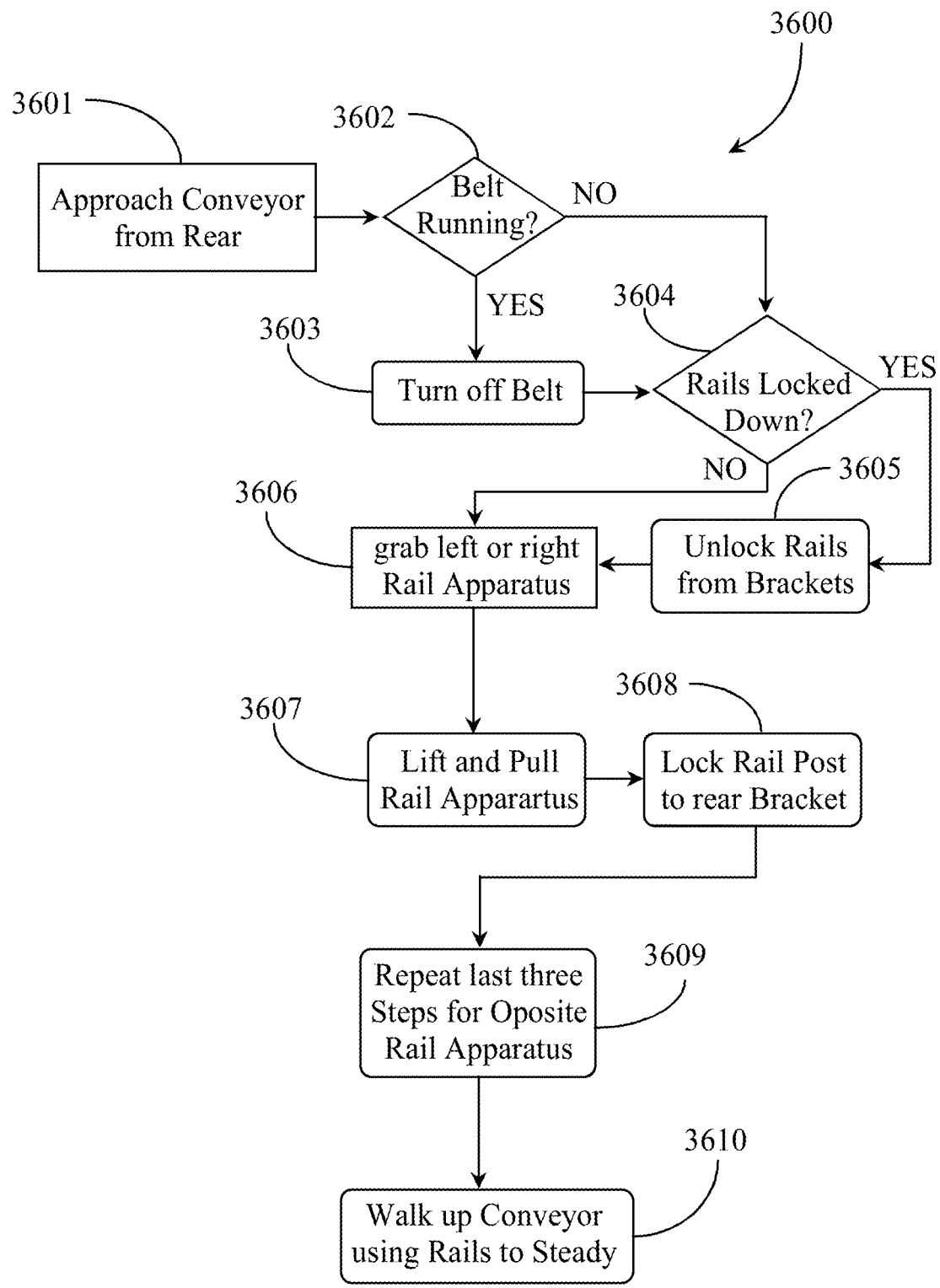
FIG. 36 is a process flow chart depicting steps for erecting the hand rail system of the present invention.

FIG. 36 is a process flow chart 3600 depicting steps for erecting the hand rail system of the present invention. The following process assumes that the conveyor is placed on a roof top and is operational to ferry materials to the roof top. At step 3601, a user may approach the conveyor from the rear or ground level such as on a truck turret mount.

The user may determine at step 3602 whether the conveyor belt is running or not. Although the belt may continue to run while a user is in the process of erecting a hand rail apparatus, if the belt is determined to be running, the user may shut the belt down at step 3603 for safety purposes. If it is determined that the conveyor belt is not running at step 3602, the user may determine whether the hand rails are locked down to the bracket top shelving. This step assumes that the lock down feature or features are within reach of the user without climbing up on to the conveyor surface, such as at the last post bracket or brackets before the rear post bracket.

If at step 3604 the user determines that the hand rails are locked down, then the user may unlock or undo clamps at step 3605. In an embodiment where each post mounting bracket save the rear post brackets have a rail securing mechanism, the hand rails may be released from the brackets before the conveyor is pivoted up and extended on to a roof top. In this event steps 3604 and 3605 are not required to practice the invention. The process resumes at step 3606 where a user may grab a left or a right hand rail apparatus by hand. A handle may be provided on the hand rails in reach of the user for the convenience of the user.

At step 3607 the user may lift and pull the rail apparatus toward the rear of the conveyor. At step 3608, the user may lock the hand rail apparatus to the rear post mounting bracket via the lock tab and pull pin interface on the rear bracket. At this point the hand rail apparatus (2900) for one side of the conveyor is fully erected and the conveyor belt (3106) is disabled by the hydraulic selector switch (2913). At step 3609, the user may repeat the last three steps to erect the opposite hand rail apparatus so that both hand rails are fully erected and in position to support a user. At step 3610, the user may walk up the conveyor using the hand rails for support.

Figure 37:
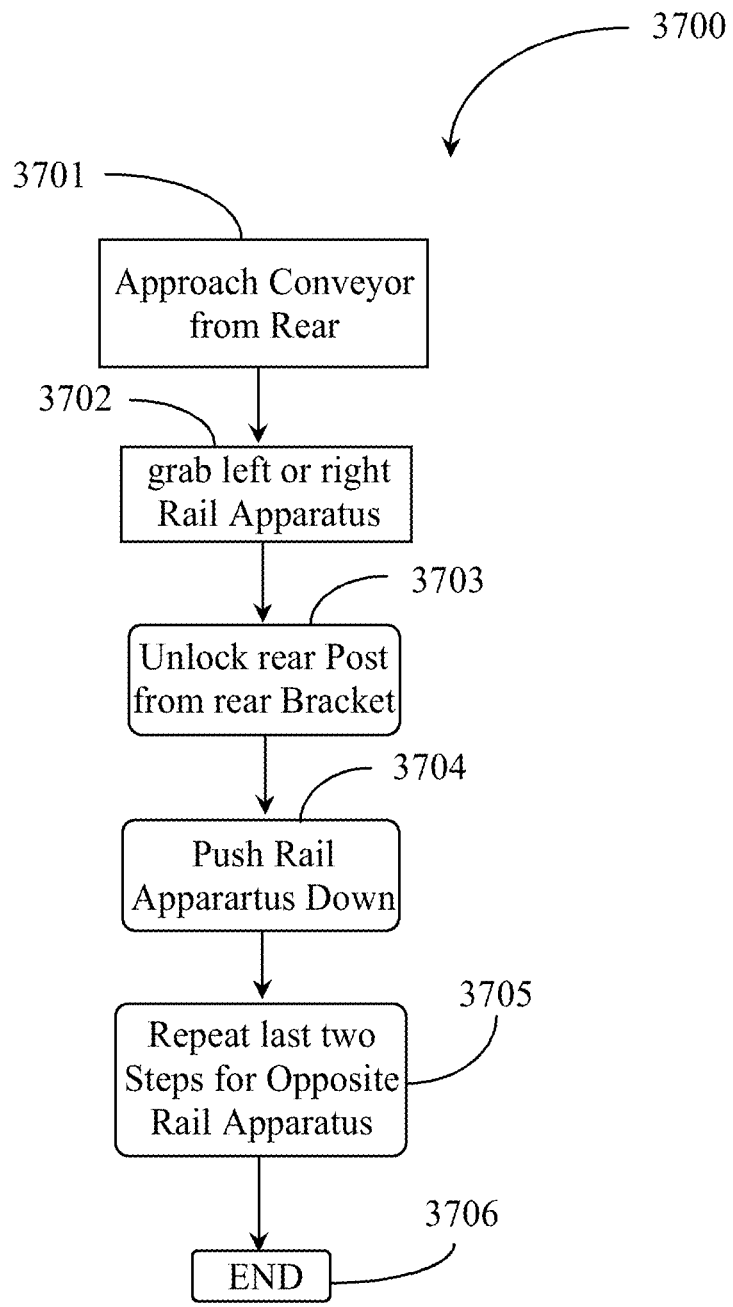
FIG. 37 is a process flow chart depicting steps for shelving the hand rail system of the invention.

It will be apparent to one with skill in the art that only one hand rail apparatus is required to practice the present invention however for safety purposes two are provided, one left side hand rail apparatus and one right side hand rail apparatus. Only one hydraulic selector switch is required to shut down the conveyor belt while one or both hand rail apparatus are erected. It may also be apparent to the skilled artisan that people may walk up and down a conveyor with erected hand rails for as long as they are erected, typically when it is not necessary to ferry more materials to the roof FIG. 37 is a process flow chart 3700 depicting steps for shelving the hand rail system of the invention. At step 3701, a user may approach the conveyor from the rear. At step 3102 the user may grab the left or right hand rail by a handle. At step 3703, the user may unlock the rear hand rail post from the rear post mounting bracket. At step 3704 the user may push the hand rail away and down onto the selves (mounting bracket surfaces). Gas shock 2914 aids in resisting the gravity force on the hand rail apparatus making it easier to lower without creating strain on the user. The user may also lock the hand rails down to the last bracket before the rear post bracket. At step 3705 the user may repeat the last two steps for the opposite side. At step 3706 the process ends.

In one embodiment the user must reset the hydraulic selector switch to the on state so that the conveyor belt may be restarted after collapsing the hand rail apparatus. Though it is not required to have two hydraulic selector switches, in a preferred embodiment there are two, one for each apparatus. In that way, the user must reset two switches before the belt may be powered again. Also, in one embodiment the user may clamp the rails down at the mounting bracket or brackets before the rear post bracket.

FIG. 38 is bracket 2911 as discussed in FIGS. 29 and 30. In one embodiment Element 3803 is used to secure the bracket to the main frame of conveyor. Holes 3802 aid in securing bracket to frame as discussed in FIGS. 29 and 30.

Figure 39:
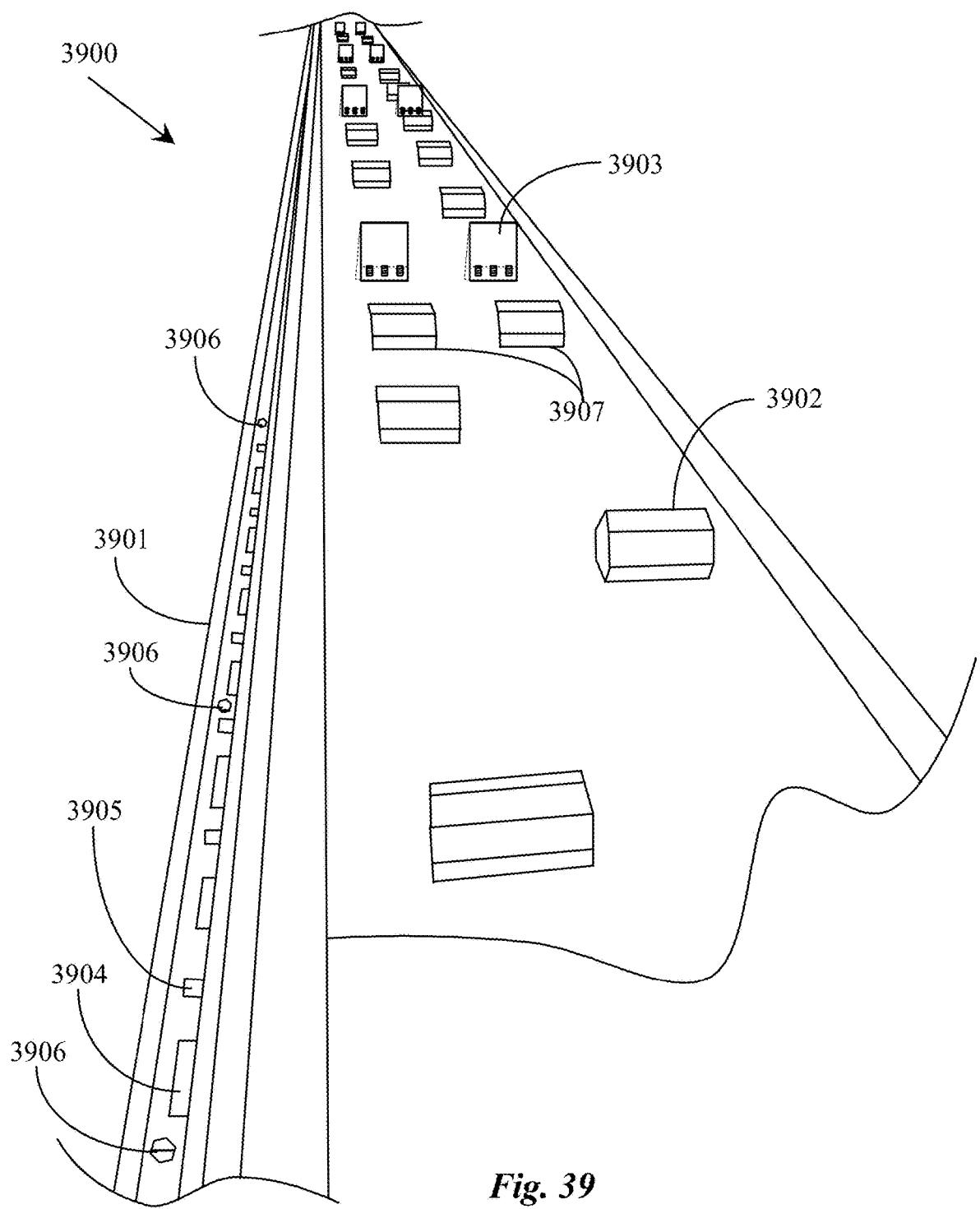
FIG. 39 is a view of a belt of a conveyor with steps added for personnel to access conveyor belt.

FIG. 39 is an illustration of a rail and step system according to one embodiment of the invention. Rail 3901 runs the full length of the conveyor on both sides. Rail 3901 is very sturdy and only needs fastened intermittently by fasteners 3906. Fasteners 3906 may be bolted and there may be more or less attachment points depending on the material thickness of rails 3901. Many attachment methods may be utilized to secure rail 3901. Bolts are shown for an example only. Bolts may be counter sunk so a railing may slide along rail 3901 as discussed.

Rails 3901 have openings 3904 and 3905. These openings may be used to secure a prefabricated railing by sliding the prefabricated railing into one end of the railings 3901. These railing sections may be secured by a quick connect hook and spring mechanism (not shown) or any other attachment method known to man. One or more prefabricated railings may slide into railings 3901 until there is a railing the full length of the conveyor on both sides such that a user may have handholds the whole way up and down the belt of the conveyor.

Steps 3902 may be adhered to the belt of the conveyor to aid a user in climbing the belt to attain the top of the working area. In one embodiment steps 3902 may be laid out such that a user can use one foot after another to climb the belt. Cleats 3903 may also be used as part of the steps in this situation. In another embodiment the steps may be side by side all of the way up and spaced such that a user may use either foot on either step to accommodate climbing the belt.

Figure 40:
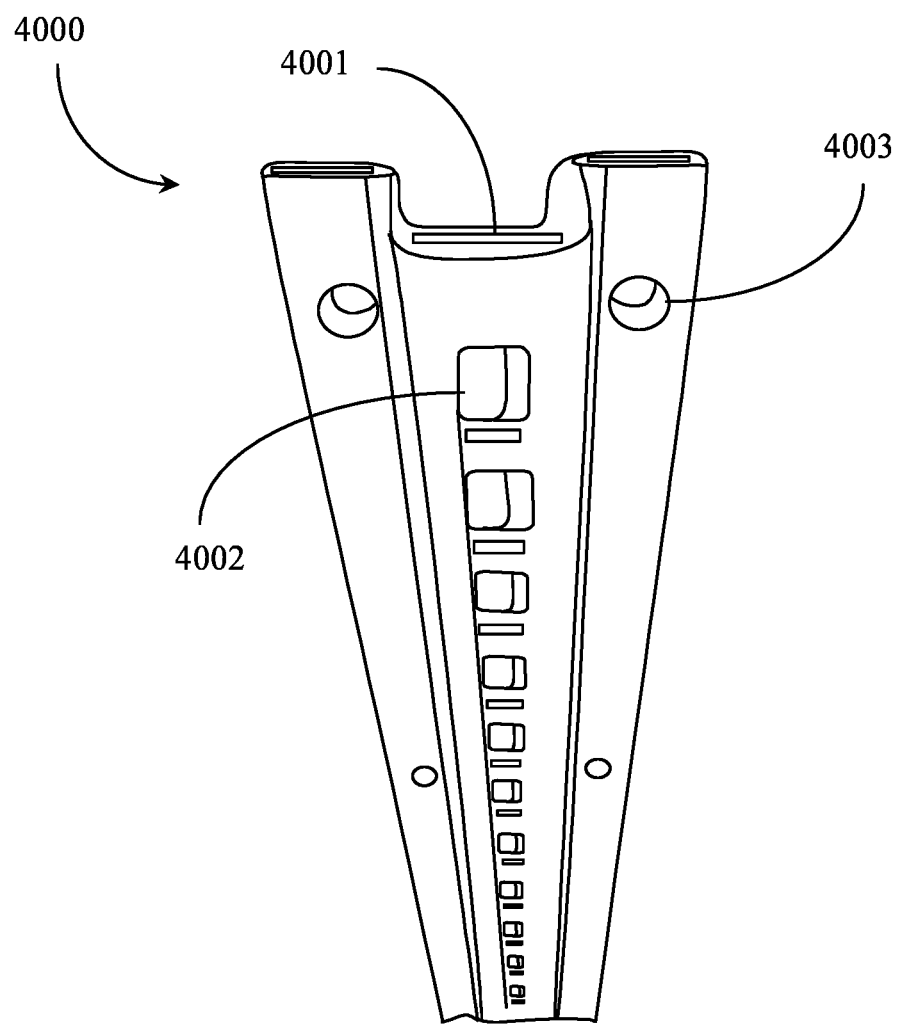
FIG. 40 is a view of the rail material that a sliding rail may slide on to according to one embodiment of the invention.

FIG. 40 is a view of an example of a bottom rail 3901 of FIG. 39. Rail is numbered 4000 in this view. In one embodiment bottom U shape 4001 is incorporated into rail 4000 where openings 4002 are located. In one embodiment holes 4003 may be used to affix the rail alongside the conveyor so that it is strong enough for its intended purpose of receiving prefabricated railings. Prefabricated railings would slide into U shape and lock into openings with spring loaded mechanism (not shown). Mechanism may be unlocked pulling a lever to unlock hooks. Other quick connect quick disconnect mechanisms may also be used to insert prefabricated railings onto rails 3901

Figure 41:
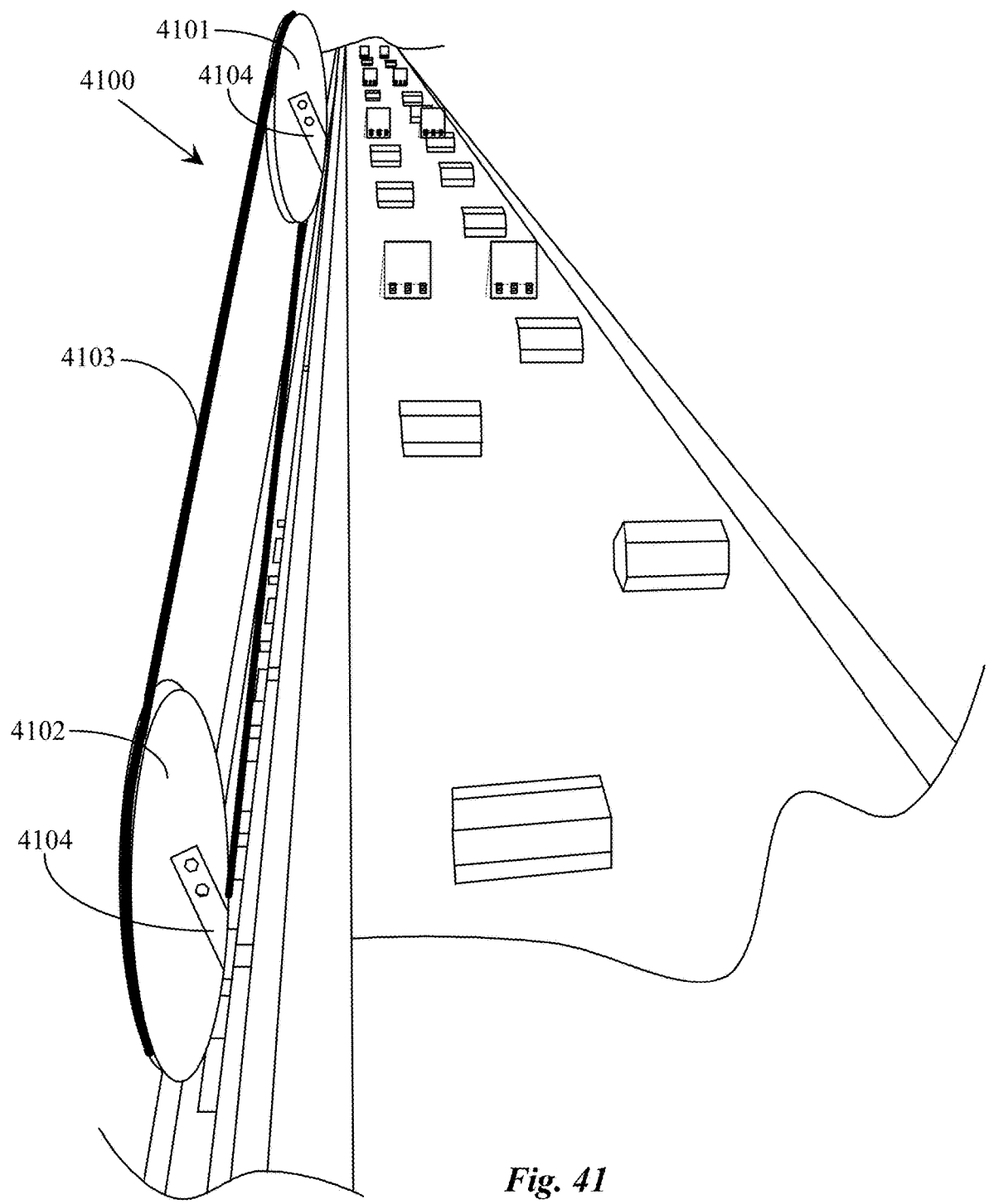

According to FIG. 41, in another embodiment of the invention a non-conductive cable system is used for a railing system 4100, a cable 4103 is stretched around 2 pulleys 4101 and 4102 on each side of the conveyor. In one embodiment the cable may be non-conductive and may be made of a variety of non-conductive materials. The cable may be stretched by movement of one, the other or both pulleys such that the tension of cable 4103 is sufficient for use as a hand hold enabling a user to traverse the belt of a conveyor from bottom to top so that he may reach the working area. The pulleys 4101 and 4102 may be attached to the side of the conveyor in a variety of ways such as bracket bolting as shown in element 4104 with non-conductive materials etc. . . . . . The attachment method does not in any way depart from the invention as the pulleys can be attached and tightened by any known method in the art. In one embodiment a series of additional pulleys may rise up tightening the cable from beneath.

Figure 42:
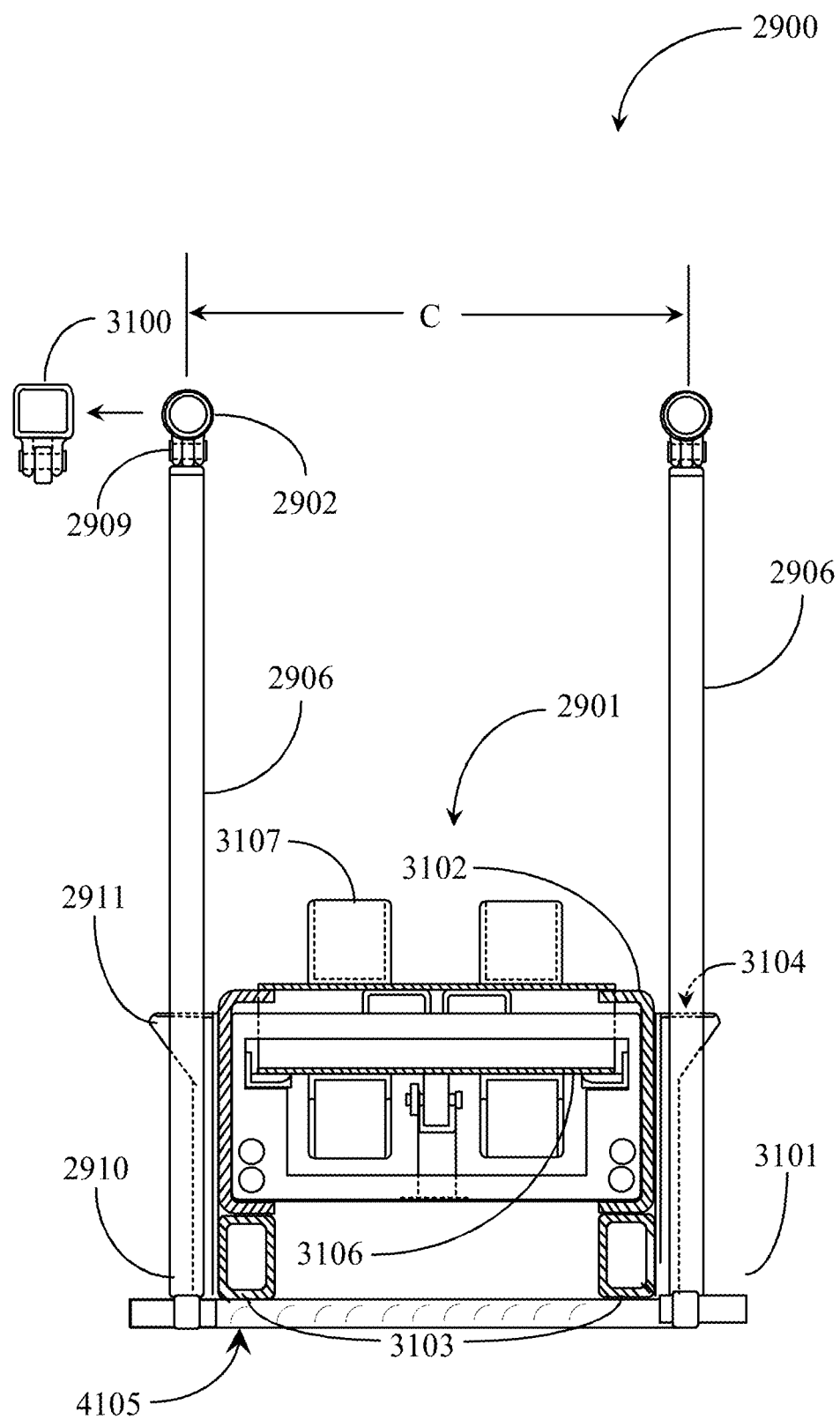
FIG. 42 is a section view of the conveyor and handrail system of FIG. 29 taken along the section line AA according to alternate embodiment of the invention wherein both rails operate together.

FIG. 42 is a section view of FIG. 29 similar to FIG. 31. Illustrating that in one embodiment a connector 4105 (not seen in FIG. 29) is utilized between the right side rail assembly and the left side rail assembly. Connector element 4105 connects each rail 2906 under conveyor so that they can be lowered and raised together. Connectors 4105 may be any type of connector that enables this embodiment of raising and lowering the rail assemblies together as one.

It will be apparent to one with skill in the art that the hand rail system of the invention may be provided using some or all the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

Torsion Weldment

It is a goal of the present invention to provide a horizontal flex-reducing torsion weldment to the telescopic boom of a material conveyor system.

Figure 43:
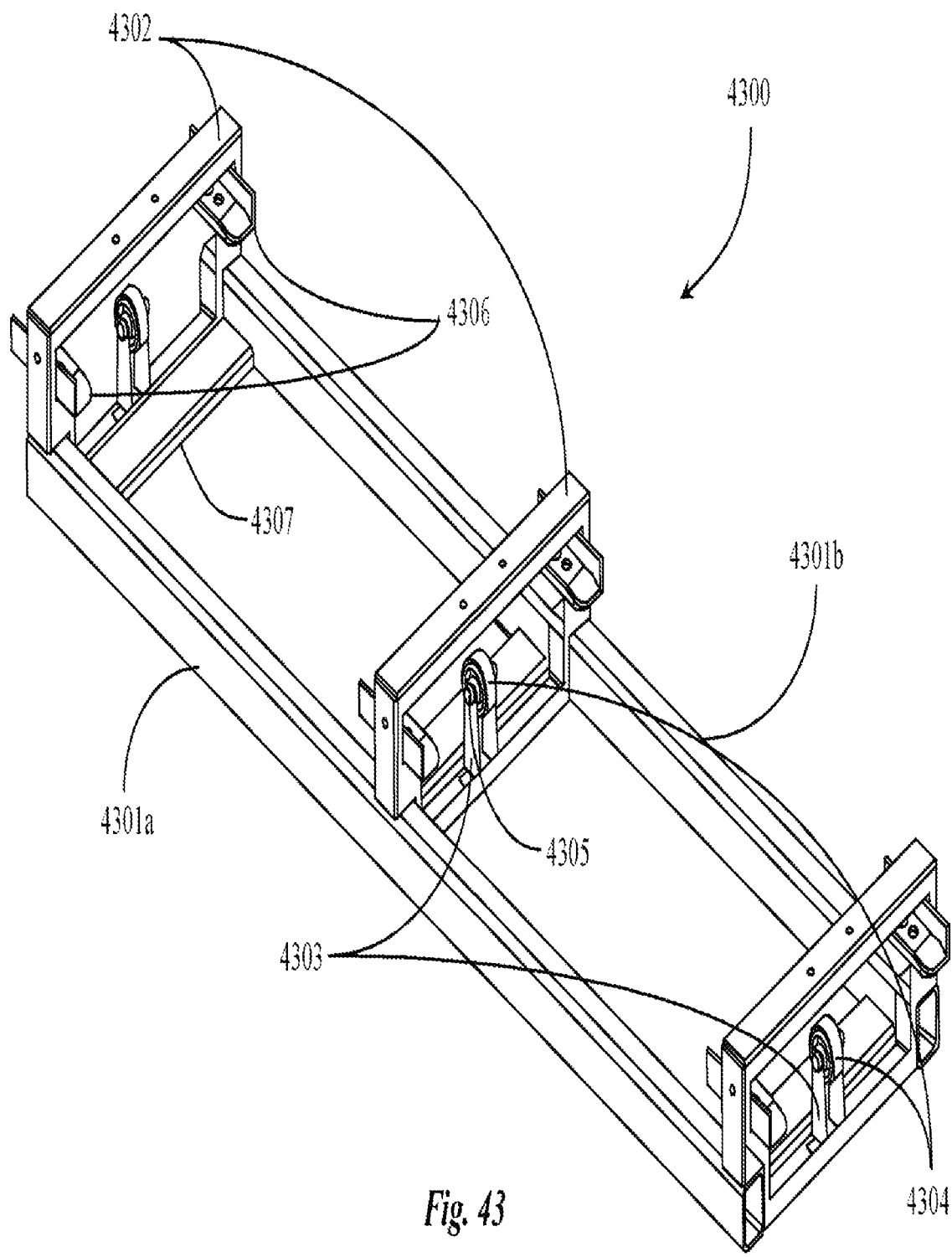
FIG. 43 is a perspective view of a torsion weldment for stabilizing a telescopic boom structure of a material conveyor apparatus according to an embodiment of the present invention.

FIG. 43 is a perspective view of a torsion weldment 4300 for stabilizing a telescopic boom structure of a material conveyor apparatus according to an embodiment of the present invention. Torsion weldment 4300 is adapted as a torsion box type structure that may by adapted to reinforce rigidity of a boom structure on a material conveyor system housing a material conveyor belt driven by a motor. Torsion weldment 4300 includes an elongate left rigid member 4301a and an elongate right rigid member 4301b spaced apart and held parallel by cross members 4307.

Rigid members 4301a and 4301b may be round, rectangular or square tubing extruded and cut to proper length, which may be dependent upon the overall length of the boom structure it may be adapted to reinforce. Rigid members 4301a and 4301b may be metal parts fabricated of stainless steel or other metals. Cross members 4307 may be rounded rectangular tubes fabricated of steel or another weldable material hailing strong rigidity characteristics. Cross members 4307 may be equally spaced along the length of elongate rigid members 4301a and 4301b. In this embodiment there is one cross member proximal to each end and one cross member in the middle. There may be fewer or more cross members 4307 for a torsion weldment than are depicted herein without departing from the spirit and scope of the invention.

Torsion weldment 4300 includes belt support brackets 4302. Belt support brackets 4302 may be manufactured of sheet metal. Belt support brackets 4302 each support a pair of belt guides 4306 in an elevated track position to accept the bottom side of a conveyor belt or a return belt. Belt guide support brackets 4302 may be welded to rigid members 4301a and 4301b and to cross members 4307. Belt guide support brackets 4302 also support metal roller bracket assemblies 4303 that provide mounting locations for belt-return rollers 4304 pinned to the bracket assemblies using axle pins 4305.

In one embodiment, support brackets 4302 may also serve as the cross members whereas cross members 4307 may not be required in order to practice the present invention.

Figure 44:
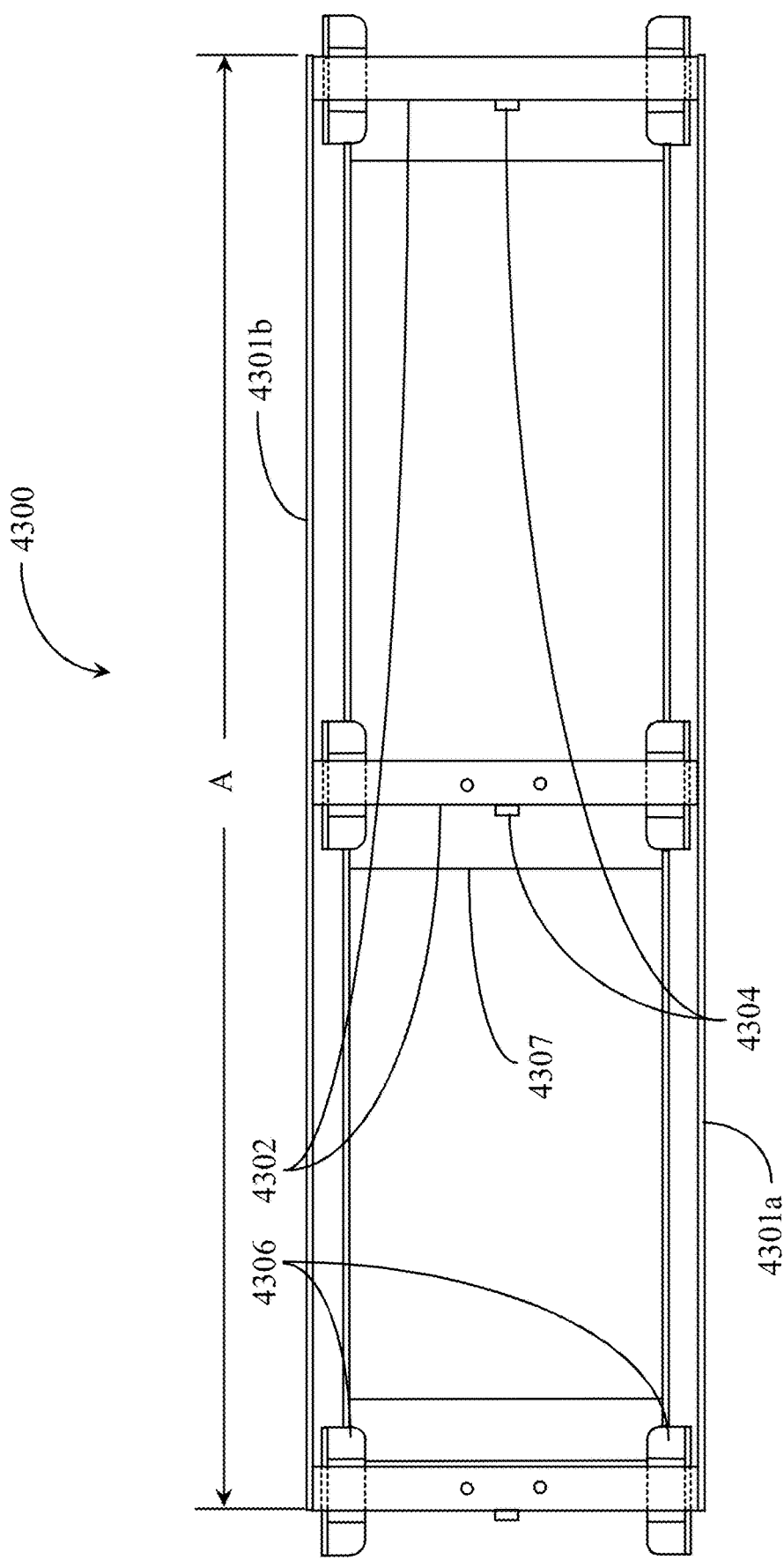
FIG. 44 is an overhead view of the torsion weldment of FIG. 43.

FIG. 44 is an overhead view of torsion weldment 4300 of FIG. 43. In this overhead view, rigid members 4301a and 4301b are substantially parallel and spaced apart by cross members 4307. Cross members 4307 may be welded in place orthogonal to the rigid members 4301a and 4301 b making up a bottom torsion frame that supports vertical placement of sheet metal support brackets 4302, which may in turn be welded both to the edges of cross members 4307 and to the elongate rigid members 4301a (left) and 4301b (right). In one embodiment, rigid members 4301a and

4301*b*, cross members 4307, and belt guide support brackets 4302 are bolted together using standard hardware such as nut and bolt, rivet, or other hardware.

Torsion weldment 4300 is adapted to function as a damper frame to reduce vibration and reduce over flexing and twisting of the material conveyor boom during positioning operations and repositioning operations. Torsion weldment 4300 is adapted to fit within the fiberglass frame of a telescopic boom or in one embodiment, a non-telescopic boom and is fixed in a linear position within the boom using standard hardware such as nut and bolt or by welding to existing boom frame members, or by a combination of hardware attachment and welding.

The overall length of torsion weldment 4300 is represented in this view by a dimension A taken between the outer facing edges of the belt guide support brackets 4302. Dimension A may vary according to overall conveyor main boom length and the length of the telescopic boom when fully extended. In one embodiment, dimension A is about five feet to seven feet in length depending on conveyor reach. The material specifications and construction methods of torsion weldment 4300 enable a light-weight torsion box-like structure that may be used in a telescopic or standard rectangular conveyor boom supporting a conveyor belt and adjunct hardware such as the belt, guides, roller assemblies, etc.

Figure 45:
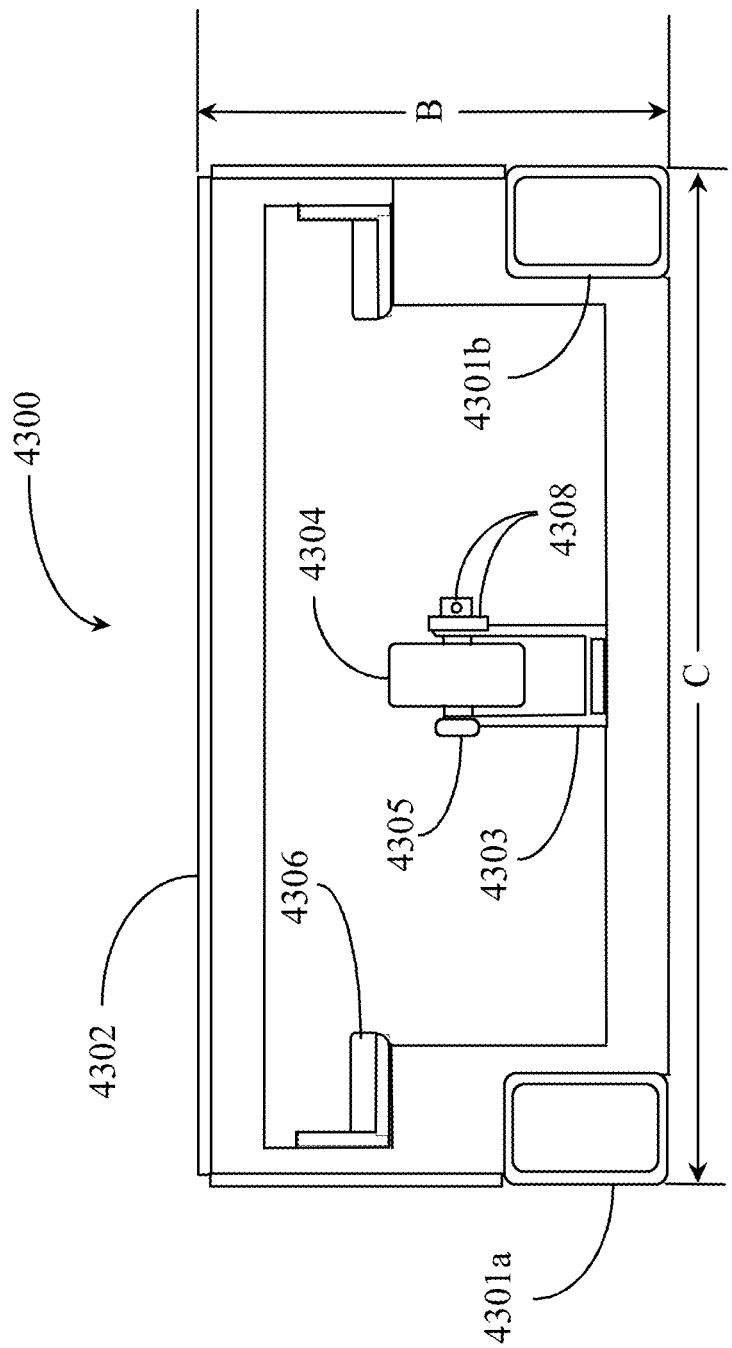
FIG. 45 is an end view of the torsion weldment of FIG. 43.

FIG. 45 is an end view of torsion weldment 4300 of FIG. 43. Torsion weldment 4300 has a low height profile compared to the width of the weldment. An overall width dimension for torsion weldment 4300 is represented herein by a dimension C measured between the outward facing surfaces of rigid members 4301*a* and 4301*b*. Dimension C may be about I and three-quarter foot in length. An overall height dimension for torsion weldment 4300 is represented herein by a dimension B measured between the bottom surface plane of rigid members 4301*a* and 4301*b*, and the top surface plane of belt guide support brackets 4302. Dimension B may be about 7 and three-quarter inches in length.

Support bracket 4302 provides mounting and part orientation support for mounting and positioning belt guides 4306 and for mounting and positioning roller bracket assembly 4303. Return roller 4304 rotates on axle pin 4305 held in place by standard roller mounting hardware 4308 including a flat washer and a cotter pin.

Figure 46:
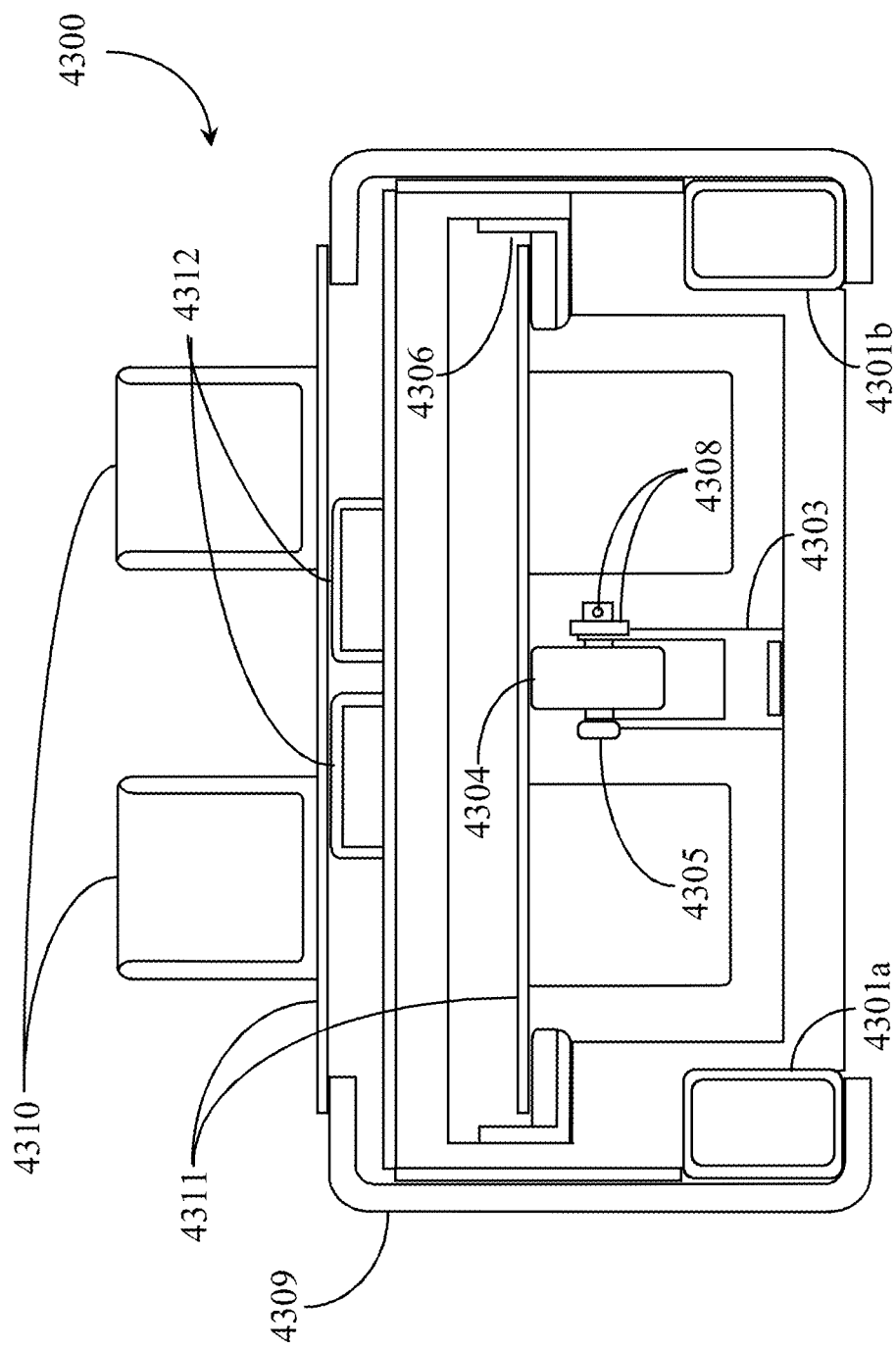
FIG. 46 is an end view of the torsion weldment of FIG. 43 supported within a telescopic boom structure.

FIG. 46 is an end view of torsion weldment 4300 of FIG. 43 supported within a telescopic boom structure. Torsion weldment structure 4300 has a width dimension just smaller than the inside-to-inside dimension between fiberglass side rails 4309 of a telescopic boom structure. In one embodiment, torsion weldment 4300 may be used with a non-telescopic boom on a material conveyor system.

Fiberglass side rails 4309 provide a lower contact interface for torsion weldment 4300. Fiberglass side rails 4309 extend past the top of torsion weldment 4300 the tops of the rails serving as a top track for a conveyor belt 4311. The lower return portion of conveyor belt 4311 is supported by roller 4304 and belt guides 4306. Roller bracket assemblies 4303 and support brackets 4302 have enough clearance to allow conveyor material cleats 4310 to pass under and through the weldment structure without obstruction.

Torsion weldment 4300 may be fabricated of sheet metal forming the outer sides of the frame components such as support brackets 4302 and thin-walled tubing for the elongate rigid members 4301*a* and 4301*b* and for the cross members 4307. The top side of conveyor belt 4311 is supported by the fiberglass top surfaces of side rails 4309 and further by fiberglass center slider beds 4312 to keep the center of the belt supported. In a preferred embodiment, belt 4311 includes a longitudinal center guide rib (not illustrated) fabricated of rubber which may be vulcanized to the underside of the belt along center. Such a guide rib may be about one-half inch square and run the entire length of the belt. The rib guide moves in between the rails of slider bed 4312 the rails functioning as a barrier to keep the belt centered and running true. The typical width of material loads placed on conveyor belt 4311 may exceed the width of the belt the weight supported at least by rails 4309 and slider bed 4312.

In practice, torsion weldment 4300 interrupts vibration twisting and flex in the horizontal direction by reinforcing rigidity of the boom along the length of the torsion weldment and at the location of installment relative to the material conveyor system. A conveyor position operator may operate a truck bed turntable to angularly position the boom with respect to the truck angle.

The operator may raise and lower the boom, extend, or retract the boom, and change the angular position of the boom with respect to the alignment of the truck the material conveyor system is mounted to. These operations may create vibrations and horizontal over flexing twisting or bowing of the fiberglass boom frame. If the boom is longer than the flexing, twisting and vibrating can be much more acute. The over flexing puts stress on the materials and points of anchor for the materials. Torsion weldment 4300 provides a determinant length of reinforcement along the vulnerable portion of the boom length to prevent or greatly reduce over flexing, twisting, and excessive vibrations in the fiberglass frame and their connection components.

Figure 47A:
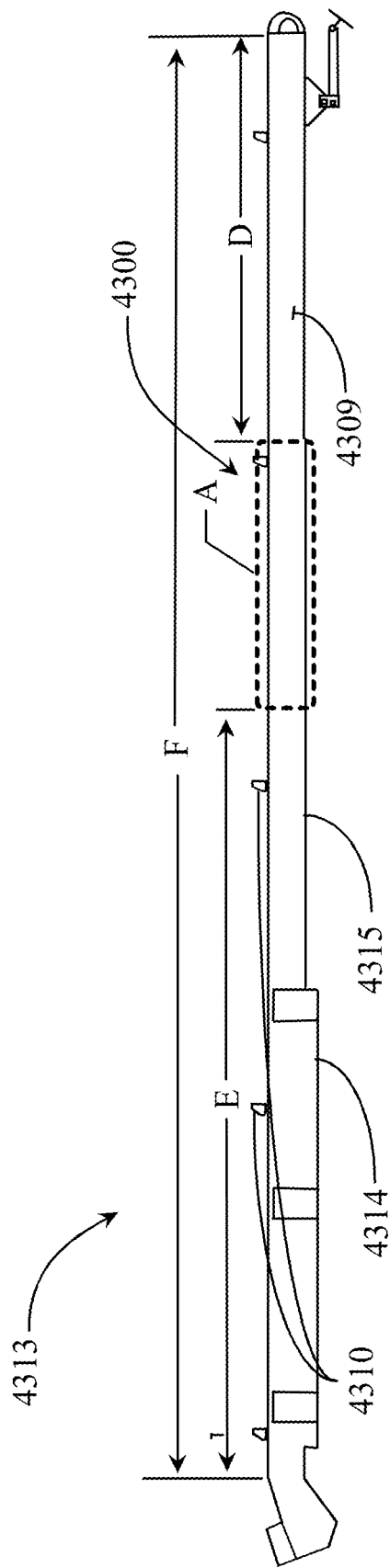
FIG. 47A is a side view of a material conveyor apparatus with the torsion weldment of FIG. 43 stabilizing a telescopic boom.

FIG. 47A is a side view of a material conveyor apparatus 4313 torsion weldment 4300 of FIG. 43 stabilizing a telescopic boom. Material conveyor apparatus 4313 includes a main boom structure 4314 and a telescopic boom 4315. The overall reach of 15 material conveyor apparatus 4313 is referenced herein as a dimension F and may be assumed to be at full length extension. Dimension F may be about 33 feet.

In this embodiment, torsion weldment 4300 is strategically located about two thirds of the length of the material conveyor apparatus referenced herein as dimension E. Dimension E may be about 18 feet from the rear of the apparatus to the first edge of the torsion weldment. The front end of torsion weldment 4300 is about 10 feet shy of the end of telescopic boom 4315 referenced herein as dimension E. In this case torsion weldment 4300 is about 5 feet in overall length. It is noted herein that the torsion weldment may be located anywhere along the length of the boom and it may vary in length. The preferred length and location of placement along the boom is a factor of the length of the overall boom structure.

Figure 47B:
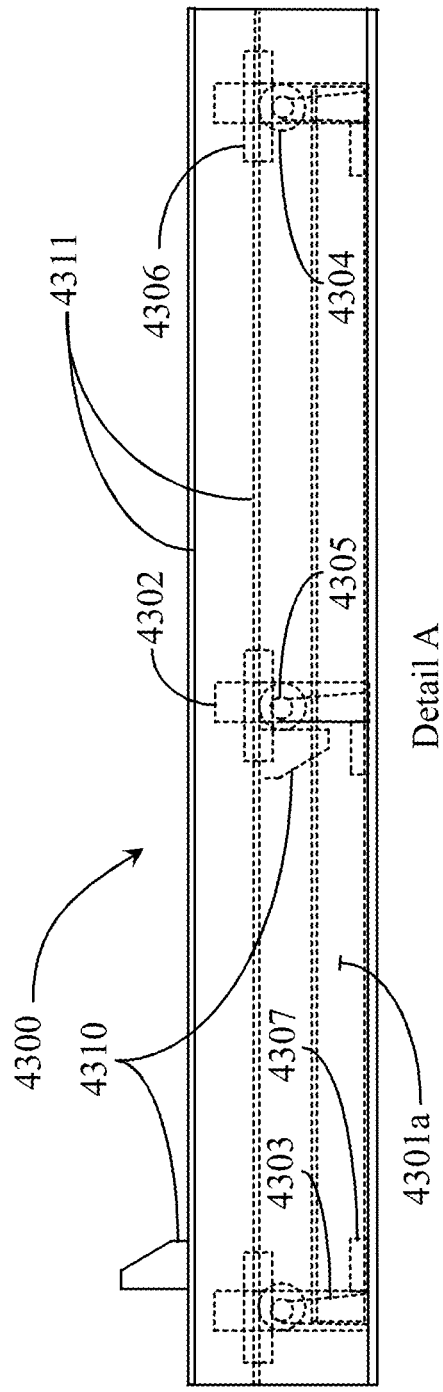
FIG. 47B is an enlarged view of detail A of FIG. 47A

FIG. 47B is an enlarged view of detail A of FIG. 47A In this detail view, torsion weldment 4300 is drawn in broken line behind side rail 4309. Belt 4311 rests on top of the boom while the lower return belt side rests on guides 4306. Material cleats 4311 are depicted in both carry and return positions. Return roller 4304 support the lower side of belt 4311 at rough center. Belt guide support brackets 4302 complete the box like frame for weldment 4300 and are welded to cross members 4307 and to rigid members 4301*a* and 4301*b*.

It will be apparent to the skilled person that the present invention may be provided using some or all the elements described in this specification without departing from the spirit and scope of the present invention. The invention is described in at least one embodiment which is exemplary of an implementation of the invention. These exemplary descriptions do not preclude other implementations and use cases not described in detail. Many alterations could be made in the details of the construction and the arrangement of the apparatus and its components without departing from the spirit and scope of this invention. The invention is limited only by the claims below.

The invention claimed is:

1. A weldment structure for reinforcing a boom of a material conveyor apparatus comprising:
   a pair of elongate rigid members having an overall length with cut ends;
   a set of cross members having the same overall length with cut ends, the cross members fixed orthogonally to the elongate rigid members functioning to hold the rigid members apart and parallel and at the same edge alignment; and
   a set of cross support brackets fixed to the cross members and to the elongate rigid members, the cross-support brackets each supporting at least a return roller bracket assembly and a pair of opposing and bracketed belt guides;
   wherein the weldment structure is installed at or otherwise incorporated within a boom structure of a material conveyor apparatus to reduce vibration and horizontal flexing and or twisting of the boom structure during operation.

2. The weldment structure of claim 1, wherein the boom structure is a telescopic boom structure.

3. The weldment structure of claim 1, wherein the elongate rigid members are square tubing.

4. The weldment structure of claim 1, wherein the cross members are rectangular tubing with rounded corners.

5. The weldment structure of claim 1, fastened to the inside bottom surfaces of opposing fiberglass side rails forming the sides of a frame of a boom of a material conveyor apparatus.

6. The weldment structure of claim 1, fabricated of steel tubing and sheet metal plate.

7. The weldment structure of claim 1, wherein the set of cross members includes three cross members, two disposed toward the ends of the elongate rigid members, and one at a center of the overall length of the torsion weldment.

8. The weldment structure of claim 7, wherein the set of cross support brackets includes
   three cross brackets, two edge aligned with the ends of the elongate rigid members, and one edge aligned with the center cross member.

9. The weldment structure of claim 1, wherein the cross support brackets further support top belt fiberglass skids supporting the underside of a belt at a center.

* * * * *